(12) United States Patent
Fukami et al.

(10) Patent No.: US 7,391,866 B2
(45) Date of Patent: Jun. 24, 2008

(54) BROADCAST APPARATUS AND RECEPTION APPARATUS FOR PROVIDING A STORAGE SERVICE BY WHICH SCRAMBLED CONTENT IS STORED AND DESCRAMBLED USING SCRAMBLING KEY LIST

(75) Inventors: Yukiyasu Fukami, Nagoya (JP); Toru Nakahara, Osaka (JP); Takashi Matsuo, Kawasaki (JP); Akio Higashi, Takatsuki (JP); Hiroki Murakami, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 469 days.

(21) Appl. No.: 10/023,021

(22) Filed: Dec. 13, 2001

(65) Prior Publication Data

US 2002/0080971 A1    Jun. 27, 2002

(30) Foreign Application Priority Data

Dec. 15, 2000    (JP)    ............................. 2000-381870

(51) Int. Cl.
*H04N 7/167*    (2006.01)
*H04K 1/00*    (2006.01)

(52) U.S. Cl. ........................ 380/210; 380/201; 380/202; 380/203; 380/204; 380/205; 380/206; 380/207; 380/208; 380/209; 380/287

(58) Field of Classification Search ......... 380/200–210, 380/287, 53
See application file for complete search history.

(56) References Cited

U.S. PATENT DOCUMENTS

| | | | |
|---|---|---|---|
| 5,420,866 A | | 5/1995 | Wasilewski |
| 5,640,456 A | * | 6/1997 | Adams et al. ............... 713/153 |
| 5,787,171 A | * | 7/1998 | Kubota et al. ............... 380/239 |
| 5,917,915 A | * | 6/1999 | Hirose ......................... 380/228 |

(Continued)

FOREIGN PATENT DOCUMENTS

CA    2 354 351    7/2002

(Continued)

OTHER PUBLICATIONS

Spanos, G.A. et al., "Performance Study of a Selective Encryption Scheme for the Security of Networked, Real-Time Video," IEEE, 1995, p. 2-10.*

(Continued)

*Primary Examiner*—Emmanuel L Moise
*Assistant Examiner*—Michael Pyzocha

(57) ABSTRACT

A reception apparatus includes: a reception unit for receiving the scrambled content, the scrambled content being scrambled so that a predetermined unit of scrambled content is descrambled using a descrambling key corresponding to the predetermined unit of scrambled content, and at least one piece of storage information in which a list including all descrambling keys used for descrambling the scrambled content is embedded; storage unit for storing the received scrambled content and the storage information; list extraction unit for extracting the list from the stored storage information; descramble processing unit for extracting the predetermined unit of scrambled content from the stored scrambled content, extracting a descrambling key corresponding to the predetermined unit of scrambled content from the extracted list, and descrambling the extracted predetermined unit of scrambled content using the extracted descrambling key; and reproduction unit for reproducing the predetermined unit of descrambled content in the descrambled order.

19 Claims, 46 Drawing Sheets

U.S. PATENT DOCUMENTS

| | | | |
|---|---|---|---|
| 6,057,832 A * | 5/2000 | Lev et al. | 715/720 |
| 6,148,082 A | 11/2000 | Slattery et al. | |
| 6,219,422 B1 * | 4/2001 | Sato | 380/240 |
| 6,314,188 B1 * | 11/2001 | Ishibashi | 380/201 |
| 6,415,031 B1 * | 7/2002 | Colligan et al. | 380/200 |
| 6,463,155 B1 * | 10/2002 | Akiyama et al. | 380/278 |
| 6,487,720 B1 * | 11/2002 | Ohishi | 725/31 |
| 6,792,000 B1 * | 9/2004 | Morinaga et al. | 370/473 |
| 6,853,728 B1 * | 2/2005 | Kahn et al. | 380/239 |
| 6,920,222 B1 * | 7/2005 | Tsukahara et al. | 380/239 |
| 7,106,749 B1 * | 9/2006 | Darshan et al. | 370/395.64 |
| 7,242,772 B1 | 7/2007 | Tehranchi | 380/223 |
| 2001/0018741 A1 * | 8/2001 | Hogan | 713/189 |
| 2003/0133699 A1 * | 7/2003 | Ando et al. | 386/95 |

FOREIGN PATENT DOCUMENTS

| | | |
|---|---|---|
| EP | 0 903 886 | 3/1999 |
| EP | 1 187 483 | 3/2002 |
| EP | 1 215 905 A2 | 6/2002 |
| EP | 1 215 905 B1 | 5/2006 |
| JP | 8-340541 | 12/1996 |
| JP | 11-234647 | 8/1999 |
| JP | 11-340966 | 12/1999 |
| JP | 2000-381870 | 12/2000 |
| JP | 2001-189914 | 7/2001 |
| JP | 2002-14898 | 5/2002 |
| JP | 2002141898 | 5/2002 |
| WO | WO 98/24037 | 6/1998 |

OTHER PUBLICATIONS

Deputy Minister Responsible for Communication, French Republic, Ministry of Post, Telecommunications and Space, Ministry of Industry and Town Planning, Conditional Access System for the MAC/Packet Family: Eurocrypt, Mar. 1989, 4 pages with English translation.

* cited by examiner

FIG. 2

DATA STRUCTURE OF SCRAMBLING KEY LIST DESCRIPTOR

| CA_Ks_List_descriptor() { | |
|---|---|
|     descriptor_tag | 1 BYTE |
|     descriptor_length | 1 BYTE |
|     for(i=0; i <N; i++) { | |
|        Ks_id | 1 BYTE |
|        TS_packet_number | 2 BYTES |
|        Ks | 8 BYTES |
|     } | |
| } | |

Ks_id               :SCRAMBLING KEY IDENTIFIER
                     (TO IDENTIFY SCRAMBLING KEYS)
TS_packet_number :THE NUMBER OF TS PACKETS SCRAMBLED
                     WITH THE Ks
Ks                 :SCRAMBLING KEY

FIG. 7

SCRAMBLING KEY LIST

| Ks_id           | 1    |
| TS_packet_number | 100  |
| Ks              | Ks 1 |
| Ks_id           | 2    |
| TS_packet_number | 100  |
| Ks              | Ks 2 |
| Ks_id           | 3    |
| TS_packet_number | 100  |
| Ks              | Ks 3 |
| Ks_id           | 4    |
| TS_packet_number | 100  |
| Ks              | Ks 4 |

FIG. 21

SCRAMBLING KEY LIST

| Ks_id | 0 |
|---|---|
| Ks | Ks 1 |
| Ks_id | 1 |
| Ks | Ks 2 |
| Ks_id | 2 |
| Ks | Ks 3 |
| Ks_id | 3 |
| Ks | Ks 4 |
| Ks_id | 4 |
| Ks | Ks 5 |
| Ks_id | 5 |
| Ks | Ks 6 |
| Ks_id | 6 |
| Ks | Ks 7 |
| Ks_id | 7 |
| Ks | Ks 8 |
| Ks_id | 8 |
| Ks | Ks 9 |
| Ks_id | 9 |
| Ks | Ks 10 |
| Ks_id | 10 |
| Ks | Ks 11 |
| Ks_id | 11 |
| Ks | Ks 12 |
| Ks_id | 12 |
| Ks | Ks 13 |
| Ks_id | 13 |
| Ks | Ks 14 |
| Ks_id | 14 |
| Ks | Ks 15 |
| Ks_id | 15 |
| Ks | Ks 16 |

FIG. 28

DATA STRUCTURE OF SCRAMBLING KEY LIST GENERATION DESCRIPTOR

| CA_Ks_ListInfo_descriptor() { | |
|---|---|
| descriptor_tag | 1 BYTE |
| descriptor_length | 1 BYTE |
| Ks_id | 1 BYTE |
| TS_packet_number | 2 BYTES |
| Ks | 8 BYTES |
| } | |

Ks_id : SCRAMBLING KEY IDENTIFIER
(TO IDENTIFY SCRAMBLING KEYS)
TS_packet_number : THE NUMBER OF TS PACKETS SCRAMBLED WITH THE Ks
Ks : SCRAMBLING KEY

SCRAMBLING KEY LIST AT THE TIMING OF ① IN FIG. 39

| Ks_id | 1 |
| TS_packet_number | 3 |
| Ks | Kse 1 |
| Ks_id | 2 |
| TS_packet_number | — |
| Ks | Kso 1 |

UNDERLINED INFORMATION IS ADDED.

SCRAMBLING KEY LIST AT THE TIMING OF ③ IN FIG. 39

| Ks_id | 1 |
| TS_packet_number | 3 |
| Ks | Kse 1 |
| Ks_id | 2 |
| TS_packet_number | 4 |
| Ks | Kso 1 |
| Ks_id | 3 |
| TS_packet_number | — |
| Ks | Kse 2 |

AT THE TIMING OF ② IN FIG. 39, THE SCRAMBLING KEY LIST IS NOT UPDATED, BUT STORED ECM CHANGES AS FOLLOWS.

FIG. 46

DATA STRUCTURE OF I PICTURE LIST DESCRIPTOR

```
for(i=0; i<N; i++) {
  Ipic_id              2 BYTES
  first_packet_position 2 BYTES
  last_packet_position  2 BYTES
}
```

Ipic_id : I PICTURE IDENTIFIER (TO IDENTIFY I PICTURES)
first_packet_position : THE FIRST PACKET POSITION OF THE I PICTURE
(THE NUMBER OF TS PACKETS COUNTED FROM THE BEGINNING OF THE FILE)
last_packet_position : THE LAST PACKET POSITION OF THE I PICTURE
(THE NUMBER OF TS PACKETS COUNTED FROM THE BEGINNING OF THE FILE)

BROADCAST APPARATUS AND RECEPTION APPARATUS FOR PROVIDING A STORAGE SERVICE BY WHICH SCRAMBLED CONTENT IS STORED AND DESCRAMBLED USING SCRAMBLING KEY LIST

BACKGROUND OF THE INVENTION (1) Field of the Invention

The present invention relates to a storage service in the digital broadcast or the like, whereby received scrambled content is stored and then descrambled as required. More specifically, the present invention relates to technology for improving performance of the service in some particular reproduction modes.

(2) Description of the Related Art

In the current pay satellite digital broadcast system, a viewer contracts with a broadcast provider to pay some amount of charges to the broadcast provider for viewing programs on selected channels.

Since a broadcasting satellite broadcasts on a number of channels, programs on the channels for which a viewer does not make subscribing contracts are also broadcast to the viewer. The receiver owned by the viewer, then, confirms the presence/absence of the subscribing contract for each channel and receives only programs on the channels allowed to be viewed. Such technology for selecting channels to receive programs thereon is called Conditional Access (abbreviated as "CA").

On the other hand, the transmitter scrambles content including audio and visual data of a pay broadcast program to be broadcast one each channel, where content per predetermined unit is scrambled with a scrambling key different for each predetermined unit of contents. The transmitter, then, sequentially transmits the scrambled content accompanied with an Entitlement Control Message (ECM) containing this scrambling key and the scrambling key for content in the successive predetermined unit. This ECM is encrypted so as to be interpreted only by the receivers owned by subscribers to the channel.

Note that the scrambling key used for scrambling data functions as a descrambling key as well for descrambling the data.

Each receiver comes with an IC card used for the receiver only, to which an identifying number associated with the subscriber is assigned. The IC card has a CPU and a memory within it to store contract conditions and software for executing CA processes. The data relating to the CA processes is completely digitized and contained in the IC card, which makes unauthorized viewing difficult and therefore provides high levels of security.

Meanwhile, the service called a "storage service" is scheduled to become operational targeted for those who have not yet subscribed to a channel so that, once storing scrambled content with ECM in the recording media in the receivers owned by them, they pay some amount of charges for viewing the content to become subscribers, which enables them to decode the ECMs so as to reproduce the stored scrambled content.

In such a service, when reproducing content in the normal reproduction mode, the receiver acquires content in the first predetermined unit, and decodes the accompanied ECM to extract the scrambling keys for content in the first and the second units. Then, the receiver descrambles the content in the first unit using the scrambling key exclusive to the content.

As for the content in the second unit or later, the receiver sequentially descrambles content in each unit using the scrambling key obtained in the process for the preceding unit.

However, when reproducing content by the storage service in the particular reproduction modes such as a fast-forward reproduction mode and a fast-reverse reproduction mode, the receiver cannot descramble content in each unit using the scrambling key obtained in the process for the preceding unit, because the order of the reproduction becomes different from that in the normal reproduction mode. Therefore, the receiver has to, each time acquiring content in a predetermined unit, decode the accompanied ECM to obtain a scrambling key and descramble the scrambled content using the key, which makes it difficult to realize a sufficient performance level of the particular reproduction modes, such as fast-forward speed.

SUMMARY OF THE INVENTION

The object of the invention is to provide a broadcast apparatus for offering a storage service, a method and a computer program for the same, a reception apparatus for offering the storage service, and a method and a computer program for the same, all of which improve performance of particular reproduction processes in the storage service.

The reception apparatus (hereafter called "reception apparatus A") for providing a storage service according to the invention is made up of: a reception unit for receiving the scrambled content, wherein the scrambled content is scrambled so that a predetermined unit of scrambled content, which is a portion of the scrambled content, is descrambled using a descrambling key corresponding to the predetermined unit of scrambled content, and at least one piece of storage information in which a list including all descrambling keys to be used for descrambling the scrambled content is embedded; a storage unit for storing the received scrambled content and the storage information; a list extraction unit for extracting the list from the stored storage information; a descramble processing unit for (a) extracting the predetermined unit of scrambled content from the stored scrambled content, (b) extracting a descrambling key corresponding to the predetermined unit of scrambled content from the extracted list, and (c) descrambling the extracted predetermined unit of scrambled content using the extracted descrambling key; and a reproduction unit for reproducing the predetermined unit of descrambled content in the descrambled order.

With this construction, the storage information in which the list of the descrambling keys is embedded and the scrambled content can be received and stored. As a result, when reproducing the stored scrambled content, a descrambling key required for descrambling scrambled content in the predetermined unit can be extracted from the list.

Therefore, the extraction of the descrambling key can be executed in a short time and at low load, which improves the performance of particular reproduction processes, such as fast forward speed, to a sufficient level.

In the above reception apparatus, the reception unit receives one piece of storage information in which the list is embedded, the storage unit stores the received scrambled content and the one piece of storage information, and the list extraction unit extracts the list from the stored one piece of storage information.

With this construction, the reception apparatus can receive and store a piece of storage information in which the list of descrambling keys is embedded and extract the list from the stored one piece of storage information.

In the above reception apparatus, the reception unit receives a plurality of pieces of storage information in each piece of which a divided portion of the list is embedded, the storage unit stores the received scrambled content and the plurality of pieces of storage information, and the list extraction unit extracts the list from the stored plurality of pieces of storage information.

With this construction, the reception apparatus can receive and store the plurality of pieces of storage ECM, in each piece of which a divided portion of the list of descrambling keys is embedded, and extract the list from the stored plurality of pieces of storage information.

In the above reception apparatus, the reception unit sequentially receives a transport stream (TS) packet including the predetermined unit of scrambled content, the storage unit sequentially stores the received TS packet, wherein the descramble processing unit includes: a scrambled content extraction unit for extracting the predetermined unit of scrambled content from one of the TS packets stored in the storage unit, and counting the ordinal position of the TS packet from the leading TS packet; a descrambling key extraction unit for extracting a descrambling key from the list, based on the counted ordinal position; and a descrambling unit for descrambling the extracted predetermined unit of scrambled content using the extracted descrambling key.

With this construction, the reception apparatus counts the number of TS packets from the leading TS packet, and can easily extract a descrambling key from the list, based on the counted number of TS packets.

In the above reception apparatus A, the reception unit receives at least one storage Entitlement Control Message (ECM) as the at least one piece of storage information, the list being embedded in a portion to be encoded in the main body of the ECM, the storage unit stores the received storage ECMs, and the list extraction unit interprets the stored storage ECMs to extract the list (hereafter called "reception apparatus B").

With this construction, the reception apparatus can receive and store the storage ECM, where the list is embedded in a portion to be encoded in a main body of the ECM, and interpret the stored storage ECM to extract the list. Therefore, the invention can be realized according to the current standard.

In the above reception apparatus B, the reception unit receives the storage ECMs including identifying information for distinguishing the storage ECMs from another type of ECM.

With this construction, the storage ECMs can be easily distinguished from another type of ECM, because the storage ECMs include identifying information.

In the above reception apparatus B, the reception unit receives the storage ECMs at a time.

With this construction, the storage ECMs can be transmitted at a time. As a result, a load necessary to control the transmission timing by the broadcast apparatus can be reduced.

In the above reception apparatus A, the reception unit sequentially receives a TS packet including (a) the predetermined unit of scrambled content and (b) packet specifying information for specifying an unscrambled TS packet, and the storage unit sequentially stores the received TS packet, wherein the descramble processing unit includes: a scrambled content extraction unit for extracting the predetermined unit of scrambled content and the packet specifying information from one of the TS packets stored in the storage unit; a descrambling key extraction unit for extracting a descrambling key from the list, based on the extracted packet specifying information; and a descrambling unit for descrambling the extracted predetermined unit of scrambled content using the extracted descrambling key.

With this construction, the descrambling key can be easily extracted from the list, based on the packet specifying information.

In the above reception apparatus, the packet specifying information is one of Continuity Counter (CC), the number of TS packets, a cumulative amount of data, a relative reproduction time, and a scrambling key identifier, the scrambled content extraction unit extracts, as the packet specifying information, one of the Continuity Counter (CC), the number of TS packets, the cumulative amount of data, the relative reproduction time, and the scrambling key identifier, and the descrambling key extraction unit performs a predetermined operation to the extracted information as the packet identifying information to generate a descrambling key identifier, and extracts a descrambling key from the list based on the descrambling key identifier.

With this construction, the descrambling key identifier is generated by performing the predetermined operation to one of the CC, the number of TS packets, the cumulative amount of data, the relative reproduction time, and the scrambling key identifier. As compared with the case where the value of one of the above-stated information is set at the value of the descrambling key identifier, the value of the descrambling key identifier becomes difficult to be analyzed by malicious users, which improves the security. In addition, the above-stated information used in the current standard also can be used, and other information which would lead to increase in the amount of transmitted data does not need to be attached to extract the descrambling key.

In the above reception apparatus A, the reception unit sequentially receives a TS packet including (a) the predetermined unit of scrambled content and (b) unscrambled I picture information, wherein the I picture information indicates whether the TS packet corresponding to the information consists of a portion of an I picture/an I picture or not, and the storage unit sequentially stores the received TS packet, wherein the descramble processing unit includes: a scrambled content extraction unit for, when performing particular reproduction processes, extracting the predetermined unit of scrambled content and I picture information from one of the TS packets stored in the storage unit; an I picture judgement unit for judging whether the extracted predetermined unit of scrambled content consists of a portion of an I picture/an I picture or not, based on the extracted I picture information; a descrambling key extraction unit for extracting a descrambling key from the list, only when the extracted predetermined unit of scrambled content consists of a portion of an I picture/an I picture; and a descrambling unit for descrambling the extracted predetermined unit of scrambled content using the extracted descrambling key.

With this construction, the reception apparatus can reproduce I pictures only. As a result, particular reproduction processes such as fast forward reproduction can be easily conducted.

The above reception apparatus A further managing contract information and consisting of a security module whose portion does not effectively function if a contract has not been made, and other modules, the reception apparatus is further made up of: a list holding unit for holding the list extracted by the list extraction unit, wherein the list extraction unit and the list holding unit are provided within the security module.

With this construction, the list can be stored within the security module, which prevents the list from being analyzed by malicious users, and therefore improves the security.

Another reception apparatus (hereafter called "reception apparatus C") for providing a storage service according to the invention is made up of: a reception unit for receiving the scrambled content, wherein the scrambled content is scrambled so that a predetermined unit of scrambled content, which is a portion of the scrambled content, is descrambled using a descrambling key corresponding to the predetermined unit of scrambled content, and a descrambling key is attached to each predetermined unit of scrambled content; a storage unit for storing the received scrambled content; a list generation unit for, when/after storing the received scrambled content by the storage unit, generating a list including all descrambling keys to be used for descrambling the scrambled content, based on the descrambling key attached to each predetermined unit of scrambled content; a descramble processing unit for (a) extracting the predetermined unit of scrambled content from the stored scrambled content, (b) extracting a descrambling key corresponding to the extracted predetermined unit of scrambled content from the generated list, and (c) descrambling the extracted predetermined unit of scrambled content using the extracted descrambling key; and a reproduction unit for reproducing the predetermined unit of descrambled content in the descrambled order.

With this construction, the reception apparatus can receive and store the scrambled content, while generating and holding the list of the descrambling keys. As a result, when reproducing the stored scrambled content, a descrambling key required for descrambling the predetermined unit of scrambled content can be extracted from the list.

Therefore, the extraction of the descrambling key can be executed in a short time and at low load, which improves the performance of particular reproduction processes, such as fast forward speed, to a sufficient level.

In the above reception apparatus C, the reception unit sequentially receives a TS packet including (a) the predetermined unit of scrambled content, and (b) auxiliary information including a descrambling key and information for associating the descrambling key with scrambled content, the storage unit sequentially stores the received TS packet, and the list generation unit generates the list, based on the auxiliary information.

With this construction, the list can be easily generated based on the auxiliary information.

In the above reception apparatus, the TS packet includes an ECM, the auxiliary information being embedded in a portion to be encoded in a main body of the ECM, and the list generation unit extracts the auxiliary information embedded in the ECM, and generates the list based on the auxiliary information.

With this construction, the reception apparatus can receive and store the ECM, where the auxiliary information is embedded in the portion to be encoded in the main body of the ECM, and can interpret the stored ECM to generate the list. As a result, the present invention can be realized according to the current standard.

A broadcast apparatus (hereafter called "broadcast apparatus A") for providing a storage service according to the invention is made up of: an acquisition unit for acquiring content to be scrambled and a plurality of descrambling keys; a scramble processing unit for scrambling a predetermined unit of content out of the acquired content so that the predetermined unit of scrambled content is descrambled using a descrambling key different for each predetermined unit or each set of a plurality of predetermined units; an attaching unit for attaching auxiliary information to the predetermined unit of scrambled content, the auxiliary information consisting of (a) information for identifying the scrambled content and (b) a descrambling key corresponding to the content, and used for having the reception apparatus generate a list of the descrambling keys; and a broadcast unit for broadcasting the scrambled content to which the auxiliary information is added.

With this construction, the auxiliary information used for having the reception apparatus generate the list of the descrambling keys can be attached to the scrambled content. As a result, the reception apparatus can easily generate the list of the descrambling keys.

Therefore, the extraction of the descrambling key by the reception apparatus can be executed in a short time and at low load, which improves the performance of particular reproduction processes, such as fast forward speed, to a sufficient level.

In the above broadcast apparatus A, the attaching unit embeds the auxiliary information in a portion to be encoded in a main body of an ECM and attaches the ECM to the predetermined unit of scrambled content.

With this construction, the broadcast apparatus can attach the ECM to the scrambled content, where the auxiliary information is embedded in the portion to be encoded in the main body of the ECM. As a result, the present invention can be realized according to the current standard.

Another broadcast apparatus (hereafter called "broadcast apparatus B") for providing a storage service, according to the invention, is made up of: an acquisition unit for acquiring content to be scrambled and a plurality of descrambling keys; a list generation unit for generating a list of the descrambling keys; an embedding unit for embedding the list in at least one piece of predetermined information to generate at least one piece of storage information; a scramble processing unit for scrambling a predetermined unit of content out of the acquired content so that the predetermined unit of scrambled content is descrambled using a descrambling key different for each predetermined unit or each set of a plurality of predetermined units; and a broadcast unit for broadcasting the generated storage information and the scrambled content.

With this construction, the broadcast apparatus can broadcast the storage information in which the list of the descrambling keys is embedded, together with the scrambled content.

Therefore, the extraction of the descrambling key by the reception apparatus can be executed in a short time and at low load, which improves the performance of particular reproduction processes, such as fast forward speed, to a sufficient level.

In the above broadcast apparatus B, the embedding unit embeds the list in one piece of predetermined information to generate one piece of storage information, and the broadcasting unit broadcasts the generated one piece of information and the scrambled content.

With this construction, the broadcast apparatus can generate and broadcast a piece of storage information in which the list of all descrambling keys is embedded.

In the above broadcast apparatus B, the embedding unit embeds a divided portion of the list in each of a plurality of pieces of predetermined information to generate a plurality of pieces of storage information, and the broadcasting unit broadcasts the generated plurality of pieces of storage information and the scrambled content.

With this construction, the broadcast apparatus can generate and broadcast a plurality of pieces of storage information in each piece of which a divided portion of the list of descrambling keys is embedded.

In the above broadcast apparatus B, the embedding unit embeds the list in a portion to be encoded in a main body of at least one ECM to generate at least one piece of storage information.

With this construction, the broadcast apparatus can attach the ECM to the scrambled content, where the list is embedded in the portion to be encoded in the main body of the ECM. As a result, the present invention can be realized according to the current standard.

In the above broadcast apparatus B, the broadcast unit broadcasts one set of the storage information while all the scrambled content corresponding to the storage information are broadcast once.

This construction can save the amount of data transmitted.

A program used for a reception apparatus for providing a storage service according to the invention has the reception apparatus conduct the following steps of: a reception step for receiving the scrambled content, wherein the scrambled content is scrambled so that a predetermined unit of scrambled content, which is a portion of the scrambled content, is descrambled using a descrambling key corresponding to the predetermined unit of scrambled content, and at least one piece of storage information in which a list including all descrambling keys to be used for descrambling the scrambled content is embedded; a storage step for storing the received scrambled content and the storage information; a list extraction step for extracting the list from the stored storage information; a descramble processing step for (a) extracting the predetermined unit of scrambled content from the stored scrambled content, (b) extracting a descrambling key corresponding to the predetermined unit of scrambled content from the extracted list, and (c) descrambling the extracted predetermined unit of scrambled content using the extracted descrambling key; and a reproduction step for reproducing the predetermined unit of descrambled content in the descrambled order.

With this construction, the storage information in which the list of the descrambling keys is embedded and the scrambled content can be received and stored. As a result, when reproducing the stored scrambled content, a descrambling key required for descrambling scrambled content in the predetermined unit can be extracted from the list.

Therefore, the extraction of the descrambling key can be executed in a short time and at low load, which improves the performance of particular reproduction processes, such as fast forward speed, to a sufficient level.

Another program according to the invention has a reception apparatus for providing a storage service conduct the following steps of: a reception step for receiving the scrambled content, wherein the scrambled content is scrambled so that a predetermined unit of scrambled content, which is a portion of the scrambled content, is descrambled using a descrambling key corresponding to the predetermined unit of scrambled content, and a descrambling key is attached to each predetermined unit of scrambled content; a storage step for storing the received scrambled content; a list generation step for, when/after storing the received scrambled content in the storage step, generating a list including all descrambling keys to be used for descrambling the scrambled content, based on the descrambling key attached to each predetermined unit of scrambled content; a descramble processing step for (a) extracting the predetermined unit of scrambled content from the stored scrambled content, (b) extracting a descrambling key corresponding to the extracted predetermined unit of scrambled content from the generated list, and (c) descrambling the extracted predetermined unit of scrambled content using the extracted descrambling key; and a reproduction step for reproducing the predetermined unit of descrambled content in the descrambled order.

With this construction, the reception apparatus can receive and store the scrambled content, while generating and holding the list of the descrambling keys. As a result, when reproducing the stored scrambled content, a descrambling key required for descrambling the predetermined unit of scrambled content can be extracted from the list.

Therefore, the extraction of the descrambling key can be executed in a short time and at low load, which improves the performance of particular reproduction processes, such as fast forward speed, to a sufficient level.

A program used for a broadcast apparatus for providing a storage service according to the invention has the broadcast apparatus conduct the following steps of: an acquisition step for acquiring content to be scrambled and a plurality of descrambling keys; a scramble processing step for scrambling a predetermined unit of content out of the acquired content so that the predetermined unit of scrambled content is descrambled using a descrambling key different for each predetermined unit or each set of a plurality of predetermined units; an attaching step for attaching auxiliary information to the predetermined unit of scrambled content, the auxiliary information consisting of (a) information for identifying the scrambled content and (b) a descrambling key corresponding to the content, and used for having the reception apparatus generate a list of the descrambling keys; and a broadcast step for broadcasting the scrambled content to which the auxiliary information is added.

With this construction, the auxiliary information used for having the reception apparatus generate the list of the descrambling keys can be attached to the scrambled content. As a result, the reception apparatus can easily generate the list of the descrambling keys.

Therefore, the extraction of the descrambling key by the reception apparatus can be executed in a short time and at low load, which improves the performance of particular reproduction processes, such as fast forward speed, to a sufficient level.

Another program according to the invention has a broadcast apparatus for providing a storage service conduct the following steps of: an acquisition step for acquiring content to be scrambled and a plurality of descrambling keys; a list generation step for generating a list of the descrambling keys; an embedding step for embedding the list in at least one piece of predetermined information to generate at least one piece of storage information; a scramble processing step for scrambling a predetermined unit of content out of the acquired content so that the predetermined unit of scrambled content is descrambled using a descrambling key different for each predetermined unit or each set of a plurality of predetermined units; and a broadcast step for broadcasting the generated storage information and the scrambled content.

With this construction, the broadcast apparatus can broadcast the storage information in which the list of the descrambling keys is embedded, together with the scrambled content.

Therefore, the extraction of the descrambling key by the reception apparatus can be executed in a short time and at low load, which improves the performance of particular reproduction processes, such as fast forward speed, to a sufficient level.

A recording medium, according to the invention, on which a program used for a reception apparatus for providing a storage service is recorded, the program has the reception apparatus conduct the following steps of: a reception step for receiving the scrambled content, wherein the scrambled content is scrambled so that a predetermined unit of scrambled content, which is a portion of the scrambled content, is descrambled using a descrambling key corresponding to the predetermined unit of scrambled content, and at least one piece of storage information in which a list including all descrambling keys to be used for descrambling the scrambled content is embedded; a storage step for storing the received scrambled content and the storage information; a list extraction step for extracting the list from the stored storage information; a descramble processing step for (a) extracting the predetermined unit of scrambled content from the stored scrambled content, (b) extracting a descrambling key corresponding to the predetermined unit of scrambled content from the extracted list, and (c) descrambling the extracted predetermined unit of scrambled content using the extracted descrambling key; and a reproduction step for reproducing the predetermined unit of descrambled content in the descrambled order.

With this construction, the storage information in which the list of the descrambling keys is embedded and the scrambled content can be received and stored. As a result, when reproducing the stored scrambled content, a descrambling key required for descrambling scrambled content in the predetermined unit can be extracted from the list.

Therefore, the extraction of the descrambling key can be executed in a short time and at low load, which improves the performance of particular reproduction processes, such as fast forward speed, to a sufficient level.

Another recording medium, according to the invention, on which a program used for a reception apparatus for providing a storage service is recorded, the program has the reception apparatus conduct the following steps of: a reception step for receiving the scrambled content, wherein the scrambled content is scrambled so that a predetermined unit of scrambled content, which is a portion of the scrambled content, is descrambled using a descrambling key corresponding to the predetermined unit of scrambled content, and a descrambling key is attached to each predetermined unit of scrambled content; a storage step for storing the received scrambled content; a list generation step for, when/after storing the received scrambled content in the storage step, generating a list including all descrambling keys to be used for descrambling the scrambled content, based on the descrambling key attached to each predetermined unit of scrambled content; a descramble processing step for (a) extracting the predetermined unit of scrambled content from the stored scrambled content, (b) extracting a descrambling key corresponding to the extracted predetermined unit of scrambled content from the generated list, and (c) descrambling the extracted predetermined unit of scrambled content using the extracted descrambling key; and a reproduction step for reproducing the predetermined unit of descrambled content in the descrambled order.

With this construction, the reception apparatus can receive and store the scrambled content, while generating and holding the list of the descrambling keys. As a result, when reproducing the stored scrambled content, a descrambling key required for descrambling the predetermined unit of scrambled content can be extracted from the list.

Therefore, the extraction of the descrambling key can be executed in a short time and at low load, which improves the performance of particular reproduction processes, such as fast forward speed, to a sufficient level.

A recording medium, according to the invention, on which a program used for a broadcast apparatus for providing a storage service is recorded, the program has the broadcast apparatus conduct the following steps of: an acquisition step for acquiring content to be scrambled and a plurality of descrambling keys; a scramble processing step for scrambling a predetermined unit of content out of the acquired content so that the predetermined unit of scrambled content is descrambled using a descrambling key different for each predetermined unit or each set of a plurality of predetermined units; an attaching step for attaching auxiliary information to the predetermined unit of scrambled content, the auxiliary information consisting of (a) information for identifying the scrambled content and (b) a descrambling key corresponding to the content, and used for having the reception apparatus generate a list of the descrambling keys; and a broadcast step for broadcasting the scrambled content to which the auxiliary information is added.

With this construction, the auxiliary information used for having the reception apparatus generate the list of the descrambling keys can be attached to the scrambled content. As a result, the reception apparatus can easily generate the list of the descrambling keys.

Therefore, the extraction of the descrambling key by the reception apparatus can be executed in a short time and at low load, which improves the performance of particular reproduction processes, such as fast forward speed, to a sufficient level.

Another recording medium, according to the invention, on which a program used for a broadcast apparatus for providing a storage service is recorded, the program has the broadcast apparatus conduct the following steps of: an acquisition step for acquiring content to be scrambled and a plurality of descrambling keys; a list generation step for generating a list of the descrambling keys; an embedding step for embedding the list in at least one piece of predetermined information to generate at least one piece of storage information; a scramble processing step for scrambling a predetermined unit of content out of the acquired content so that the predetermined unit of scrambled content is descrambled using a descrambling key different for each predetermined unit or each set of a plurality of predetermined units; and a broadcast step for broadcasting the generated storage information and the scrambled content.

With this construction, the broadcast apparatus can broadcast the storage information in which the list of the descrambling keys is embedded, together with the scrambled content.

Therefore, the extraction of the descrambling key by the reception apparatus can be executed in a short time and at low load, which improves the performance of particular reproduction processes, such as fast forward speed, to a sufficient level.

A recording medium according to the invention on which content to be broadcast to a reception apparatus is recorded, the content are made up of: scrambled content which is scrambled so that a predetermined unit of scrambled content, which is a portion of the scrambled content, is descrambled using a descrambling key corresponding to the predetermined unit of content, and a storage ECM, wherein a list including all descrambling keys used for descrambling the scrambled content is embedded in a portion to be encoded in a main body of at least one ECM.

With this construction, the broadcast apparatus can broadcast the ECM, where the list including all descrambling keys is embedded in the portion to be encoded in the main body of the ECM. As a result, the extraction of the descrambling key by the reception apparatus receiving the content can be executed in a short time and at low load, which improves the performance of particular reproduction processes, such as fast forward speed, to a sufficient level.

A method for receiving a storage service according to the invention includes the steps of: a reception step for receiving the scrambled content, wherein the scrambled content is scrambled so that a predetermined unit of scrambled content, which is a portion of the scrambled content, is descrambled using a descrambling key corresponding to the predetermined unit of scrambled content, and at least one piece of storage information in which a list including all descrambling keys to be used for descrambling the scrambled content is embedded; a storage step for storing the received scrambled content and the storage information; a list extraction step for extracting the list from the stored storage information; a descramble processing step for (a) extracting the predetermined unit of scrambled content from the stored scrambled content, (b) extracting a descrambling key corresponding to the predetermined unit of scrambled content from the extracted list, and (c) descrambling the extracted predetermined unit of scrambled content using the extracted descrambling key; and a reproduction step for reproducing the predetermined unit of descrambled content in the descrambled order.

With this construction, the storage information in which the list of the descrambling keys is embedded and the scrambled content can be received and stored. As a result, when reproducing the stored scrambled content, a descrambling key required for descrambling scrambled content in the predetermined unit can be extracted from the list.

Therefore, the extraction of the descrambling key can be executed in a short time and at low load, which improves the performance of particular reproduction processes, such as fast forward speed, to a sufficient level.

Another method for receiving a storage service according to the invention includes the steps of: a reception step for receiving the scrambled content, wherein the scrambled content is scrambled so that a predetermined unit of scrambled content, which is a portion of the scrambled content, is descrambled using a descrambling key corresponding to the predetermined unit of scrambled content, and a descrambling key is attached to each predetermined unit of scrambled content; a storage step for storing the received scrambled content; a list generation step for, when/after storing the received scrambled content in the storage step, generating a list including all descrambling keys to be used for descrambling the scrambled content, based on the descrambling key attached to each predetermined unit of scrambled content; a descramble processing step for (a) extracting the predetermined unit of scrambled content from the stored scrambled content, (b) extracting a descrambling key corresponding to the extracted predetermined unit of scrambled content from the generated list, and (c) descrambling the extracted predetermined unit of scrambled content using the extracted descrambling key; and a reproduction step for reproducing the predetermined unit of descrambled content in the descrambled order.

With this construction, the reception apparatus can receive and store the scrambled content, while generating and holding the list of the descrambling keys. As a result, when reproducing the stored scrambled content, a descrambling key required for descrambling the predetermined unit of scrambled content can be extracted from the list.

Therefore, the extraction of the descrambling key can be executed in a short time and at low load, which improves the performance of particular reproduction processes, such as fast forward speed, to a sufficient level.

A method for broadcasting a storage service according to the invention includes the steps of: an acquisition step for acquiring content to be scrambled and a plurality of descrambling keys; a scramble processing step for scrambling a predetermined unit of content out of the acquired content so that the predetermined unit of scrambled content is descrambled using a descrambling key different for each predetermined unit or each set of a plurality of predetermined units; an attaching step for attaching auxiliary information to the predetermined unit of scrambled content, the auxiliary information consisting of (a) information for identifying the scrambled content and (b) a descrambling key corresponding to the content, and used for having the reception apparatus generate a list of the descrambling keys; and a broadcast step for broadcasting the scrambled content to which the auxiliary information is added.

With this construction, the auxiliary information used for having the reception apparatus generate the list of the descrambling keys can be attached to the scrambled content. As a result, the reception apparatus can easily generate the list of the descrambling keys.

Therefore, the extraction of the descrambling key by the reception apparatus can be executed in a short time and at low load, which improves the performance of particular reproduction processes, such as fast forward speed, to a sufficient level.

Another method for broadcasting a storage service according to the invention includes the steps of: an acquisition step for acquiring content to be scrambled and a plurality of descrambling keys; a list generation step for generating a list of the descrambling keys; an embedding step for embedding the list in at least one piece of predetermined information to generate at least one piece of storage information; a scramble processing step for scrambling a predetermined unit of content out of the acquired content so that the predetermined unit of scrambled content is descrambled using a descrambling key different for each predetermined unit or each set of a plurality of predetermined units; and a broadcast step for broadcasting the generated storage information and the scrambled content.

With this construction, the broadcast apparatus can broadcast the storage information in which the list of the descrambling keys is embedded, together with the scrambled content.

Therefore, the extraction of the descrambling key by the reception apparatus can be executed in a short time and at low load, which improves the performance of particular reproduction processes, such as fast forward speed, to a sufficient level.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 shows one example of the data structure of a scrambling key list descriptor;

FIG. 7 shows the scrambling key list associated with the TS shown in FIG. 6;

FIG. 21 shows the scrambling key list in the case the value of "CC mod 16" is set at the scrambling key identifier;

FIG. 28 shows one example of the data structure of the scrambling key list generation descriptor;

FIG. 46 shows one example of the data structure of an I picture list descriptor.

DESCRIPTION OF THE PREFERRED EMBODIMENT

First Embodiment

<Summary>

A system for providing a storage service according to the first embodiment of the invention consists of a broadcast apparatus, a reception apparatus, and a security module.

The broadcast apparatus generates a scrambling key list including all of the scrambling keys necessary for descrambling scrambled content, includes the list in an ECM for storage (hereafter called "storage ECM"), and broadcasts the scrambled content accompanied with the ECM.

The security module, which is integrated with the reception apparatus in a predetermined position, receives and stores the storage ECM and the scrambled content, decodes the ECM for storage in return for the paid charges, and sequentially descrambles the received scrambled content using the scrambling key list included in the storage ECM.

<Overall Construction>

Figure 1:
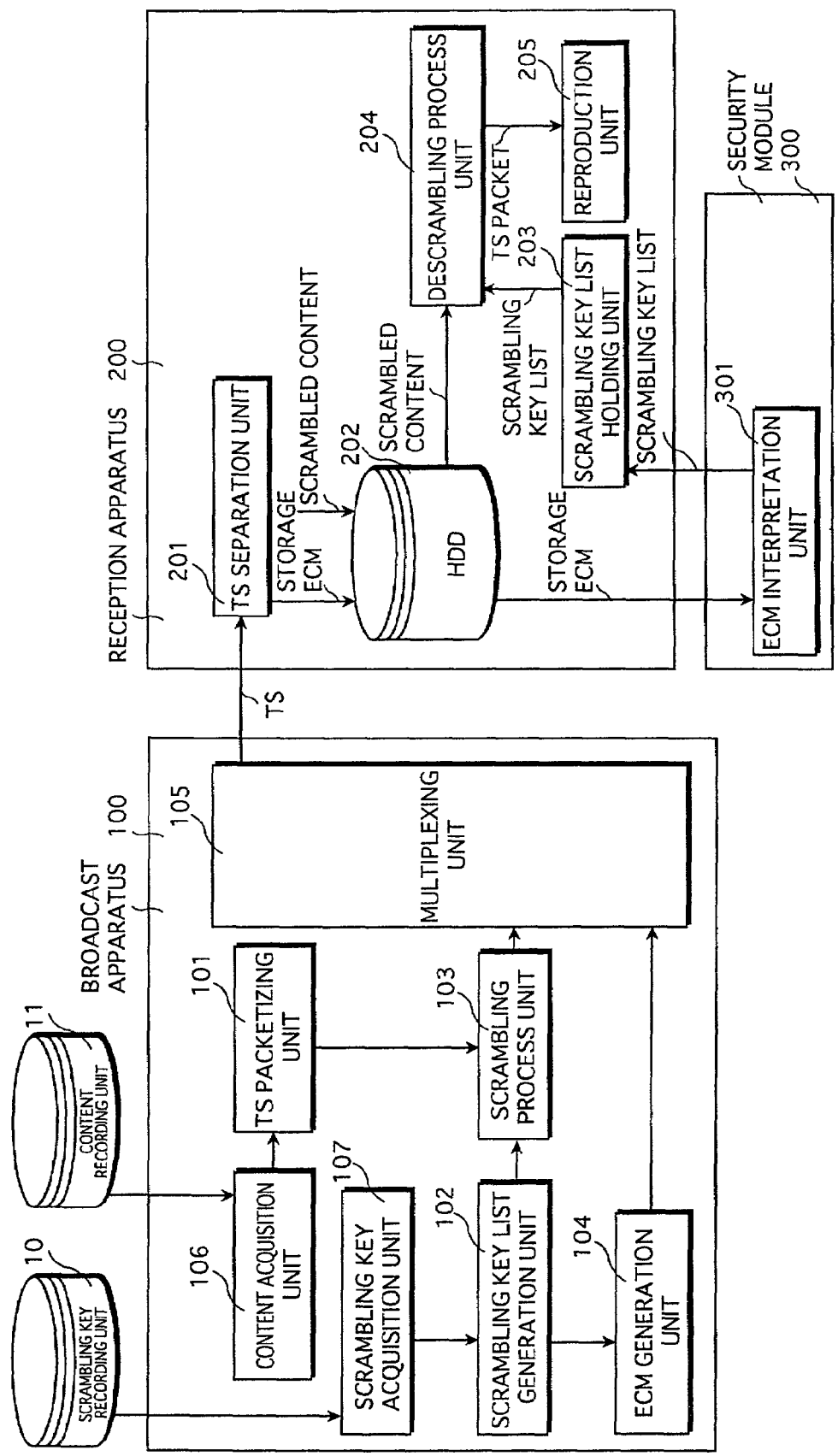
FIG. 1 is the construction of a system for providing a storage service according to the first embodiment of the invention.

FIG. 1 shows the construction of the system for providing a storage service according to the first embodiment of the invention. The system shown in FIG. 1 consists of a broadcast apparatus 100, a reception apparatus 200, and a security module 300.

Note that, in FIG. 1, a scrambling key recording unit 10 which records scrambling keys and a content recording unit 11 which records content are shown for explanation.

The security module 300 is a portable and intelligent recording medium such as an IC card. The security module 300 is set in a predetermined position of the reception apparatus 200 and used together with the reception apparatus 200.

(Construction of Broadcast Apparatus)

The broadcast apparatus 100 shown in FIG. 1 consists of a TS packetizing unit 101, a scrambling key list generation unit 102, a scrambling process unit 103, an ECM generation unit 104, a multiplexing unit 105, a content acquisition unit 106, and a scrambling key acquisition unit 107.

The content acquisition unit 106 acquires content including visual, audio, and text data recorded in the content recording unit 11.

The TS packetizing unit 101 converts the content acquired by the content acquisition unit 106 into transport stream (hereafter abbreviated as "TS") packets.

Note that the TS packet has the fixed length of 188 bytes as prescribed by the MPEG-2 standard.

The scrambling key acquisition unit 107 acquires scrambling keys recorded in the scrambling key recording unit 10.

The scrambling key list generation unit 102 generates a scrambling key list base on the scrambling keys acquired by the scrambling key acquisition unit 107.

Note that the scrambling key list is represented by scrambling key list descriptors, for example.

FIG. 2 shows one example of the data structure of a scrambling key list descriptor.

The scrambling key list descriptor shown in FIG. 2 includes a scrambling key identifier (Ks_id) for identifying a scrambling key, the scrambling key (Ks), and the number of TS packets to be scrambled with the scrambling key (TS_packet_number). In the list, the scrambling key identifiers(Ks_id), the scrambling keys (Ks), and the number of TS packets are described as much as the number of scrambling keys.

The scrambling process unit 103 scrambles the content converted into TS packets by the TS packetizing unit 101, based on the scrambling key list generated by the scrambling key list generation unit 102. The detailed description on the scrambling process unit 103 will be given later.

The ECM generation unit 104 generates ECMs for normal reproduction (hereafter called "normal reproduction ECM"), which are the same as in the conventional system, and also generates storage ECMs including the scrambling key list generated by the scrambling key list generation unit 102.

Note that the storage ECM is used for reproducing the stored scrambled content.

Figure 3:
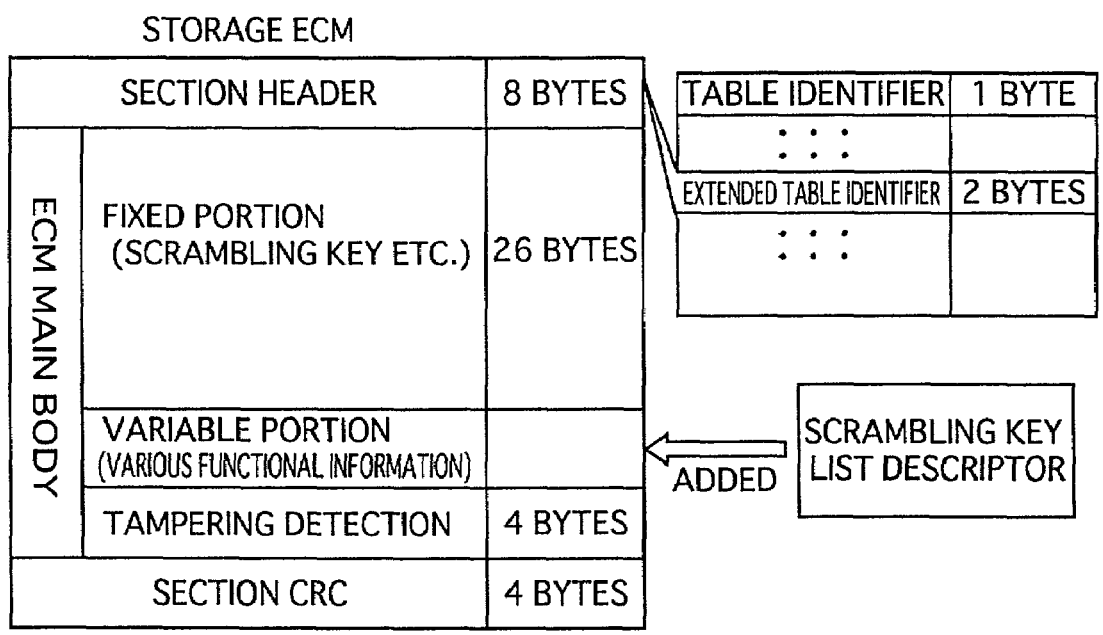
FIG. 3 shows one example of the data structure of an ECM for storage.

FIG. 3 shows one example of the data structure of a storage ECM.

The storage ECM shown in FIG. 3 is generated by adding the scrambling key list descriptor as described above to a variable portion (a target to be encoded) in the main body of the ECM as prescribed by the ARIB (The Association of Radio Industries and Businesses) standard.

In a storage ECM, information for distinguishing the storage ECM from a normal reproduction ECM is also embedded. For instance, different values may be set at the table identifiers described in the section header for the storage ECM and the normal reproduction ECM. Alternatively, different values may be set at the extended table identifiers for the both ECMs, while the same value being set at the table identifiers for them.

The multiplexing unit 105 attaches/attaches the generated normal reproduction ECM with/to the scrambled content, multiplexes it with a storage ECM to produce a TS, and broadcasts the TS.

The following describes transmission timing for the storage ECM.

Since one scrambling key list has only to be transmitted for each piece of scrambled content, the storage ECM may be transmitted in a time period longer than the transmission period for the conventional ECM.

Figure 4:
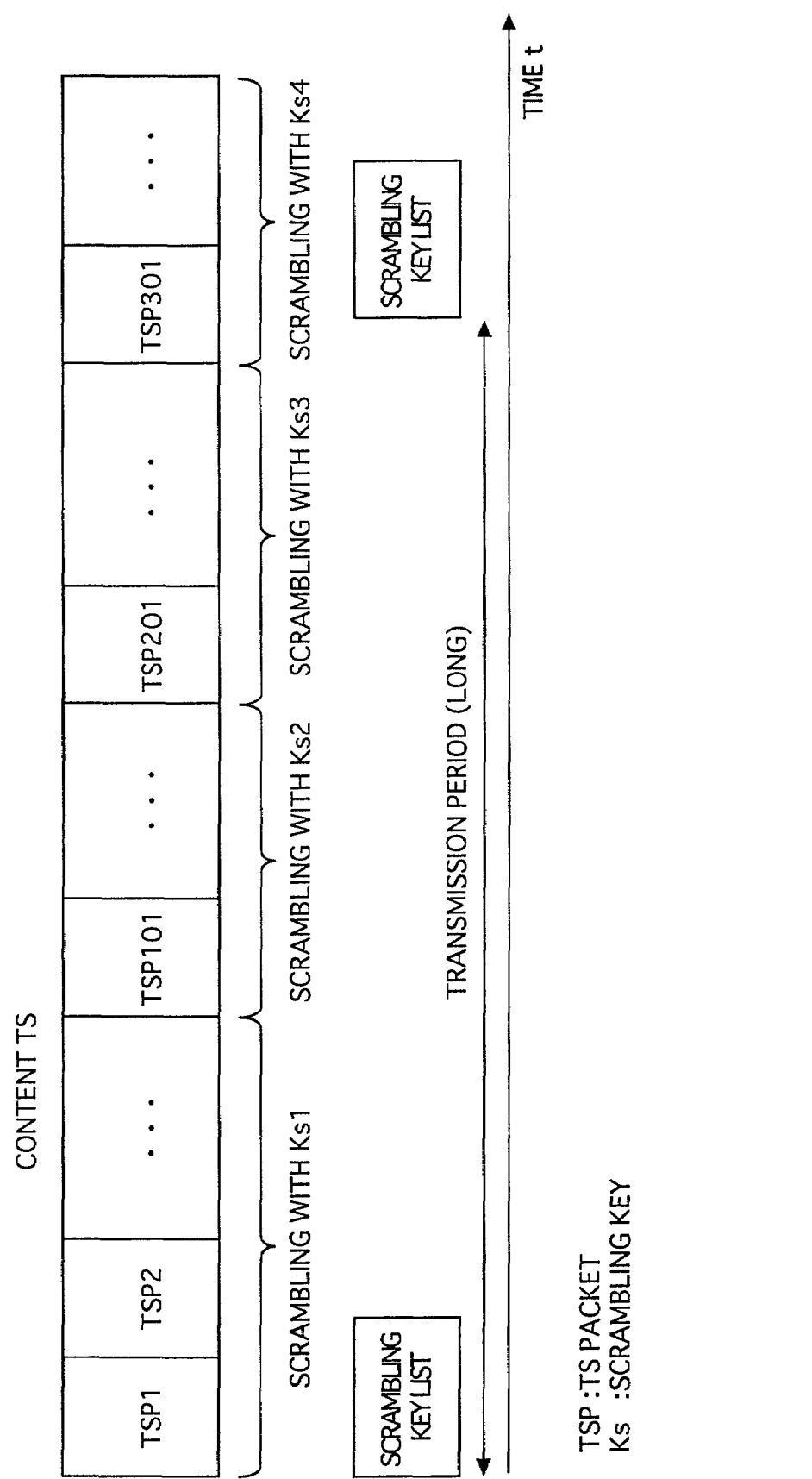
FIG. 4 shows timing for transmitting the scrambling key list.

FIG. 4 shows transmission timing for the scrambling key list.

As shown in FIG. 4, in the BS digital broadcasting system, the storage ECM may be transmitted in the time period approximately ten times as long as for the conventional ECM.

In the environment where ECMs can be securely stored without any reception errors and storage errors, one storage ECM has only to be transmitted while all of the scrambled content associated with the storage ECM have been transmitted once.

Figure 5:
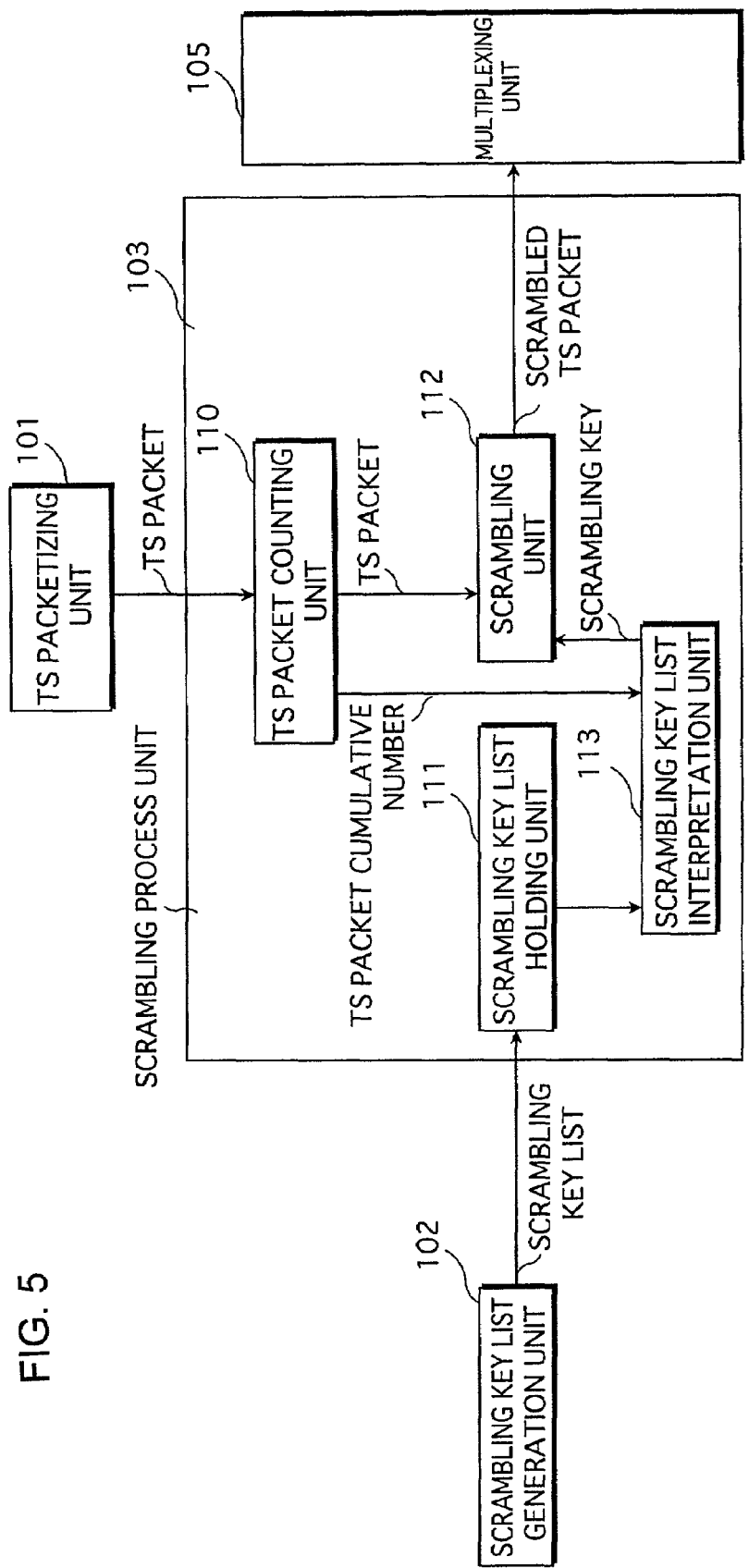
FIG. 5 shows the detailed construction of the scrambling process unit 103.

FIG. 5 shows the detailed construction of the scrambling process unit 103.

The scrambling process unit 103 shown in FIG. 5 consists of a TS packet counting unit 110, a scrambling key list holding unit 111, a scrambling unit 112, and a scrambling key list interpretation unit 113.

The TS packet counting unit 110 acquires the content converted into TS packets by the TS packetizing unit 101 one TS packet at a time and passes it to the scrambling unit 112. The TS packet counting unit 110 also counts the TS packet cumulative number indicating the ordinal position of the acquired TS packet counted from the beginning of the content, and passes the number to the scrambling key list interpretation unit 113. The TS packet counting unit 110 resets the TS packet cumulative number into zero when other content starts to be processed.

The scrambling key list holding unit 111 acquires the scrambling key list generated by the scrambling key list generation unit 102 and holds it therein.

The scrambling key list interpretation unit 113 extracts the scrambling key corresponding to the TS packet to be scrambled from the scrambling key list stored in the scrambling key list holding unit 111, based on the TS packet cumulative number passed from the TS packet counting unit 110, and passes the extracted key to the scrambling unit 112.

Figure 6:
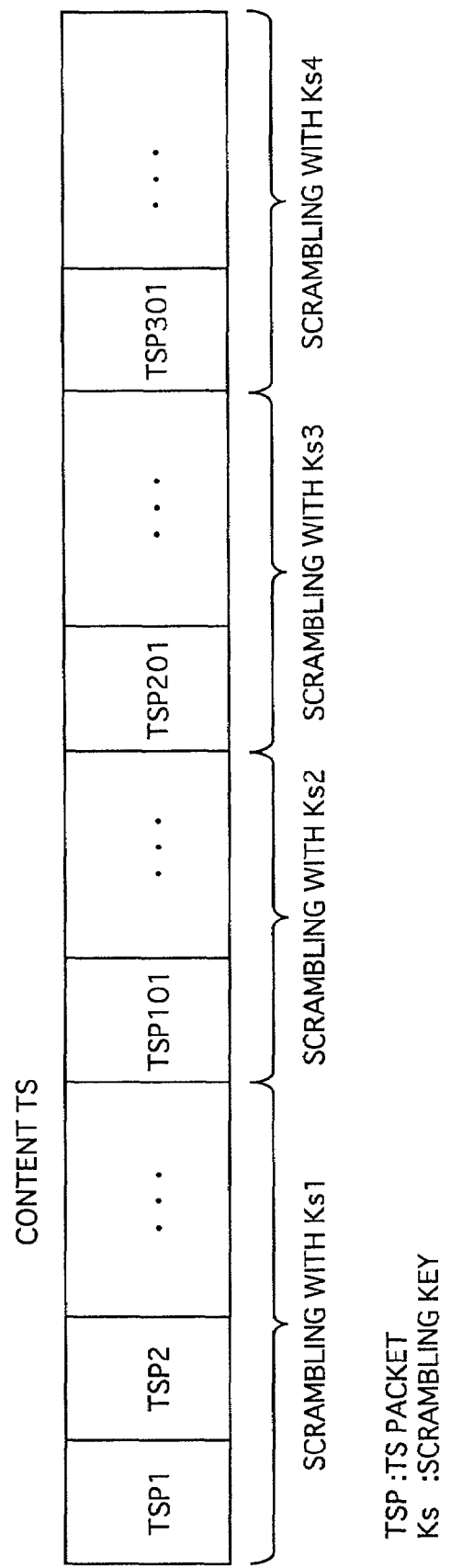
FIG. 6 shows a relation between content and scrambling keys in a transport stream (TS)

FIG. 6 shows a relation between content and scrambling keys in a TS.

As shown in FIG. 6, this TS consists of four hundreds of TS packets obtained by converting content to be scrambled. Scrambling keys are changed, every one hundred of TS packets.

FIG. 7 shows the scrambling key list associated with the TS shown in FIG. 6.

As shown in FIG. 7, in this scrambling key list, the scrambling key associated with the leading one hundreds of TS packets is Ks1, the scrambling key associated with the TS packets from the $101^{st}$ to $200^{th}$ is Ks2, the scrambling key associated with the TS packets from the $201^{st}$ to $300^{th}$ is Ks3, and the scrambling key associated with the TS packets from the $301^{st}$ to the $400^{th}$ is Ks 4.

The scrambling unit 112 scrambles one TS packet passed from the TS packet counting unit 110 using the scrambling key passed from the scrambling key list interpretation unit 113 and passes it to the multiplexing unit 105. The scrambling unit 112 repeats this process until all TS packets have been processed.

(Construction of Reception Apparatus and Security Module)

The reception apparatus 200 shown in FIG. 1 consists of a TS separation unit 201, an HDD 202, a scrambling key list holding unit 203, a descrambling process unit 204, and a reproduction unit 205.

The security module 300 shown in FIG. 1 is made up of an ECM interpretation unit 301.

The TS separation unit 201 receives a TS broadcast from the multiplexing unit 105, distinguishes between a normal reproduction ECM and a storage ECM based on the value of the table identifier or the extended table identifier, and separates the storage ECM and scrambled content.

The HDD 202 is a recording medium such as a hard disk drive. The HDD 202 stores the storage ECM and the scrambled content separated by the TS separation unit 201.

The ECM interpretation unit 301 extracts a scrambling key list from the storage ECM stored in the HDD 202.

The scrambling key list holding unit 203 holds the scrambling key list extracted by the ECM interpretation unit 301.

The descrambling process unit 204 descrambles the scrambled content stored in the HDD 202 based on the scrambling key list held by the scrambling key list holding unit 203 and passes it to the reproduction unit 205. Detailed description on the descrambling process unit 204 will be given later.

The reproduction unit 205 reproduces the descrambled content.

Figure 8:
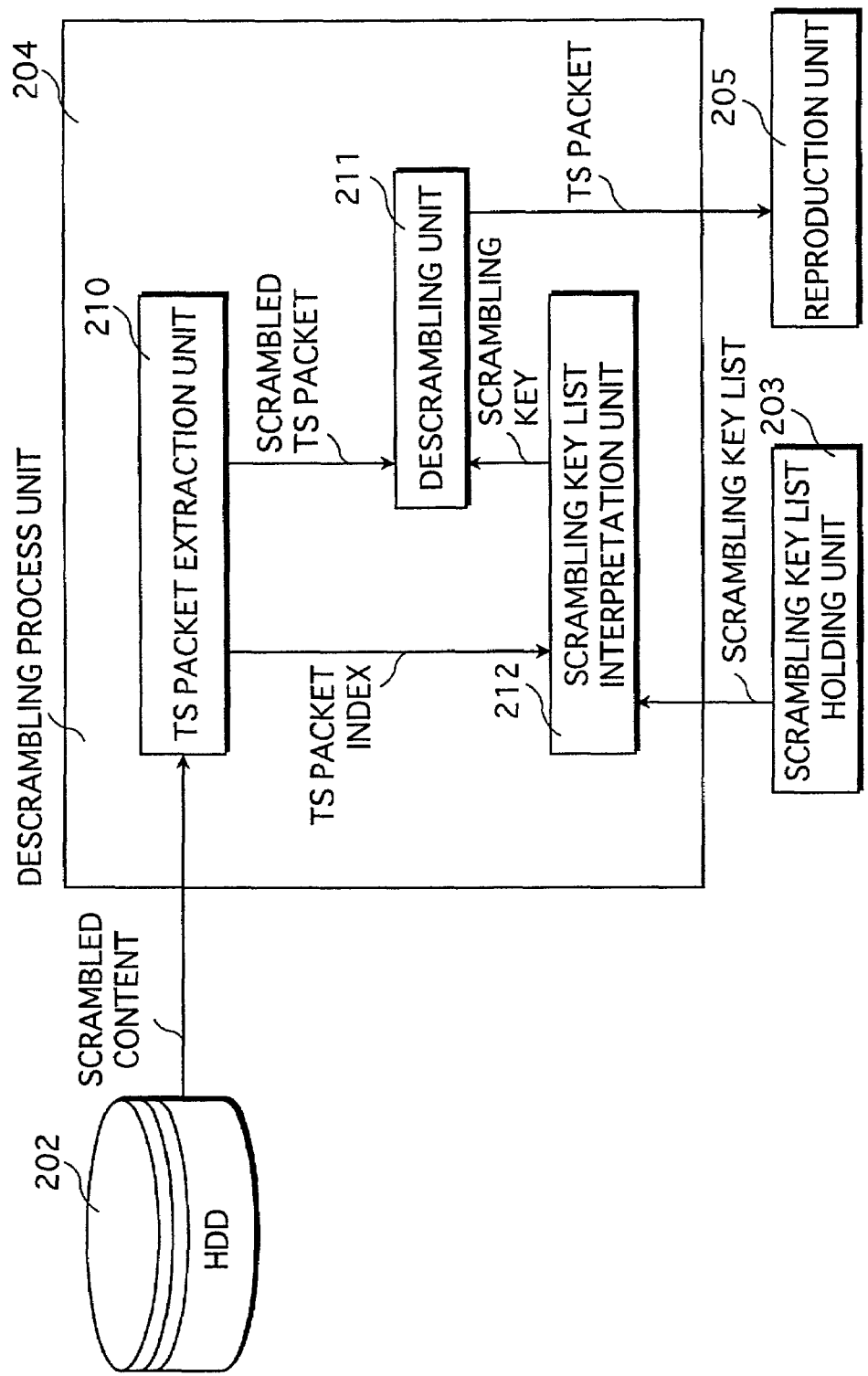
FIG. 8 shows the detailed construction of the descrambling process unit 204.

FIG. 8 shows the detailed construction of the descrambling process unit 204.

The descrambling process unit 204 shown in FIG. 8 is made up of a TS packet extraction unit 210, a descrambling unit 211, and a scrambling key list interpretation unit 212.

The TS packet extraction unit 210 extracts the scrambled content stored in the HDD 202 one TS packet at a time to pass it to the descrambling unit 211. Also, the TS packet extraction unit 210 counts the TS packet index indicating shows the ordinal position of the extracted TS packet counted from the beginning of the content and passes the index to the scrambling key list interpretation unit 212. Here, the TS packet extraction unit 210 resets the TS packet index into zero when other content start to be processed.

The scrambling key list interpretation unit 212 extracts the scrambling key corresponding to the TS packet index passed from the TS packet extraction unit 210 from the scrambling key list held by the scrambling key list holding unit 203 and passes it to the descrambling unit 211.

The descrambling unit 211 descrambles one TS packet passed from the TS packet extraction unit 210 using the scrambling key extracted by the scrambling key list interpretation unit 212 and passes it to the reproduction unit 205. The descrambling unit 211 repeats this process until all TS packets have been processed.

<Operations>

(Operations of Broadcast Apparatus)

Figure 9:
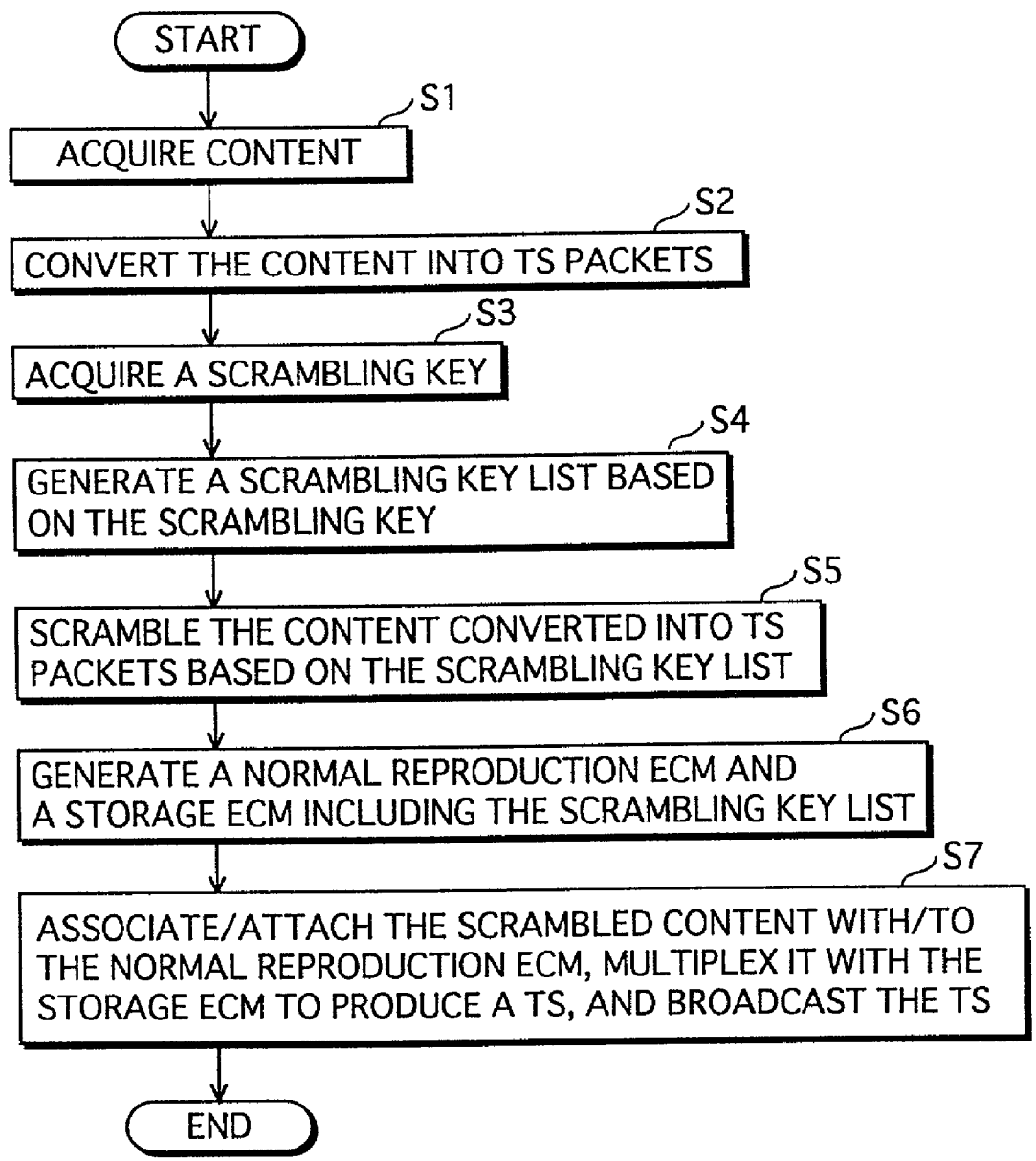
FIG. 9 shows a procedure in the broadcasting process by means of the broadcast apparatus 100 according to the first embodiment of the invention.

FIG. 9 shows a procedure in the broadcasting process by means of the broadcast apparatus 100 according to the first embodiment of the invention.

Following describes the outline of the procedure with reference to FIG. 9.

(1) The content acquisition unit 106 acquires content such as image, sounds, and text data recorded in the content recording unit 11 (Step S1).

(2) The TS packetizing unit 101 converts the content acquired by the content acquisition unit 106 into TS packets (Step S2).

(3) The scrambling key acquisition unit 107 acquires the scrambling key recorded in the scrambling key recording unit 10 (Step S3).

(4) The scrambling key list generation unit 102 generates a scrambling key list based on the scrambling key acquired by the scrambling key acquisition unit 107 (Step S4).

(5) The scrambling process unit 103 scrambles the content converted into TS packets by the TS packetizing unit 101, based on the scrambling key list generated by the scrambling key list generation unit 102 (Step S5).

(6) The ECM generation unit 104 generates a normal reproduction ECM and generates a storage ECM including the scrambling key list generated by the scrambling key list generation unit 102 (Step S6).

(7) The multiplexing unit 105 associates/attaches the generated normal reproduction ECM to/with to the scrambled content, multiplexes it with the storage ECM to generate TS, and broadcasts the TS (Step S7).

Figure 10:
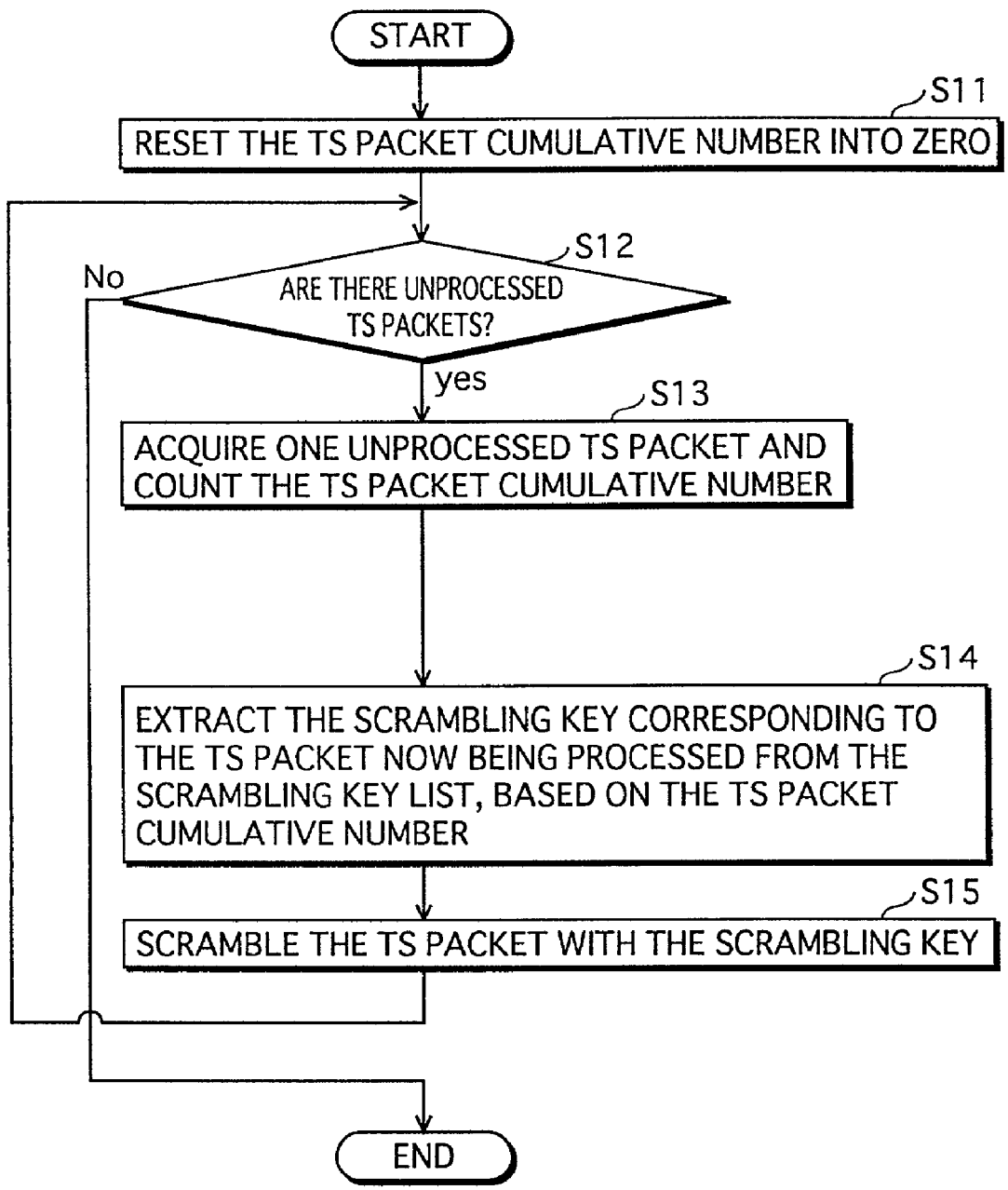
FIG. 10 shows a procedure in the scrambling process by means of the scrambling process unit 103 in detail.

FIG. 10 shows a procedure in the scrambling process by means of the scrambling process unit 103 in detail.

Following describes the outline of the detailed procedure in the scrambling process, with reference to FIG. 10.

(1) The TS packet counting unit 110 resets the TS packet cumulative number into zero (Step S11).

(2) The TS packet counting unit 110 judges whether there are unprocessed TS packets or not (Step S12). If there are no any unprocessed TS packets, the scrambling process ends.

(3) If there are unprocessed TS packets, the TS packet counting unit 110 acquires one unprocessed TS packet to pass it to the scrambling unit 112, and counts the TS packet cumulative number to pass it to the scrambling key list interpretation unit 113 (Step S13).

(4) The scrambling key list interpretation unit 113 extracts the scrambling key corresponding to the TS packet now being processed from the scrambling key list stored in the scrambling key list holding unit 111, based on the TS packet cumulative number passed from the TS packet counting unit 110 (Step S14).

(5) The scrambling unit 112 scrambles one TS packet passed from the TS packet counting unit 110 using the scrambling key passed from the scrambling key list interpretation unit 113 and passes it to the multiplexing unit 105. Then, the procedure returns upward to process the successive TS packet (Step S15).

(Operations of Reception Apparatus)

Figure 11:
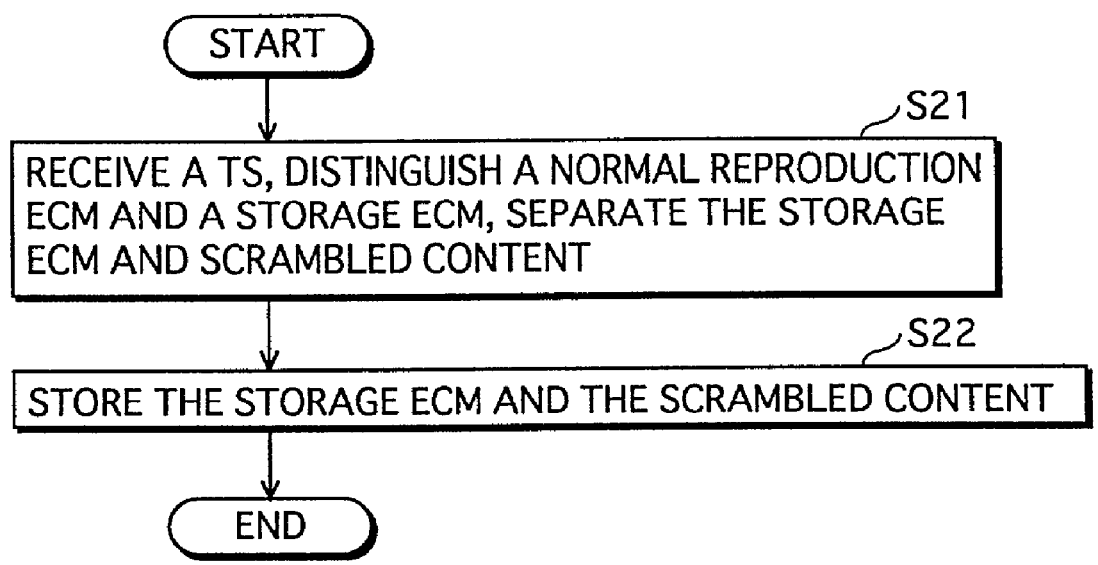
FIG. 11 shows a procedure in the reception and storage processes by means of the reception apparatus 200 and the security module 300 according to the first embodiment of the invention.

FIG. 11 shows a procedure in the reception and storage processes by means of the reception apparatus 200 and the security module 300 according to the first embodiment of the invention.

Following describes the outline of the processes with reference to FIG. 11.

(1) The TS separation unit 201 receives a TS broadcast from the multiplexing unit 105. Then, the TS separation unit 201 distinguishes a normal reproduction ECM and a storage ECM based on the value of the table identifier or the extended table identifier, and separates the storage ECM and scrambled content (Step S21).

(2) The HDD 202 stores the storage ECM and the scrambled content separated by the TS separation unit 201 (Step S22).

Note that, the storage ECM and the scrambled content may be separated not at this stage but later (e.g., before using them).

Figure 12:
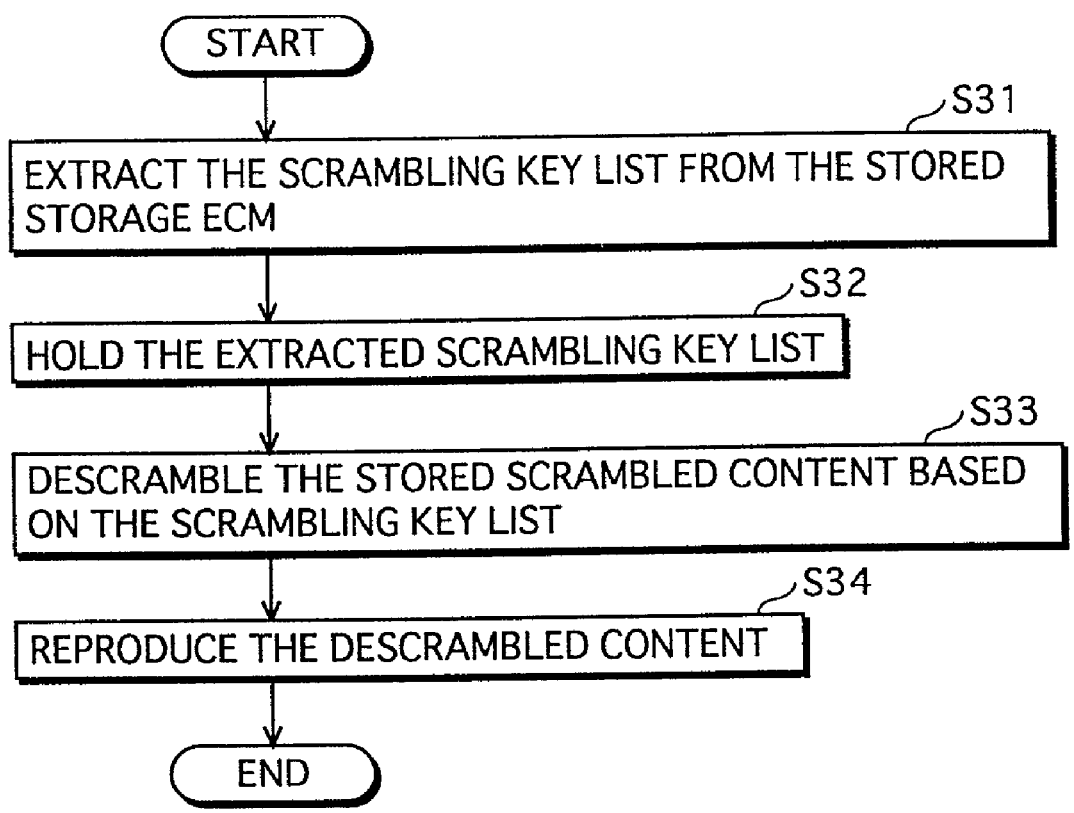
FIG. 12 shows a procedure in the reproduction process after the reception and storage processes by means of the reception apparatus 200 and the security module 300 according to the first embodiment of the invention.

FIG. 12 shows a procedure in the reproduction process after the reception and storage processes by means of the reception apparatus 200 and the security module 300 according to the first embodiment of the invention.

Following describes the outline of the procedure in the reproduction process, with reference to FIG. 12.

(1) The ECM interpretation unit 301 extracts the scrambling key list from the storage ECM stored in the HDD 202 (Step S31).

(2) The scrambling key list holding unit 203 holds the scrambling key list extracted by the ECM interpretation unit 301 (Step S32).

(3) The descrambling process unit 204 descrambles the scrambled content stored in the HDD 202 based on the scrambling key list held by the scrambling key list holding unit 203 and passes it to the reproduction unit 205 (Step S33).

(4) The reproduction unit 205 reproduces the descrambled content (Step S34).

Figure 13:
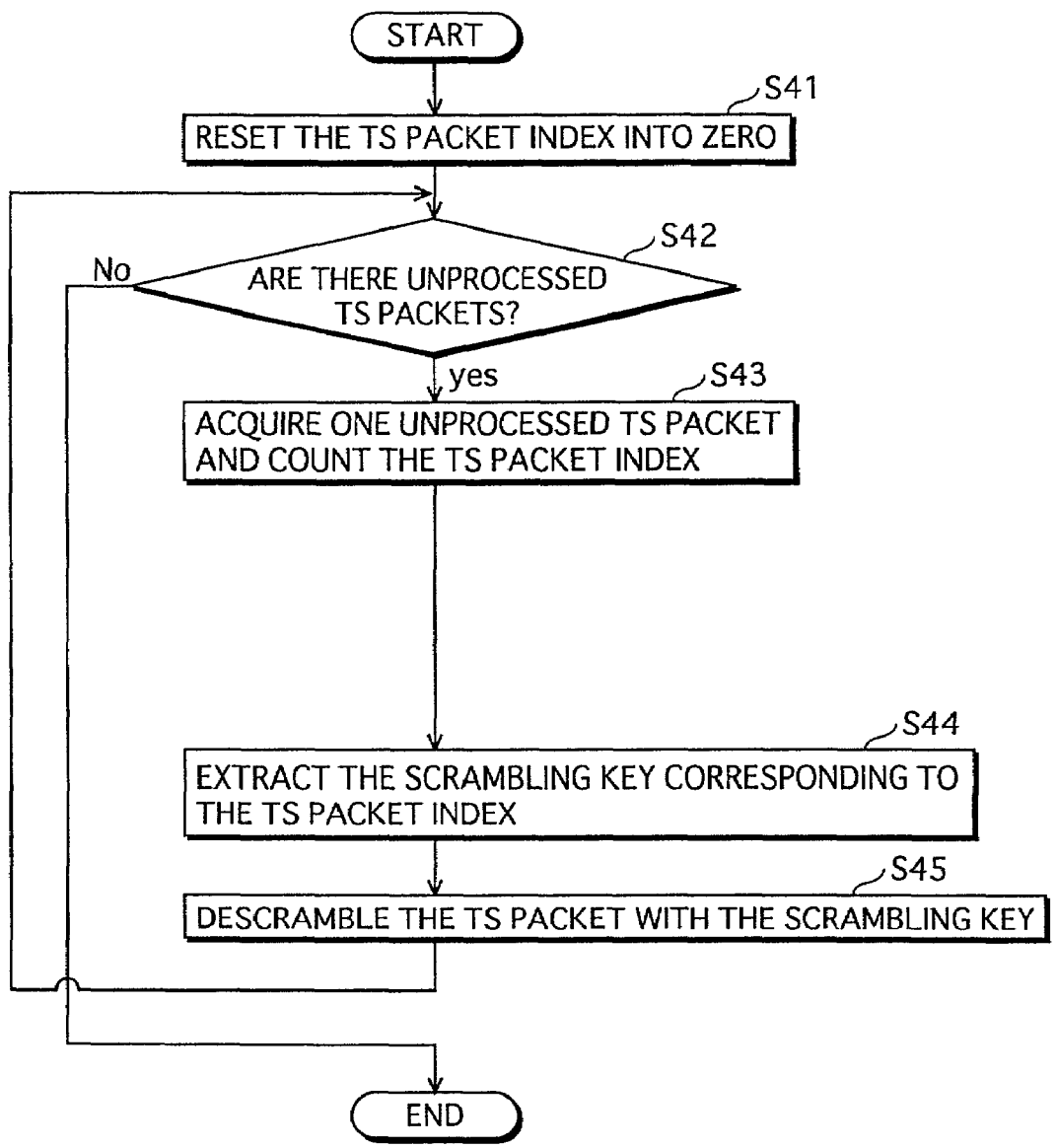
FIG. 13 shows a procedure in the descrambling process by means of the descrambling process unit 204 in detail.

FIG. 13 shows a procedure in the descrambling process by means of the descrambling process unit 204 in detail.

Following describes the outline of the detailed procedure in the descrambling process, with reference to FIG. 13.

(1) The TS packet extraction unit 210 resets the TS packet index into zero when other content starts to be processed (Step S41).

(2) The TS packet extraction unit 210 judges whether there are unprocessed TS packets or not (Step S42). If there are not any unprocessed TS packet, the descrambling process ends.

(3) If there are unprocessed TS packets, the TS packet extraction unit 210 extracts one unprocessed TS packet to pass it to the descrambling unit 211. Also, the TS packet extraction unit 210 counts the TS packet index to pass it to the scrambling key list interpretation unit 212 (Step S43).

(4) The scrambling key list interpretation unit 212 extracts the scrambling key corresponding to the TS packet index passed from the TS packet extraction unit 210, from the scrambling key list held by the scrambling key list holding unit 203, and passes it to the descrambling unit 211 (Step S44).

(5) The descrambling unit 211 descrambles one TS packet passed from the TS packet extraction unit 210 using the scrambling key extracted by the scrambling key list interpretation unit 212 and passes it to the reproduction unit 205. Then, the procedure returns upward to process the successive TS packet (Step S45).

Following describes the procedure of the particular reproduction process after the above-described reception and storage processes.

Figure 14:
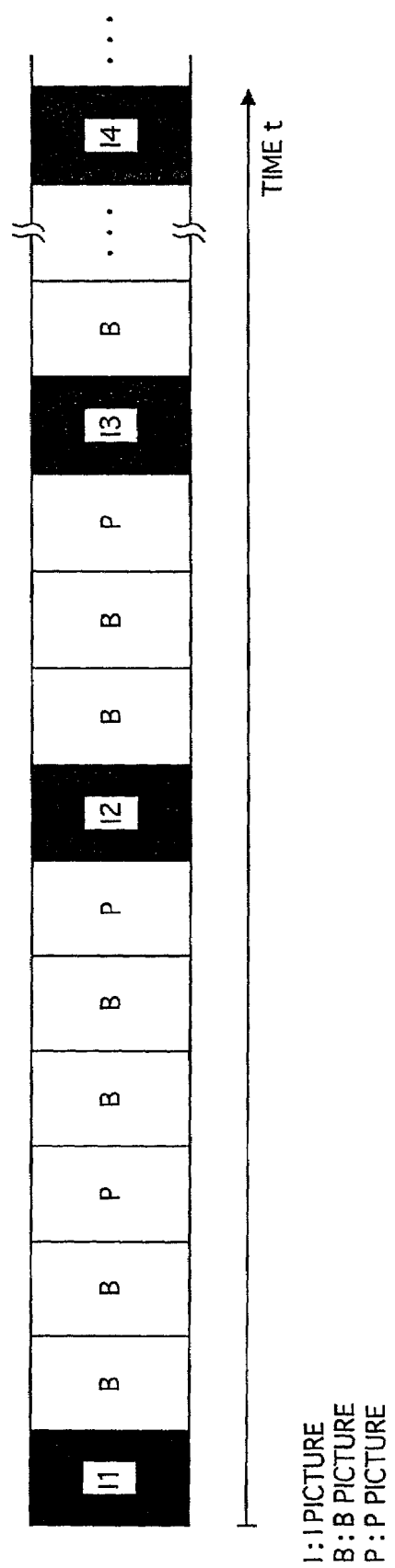
FIG. 14 is a schematic view showing an image stream in the MPEG-2 coding system.

FIG. 14 is a schematic view showing an image stream in the MPEG-2 coding system.

As shown in FIG. 14, according to the MPEG-2 coding system, the image stream consists of three kinds of pictures: I pictures (intraframe-coded picture), B pictures (bidirectional frame), and P pictures (predictive picture). Among these pictures, only I picture can be drawn and displayed based solely on the data that it contains.

Therefore, the fast forward reproduction mode, which is one of typical particular reproduction processes, can be realized by selecting only I pictures to reproduce content.

Figure 15:
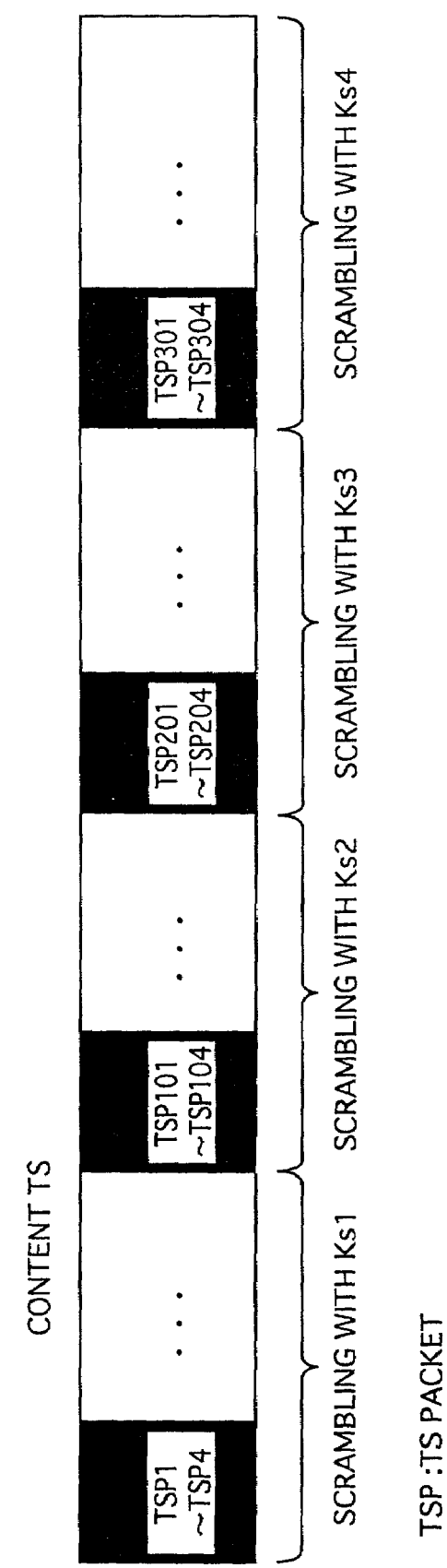
FIG. 15 shows a TS obtained by converting the image stream shown in FIG. 14.

FIG. 15 shows a TS obtained by converting the image stream shown in FIG. 14.

In FIG. 15, the diagonally shaded portions are the TS packets obtained by converting the I pictures shown in FIG. 14. Pictures I1, I2, I3, and I4 are converted into TSP1 to TSP4, TSP101 to TSP104, TSP201 to TSP204, and TSP301 to TSP304, respectively.

The procedure of the fast forward reproduction, which is one of typical particular reproduction processes, is almost the same as that of the reproduction process shown in FIG. 12. However, the detailed procedure in the descrambling process by means of the descrambling process unit 204 is different from that shown in FIG. 12.

Figure 16:
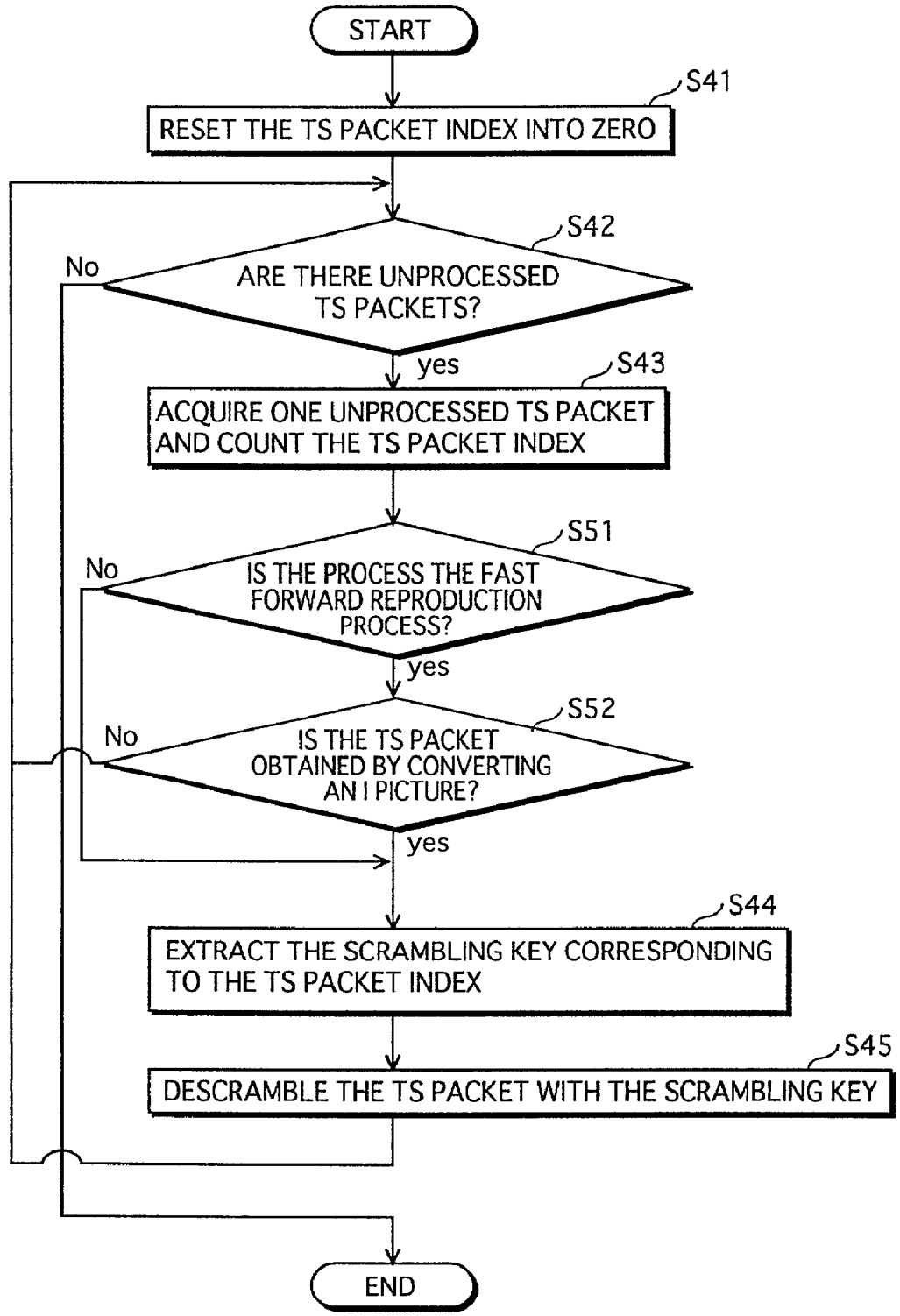
FIG. 16 shows a procedure in the descrambling process in the fast-forward reproduction mode in detail.

FIG. 16 shows a procedure in the descrambling process in the fast-forward reproduction mode in detail. Note that the same numerals are assigned to the step in which the same processes as in FIG. 13 are conducted, and explanation for them has been omitted.

Following describes the outline of the detailed procedure in the descrambling process in the fast forward reproduction mode, with reference to FIGS. 7 and 13 to 16.

(1) Same as the step (1) in FIG. 13 (Step S41)

(2) Same as the step (2) in FIG. 13 (Step S42)

(3) Same as the step (3) in FIG. 13 (Step S43)

For instance, when extracting TSP1 shown in FIG. 15, the TS packet extraction unit 210 counts the TS packet index as one, because TSP1 is the first packet.

(4) The descrambling process unit 204 judges whether the process is the fast forward reproduction process or not (Step S51). If the process is not the fast forward reproduction process, the procedure goes to the process for extracting a scrambling key (to Step S44).

(5) If the process is the fast forward reproduction process, the descrambling process unit 204 judges whether the extracted TS packet is the TS packet obtained by converting an I picture or not (Step S52). If the packet is not the TS packet obtained by converting an I picture, the procedure returns upward to process the successive TS packet.

Note that, as one method for judging whether the extracted TS packet is the TS packet obtained by converting an I picture or not, the broadcast apparatus may embed the information indicative of I picture in the unscrambled portion in the TS packet, and the reception apparatus may make a judgement based on the information. The Japanese Laid-Open Patent Application No. 8-340541 discloses such a method.

When extracting the TSP1 shown in FIG. 15, the descrambling process unit 204 judges the TSP1 as the TS packet obtained by converting an I picture.

(6) Same as the step (4) in FIG. 13 (Step S44)

For instance, the scrambling key list interpretation unit 212 extracts the scrambling key Ks1 corresponding to the TS packet index 1 from the scrambling key list shown in FIG. 7.

(7) Same as the step (5) in FIG. 13 (Step S45)

For instance, the descrambling unit 211 descrambles TSP2 shown in FIG.15 using the scrambling key Ks1.

Similarly, TSP1 to TSP4, TSP101 to TSP104, TSP201 to TSP204, and TSP301 to TSP304 are descrambled with the scrambling keys Ks1, Ks2, Ks3, and Ks 4, respectively.

Note that, The reverse reproduction process can be realized by reversing the extraction order of TS packets in the normal reproduction process.

In addition, the fast reverse reproduction process can be realized by reversing the extraction order of TS packets in the fast forward reproduction process.

Moreover, the random access reproduction process can be realized by altering the starting position of the TS packet to be extracted.

As stated above, according to the first embodiment, various particular reproduction processes can be realized by extracting a scrambling key corresponding to any one of TS packets from the scrambling key list using the TS packet index.

Embodiment 2

<Summary>

The broadcast apparatus according to the second embodiment of the invention has the same construction as in the above first embodiment, but the reception apparatus and the security module have different constructions.

The first embodiment is predicted on that information does not leak out of the reception apparatus so as to provide adequate security of information, and therefore the scrambling key list is held in the reception apparatus. Whereas, according to the second embodiment, the scrambling key list is held in the security module and not in the reception apparatus, whereby the security against the leakage of the scrambling key list can be improved.

<Overall Construction>

Figure 17:
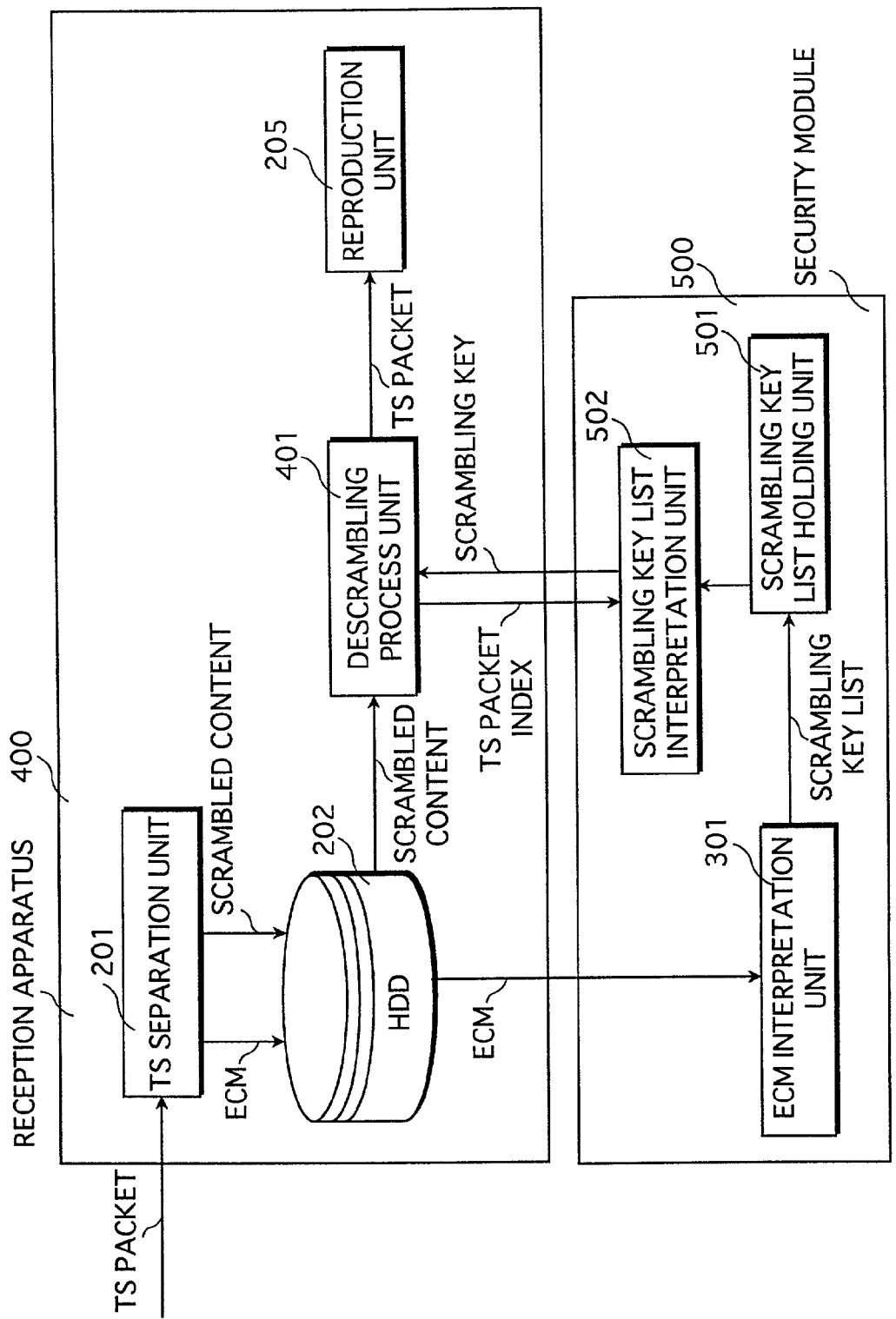
FIG. 17 shows a portion of the construction of a system for providing a storage service according to the second embodiment of the invention.

FIG. 17 shows a portion of the construction of a system for providing a storage service according to the second embodiment of the invention.

The system shown in FIG. 17 is made up of a broadcast apparatus 100, a reception apparatus 400, and a security module 500. Note that the broadcast apparatus is not illustrated in FIG. 17, because the apparatus is the same as in the first embodiment.

The security module 500 is a portable and intelligent recording medium such as an IC card. The security module 500 is set in a predetermined position of the reception apparatus 400 and used together with the reception apparatus 400.

Note that construction elements which have the same functions as those in the first embodiment have been given the same reference numerals and their explanation has been omitted.

(Construction of Broadcast Apparatus)

The construction of the broadcast apparatus has been omitted, because it is the same as in the first embodiment.

(Constructions of Reception Apparatus and Security Module)

The reception apparatus shown in FIG. 17 is made up of a TS separation unit 201, an HDD 202, a descrambling process unit 401, and a reproduction unit 205.

The security module shown in FIG. 17 is made up of an ECM interpretation unit 301, a scrambling key list holding unit 501, and a scrambling key list interpretation unit 502.

The scrambling key list holding unit 501 holds the scrambling key list extracted by the ECM interpretation unit 301.

The descrambling process unit 401 extracts the scrambled content stored in the HDD 202 one TS packet at a time and counts the TS packet index to pass them to the scrambling key list interpretation unit 502. Then, on receiving the scrambling key corresponding to the TS packet index from the scrambling key list interpretation unit 502, the descrambling process unit 401 descrambles the TS packet using the scrambling key and passes it to the reproduction unit 205. Detailed description on the descrambling process unit 401 will be given later.

The scrambling key list interpretation unit 502 extracts the scrambling key corresponding to the TS packet index passed from the descrambling process unit 401, from the scrambling key list held by the scrambling key list holding unit 501, and passes the extracted key to the descrambling process unit 401.

Figure 18:
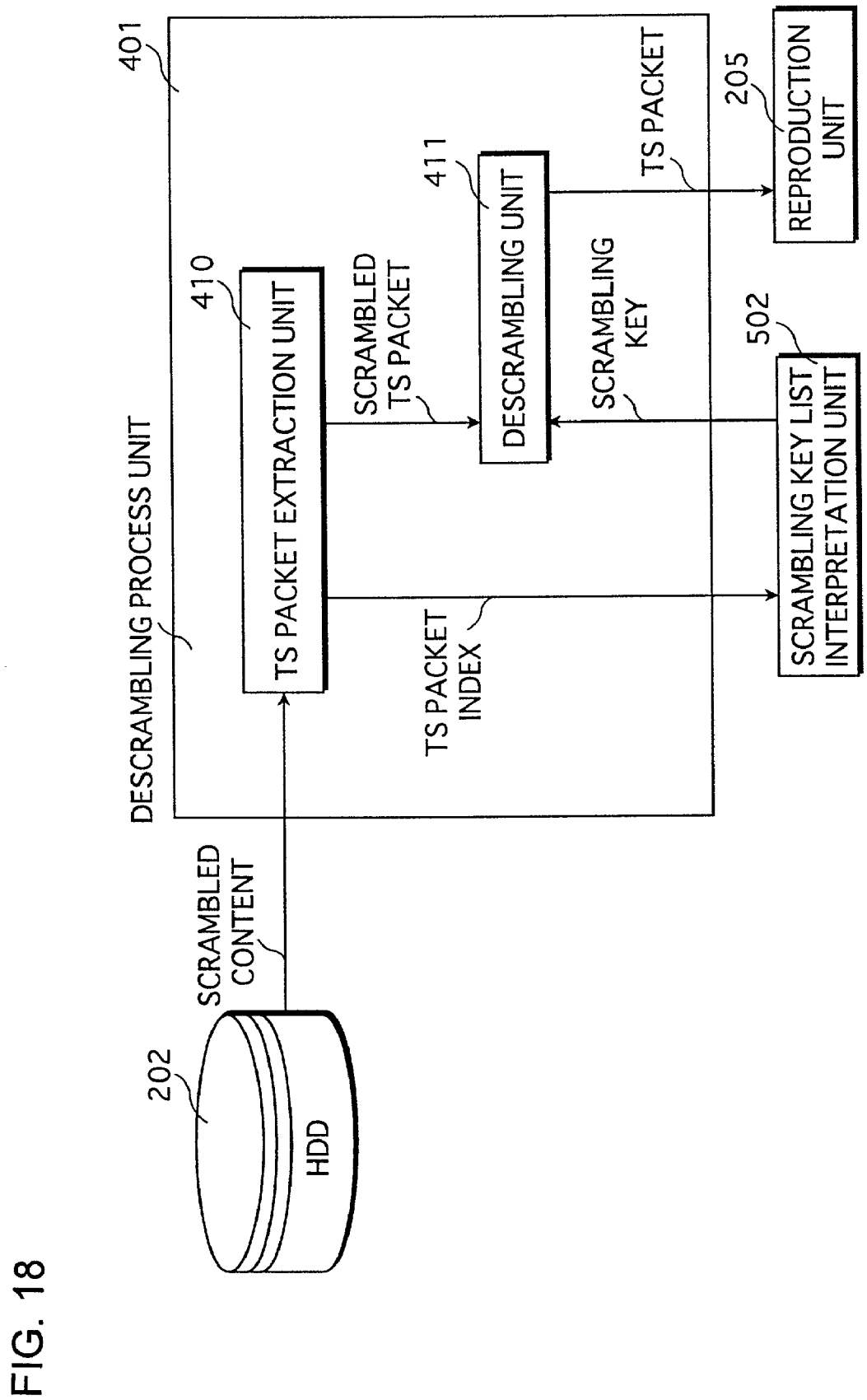
FIG. 18 shows the detailed construction of the descrambling process unit 401.

FIG. 18 shows the detailed construction of the descrambling process unit 401.

The descrambling process unit 401 shown in FIG. 18 is made up of the TS packet extraction unit 410 and the descrambling unit 411.

The TS packet extraction unit 410 extracts the scrambled content stored in the HDD 202 one TS packet at a time to pass it to the descrambling unit 411. Also, the TS packet extraction unit 410 counts the TS packet index indicating the ordinal position of the extracted TS packet counted from the beginning of the content and passes it to the scrambling key list interpretation unit 502. Here, the TS packet extraction unit 410 resets the TS packet index into zero when other content start to be processed.

The descrambling unit 411 descrambles one TS packet passed from the TS packet extraction unit 410 with the scrambling key passed from the scrambling key list interpretation unit and passes it to the reproduction unit 205. The descrambling unit 411 repeats this process until all TS packets have been processed.

(Operations)

Since operations in this embodiment are the same as in the first embodiment, their explanation has been omitted.

As described above, according to the second embodiment of the invention, various particular reproduction processes can be realized, while improving the security against the leakage of the scrambling key list by extracting a scrambling key corresponding to any one of TS packets from the scrambling key list held in the security module.

Embodiment 3

<Summary>

According to the third embodiment of the invention, correspondences between TS packets and scrambling keys are described in the ECM, and the value of Continuity Counter (CC) described in the unscrambled portion in the TS packet is utilized, whereby the number of TS packets to be scrambled (TS_packet_number) does not need to be described in the scrambling key list descriptor, which leads to decrease in the amount of data to be transmitted.

<Overall Construction>

Figure 19:
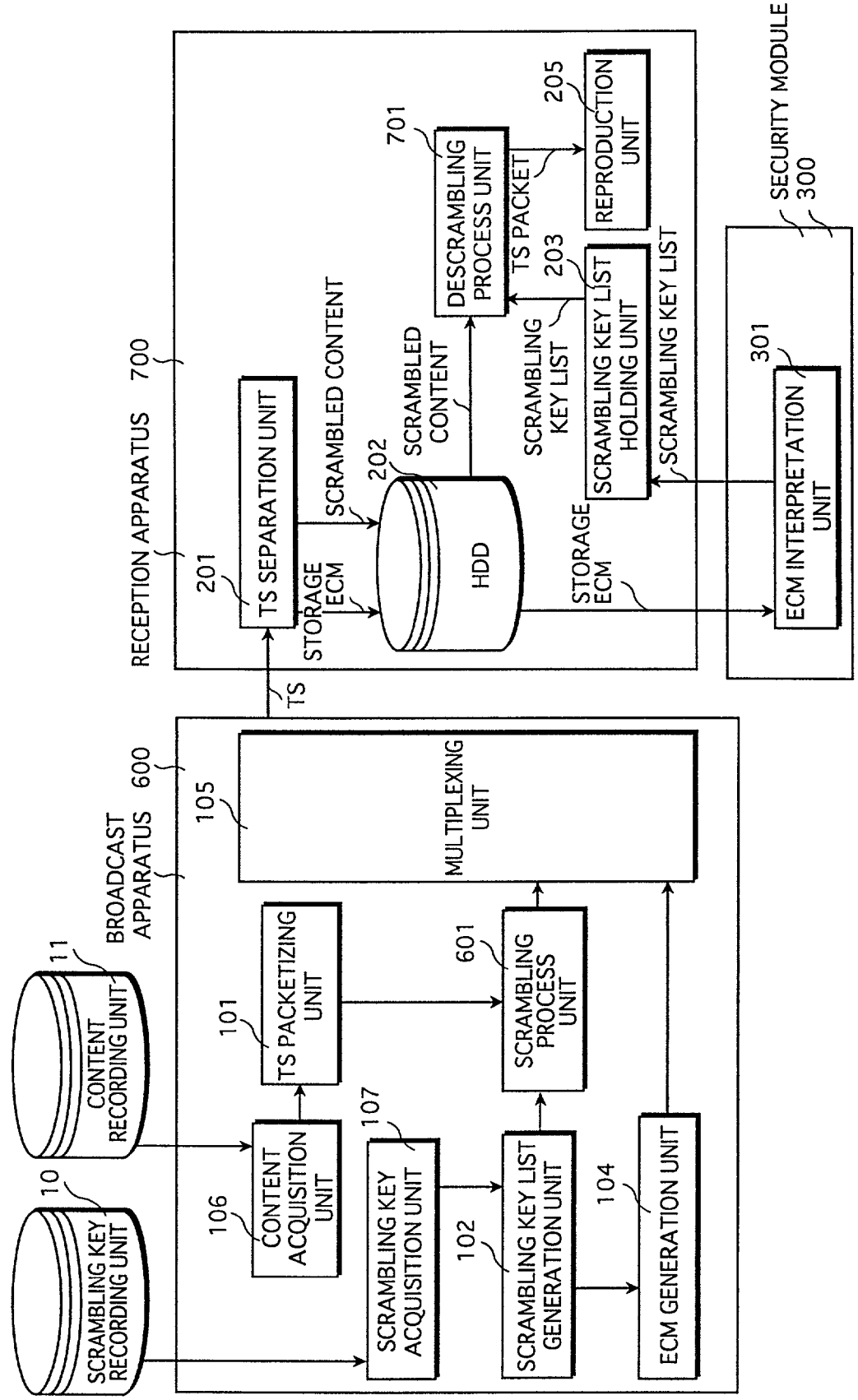
FIG. 19 shows a portion of the construction of a system for providing a storage service according to the third embodiment of the invention.

FIG. 19 shows a portion of the construction of a system for providing a storage service according to the third embodiment of the invention.

The system shown in FIG. 19 is made up of a broadcast apparatus 600, a reception apparatus 700, and a security module 300.

Note that construction elements which have the same functions as those in the first embodiment have been given the same reference numerals and their explanation has been omitted.

(Construction of Broadcast Apparatus)

The broadcast apparatus shown in FIG. 19 is made up of a TS packetizing unit 101, a scrambling key list generation unit 102, a scrambling process unit 601, an ECM generation unit 104, a multiplexing unit 105, a content acquisition unit 106, and a scrambling key list acquisition unit 107.

The scrambling process unit 601 scrambles the content converted into TS packets by the TS packetizing unit 101 based on the scrambling key list generated by the scrambling key list generation unit 102.

Figure 20:
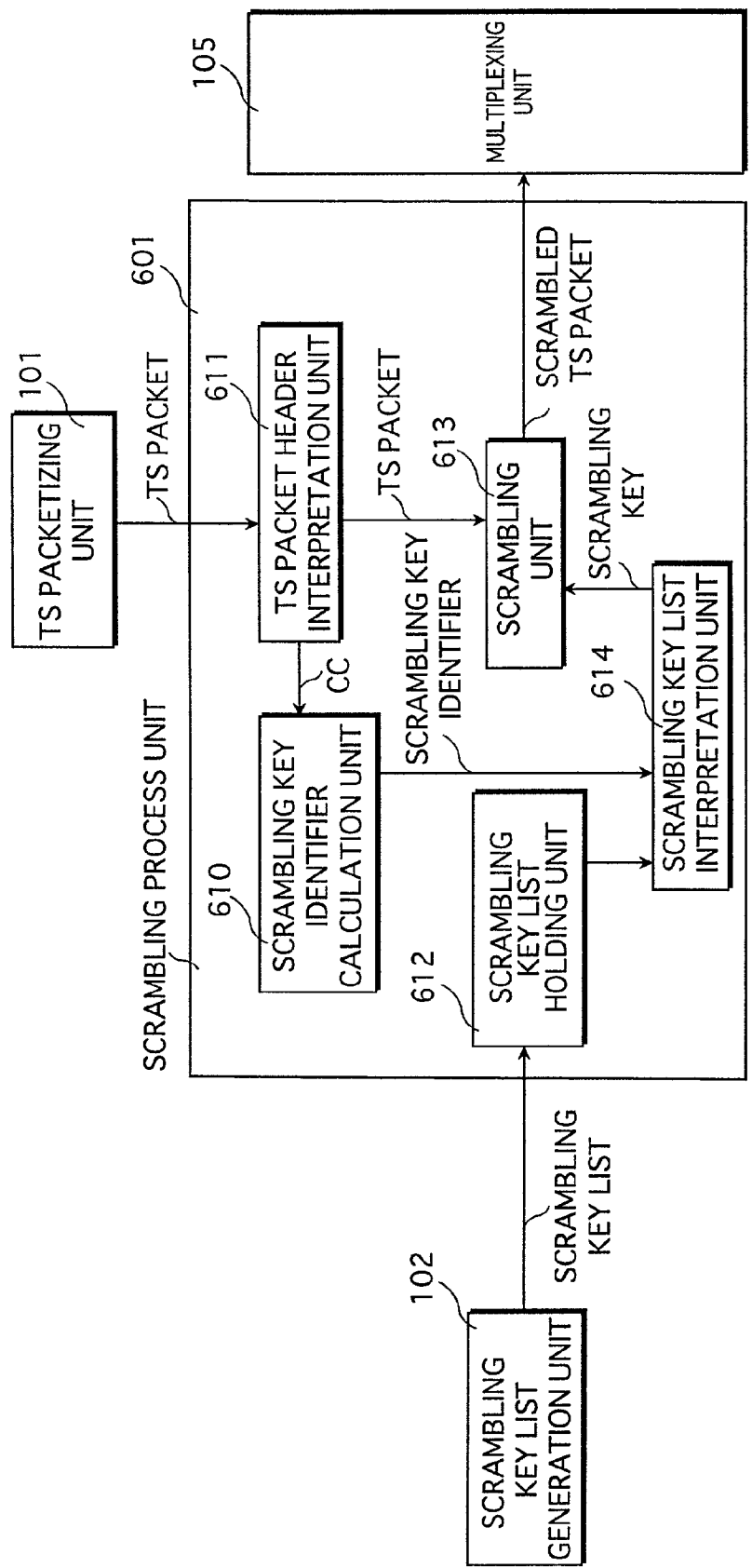
FIG. 20 shows the detailed construction of the scrambling process unit 601.

FIG. 20 shows the detailed construction of the scrambling process unit 601.

The scrambling process unit 601 shown in FIG. 20 is made up of a scrambling key identifier calculation unit 610, a TS packet header interpretation unit 611, a scrambling key list holding unit 612, a scrambling unit 613, and a scrambling key list interpretation unit 614.

The TS packet header interpretation unit 611 acquires the content converted into TS packets by the TS packetizing unit 101 one TS packet at a time to pass it to the scrambling unit 613. Also, the TS packet header interpretation unit 611 reads the value of Continuity Counter (CC) to pass it to the scrambling key identifier calculation unit 610.

Note that the CC is a cyclic counter using the four-bit value of the header in the TS packet as prescribed by the MPEG-2 coding system as the international standard. The CC increments one by one from zero to fifteen, and then returns to zero, which is used to determine if any TS packets with the same packet ID are abandoned partway.

The scrambling key identifier calculation unit 610 calculates a scrambling key identifier using the value of the CC passed from the TS packet header interpretation unit 611 and passes it to the scrambling key list interpretation unit 614.

One method for calculating a scrambling key identifier from the value of the CC is that the value of "CC mod n" (where $1 \leq n \leq 16$) is set at the scrambling key identifier. Here, "A mod B" indicates the remainder obtained by dividing A by B.

For instance, in the case of n=16, there are sixteen kinds of scrambling key identifiers (i.e., 0 to 15). As for the TS packet whose value is 2, for example, the scrambling key identifier is 2, because the remainder obtained by dividing 2 by 16 is 2.

The scrambling key list holding unit 612 acquires and holds the scrambling key list generated by the scrambling key list generation unit 102.

FIG. 21 shows the scrambling key list in the case that the value of "CC mod 16" is set at the scrambling key identifier.

The scrambling key list interpretation unit 614 extracts the scrambling key corresponding to the TS packet to be scrambled from the scrambling key list stored in the scrambling key list holding unit 612, based on the scrambling key identifier passed from the scrambling key identifier calculation unit 610 and passes it to the scrambling unit 613.

For instance, in the case that the scrambling key identifier is 2, the scrambling key Ks3 is extracted according to the scrambling key list shown in FIG. 21.

The scrambling unit 613 scrambles one TS packet passed from the TS packet header interpretation unit 611 using the scrambling key passed from the scrambling key list interpretation unit 614 and passes it to the multiplexing unit 105. The scrambling unit 613 repeats this process until all TS packets have been processed.

For instance, in the case that the scrambling key Ks3 is extracted, scrambling process is conducted with the scrambling key Ks3.

That is the explanation for the case of n=16. Naturally, n is not limited to 16.

That is, n may be any number between 1 and 15. After generating a scrambling key list by changing the value of n, the number of used scrambling keys can be easily altered without generating the list again. For instance, by changing the value of n to 4 without changing the scrambling key list shown in FIG. 21, the value of identifier can be any number between 0 and 3. As a result, the four types of scrambling keys (Ks1, Ks2, Ks3, and Ks4) can be used. Note that the value of n may be stored as a calculation method or a fixed value in advance, and the method and the value may be described in the variable portion in the storage ECM shown in FIG. 3.

Alternatively, instead of calculating a scrambling key identifier from the value of CC, the scrambling key identifier may be calculated from the specific bits of the Program Clock Reference (PCR) or the Original PCR (OPCR), which are also prescribed by the MPEG-2 coding system as the international standard.

For example, using the specific four-bit values in the PCR or OPCR, the scrambling key identifier may be calculated in the same manner as in the above process using the value of CC.

Otherwise, instead of using the value prescribed by the MPEG-2 coding system, users may directly describe the value of the scrambling key identifier in the area where the application is not specified but which users can utilize freely, such as private data area in the Adaptation Field.

(Constructions of Reception Apparatus and Security Module)

The reception apparatus shown in FIG. 19 is made up of a TS separation unit 201, an HDD 202, a scrambling key list holding unit 203, a descrambling process unit 701, and a reproduction unit 205.

The descrambling process unit 701 descrambles the scrambled content stored in the HDD 202, based on the scrambling key list held by the scrambling key list holding unit 203 and passes it to the reproduction unit 205.

Figure 22:
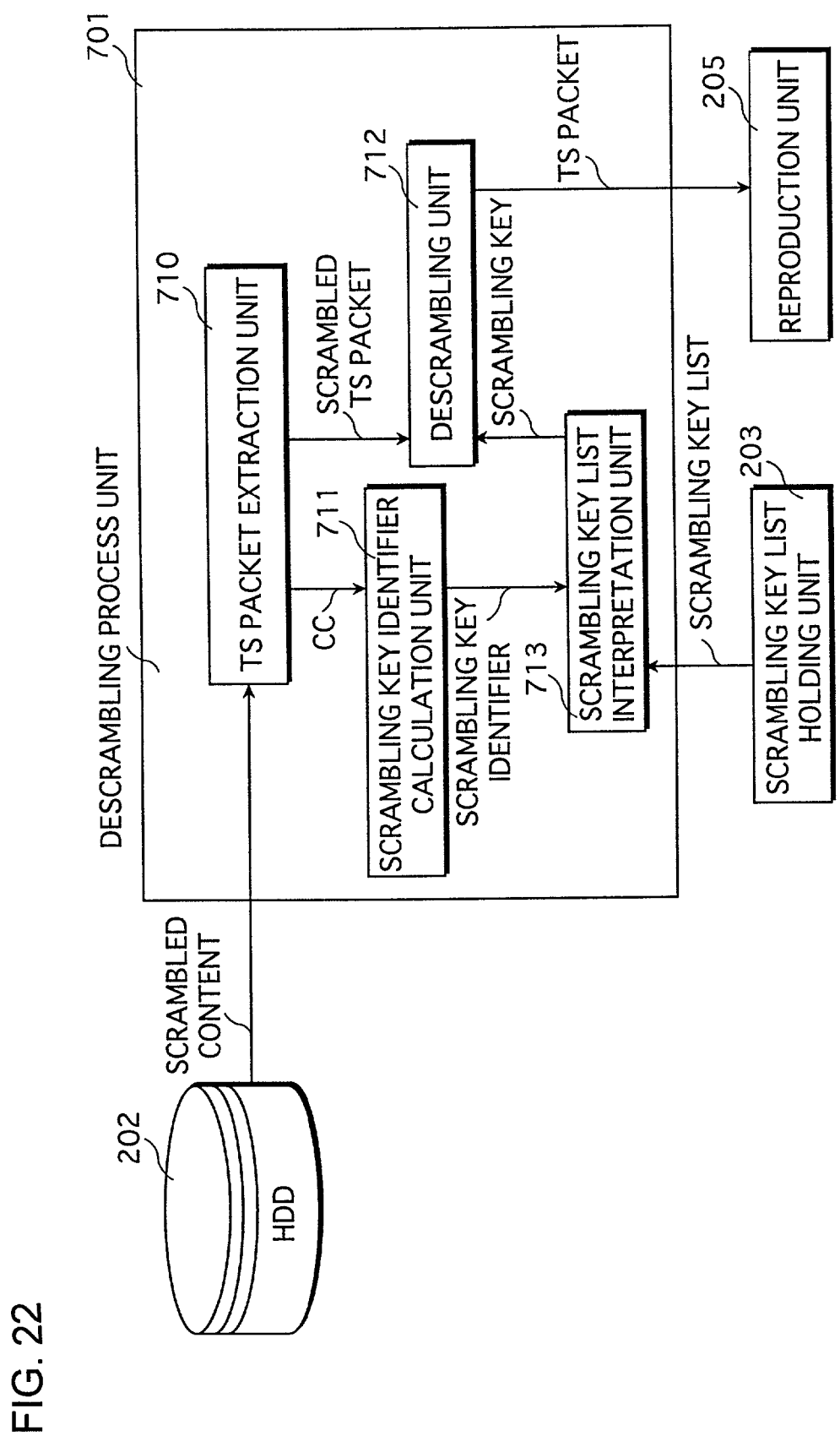
FIG. 22 shows the detailed construction of the descrambling process unit 701.

FIG. 22 shows the detailed construction of the descrambling process unit 701.

The descrambling process unit 701 shown in FIG. 22 is made up of a TS packet extraction unit 710, a scrambling key identifier calculation unit 711, a descrambling unit 712, and a scrambling key list interpretation unit 713.

The TS packet extraction unit 710 extracts the scrambled content stored in the HDD 202 one TS packet at a time to pass it to the descrambling unit 712. Also, the TS packet extraction unit 710 reads the value of the CC in the extracted TS packet to pass it to the scrambling key identifier calculation unit 711.

The scrambling key identifier calculation unit 711 calculates a scrambling key identifier from the value of the CC passed from the TS packet extraction unit 710 and passes it to the scrambling key list interpretation unit 713.

The scrambling key list interpretation unit 713 extracts the scrambling key corresponding to the TS packet to be scrambled from the scrambling key list stored in the scrambling key list holding unit 203, based on the scrambling key identifier passed from the scrambling key identifier calculation unit 711, and passes it to the descrambling unit 712.

The descrambling unit 712 descrambles one TS packet passed from the TS packet extraction unit 710 using the scrambling key passed from the scrambling key list interpretation unit 713 and passes it to the reproduction unit 205. The descrambling unit 712 repeats this process until all TS packets have been processed.

<Operations>

(Operations of Broadcast Apparatus)

Figure 23:
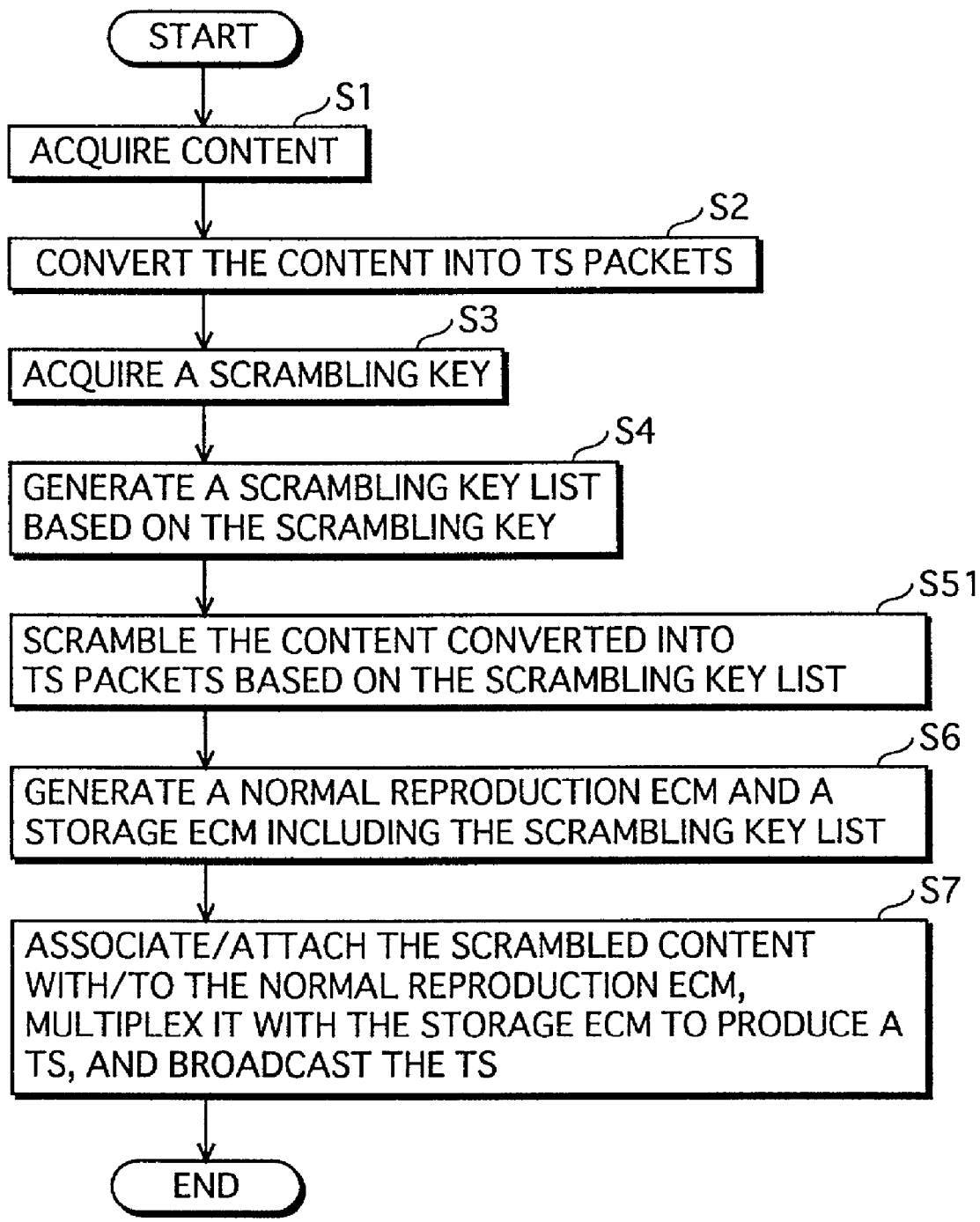
FIG. 23 shows a procedure in the broadcasting process by means of the broadcast apparatus 600 according to the third embodiment of the invention.

FIG. 23 shows a procedure in the broadcasting process by means of the broadcast apparatus 600 according to the third embodiment of the invention. Note that the same numerals are assigned to the step where the same processes as in FIG. 9 are conducted, and explanation for them has been omitted.

Following describes the outline of the procedure in the broadcasting process, with reference to FIG. 23.

(1) Same as the step (1) in FIG. 9 (Step S1)
(2) Same as the step (2) in FIG. 9 (Step S2)
(3) Same as the step (3) in FIG. 9 (Step S3)
(4) Same as the step (4) in FIG. 9 (Step S4)
(5) The scrambling process unit 601 scrambles the content converted into TS packets by the TS packetizing unit 101, based on the scrambling key list generated by the scrambling key list generation unit 102 (Step S51).
(6) Same as the step (6) in FIG. 9 (Step S6)
(7) Same as the step (7) in FIG. 9 (Step S7)

Figure 24:
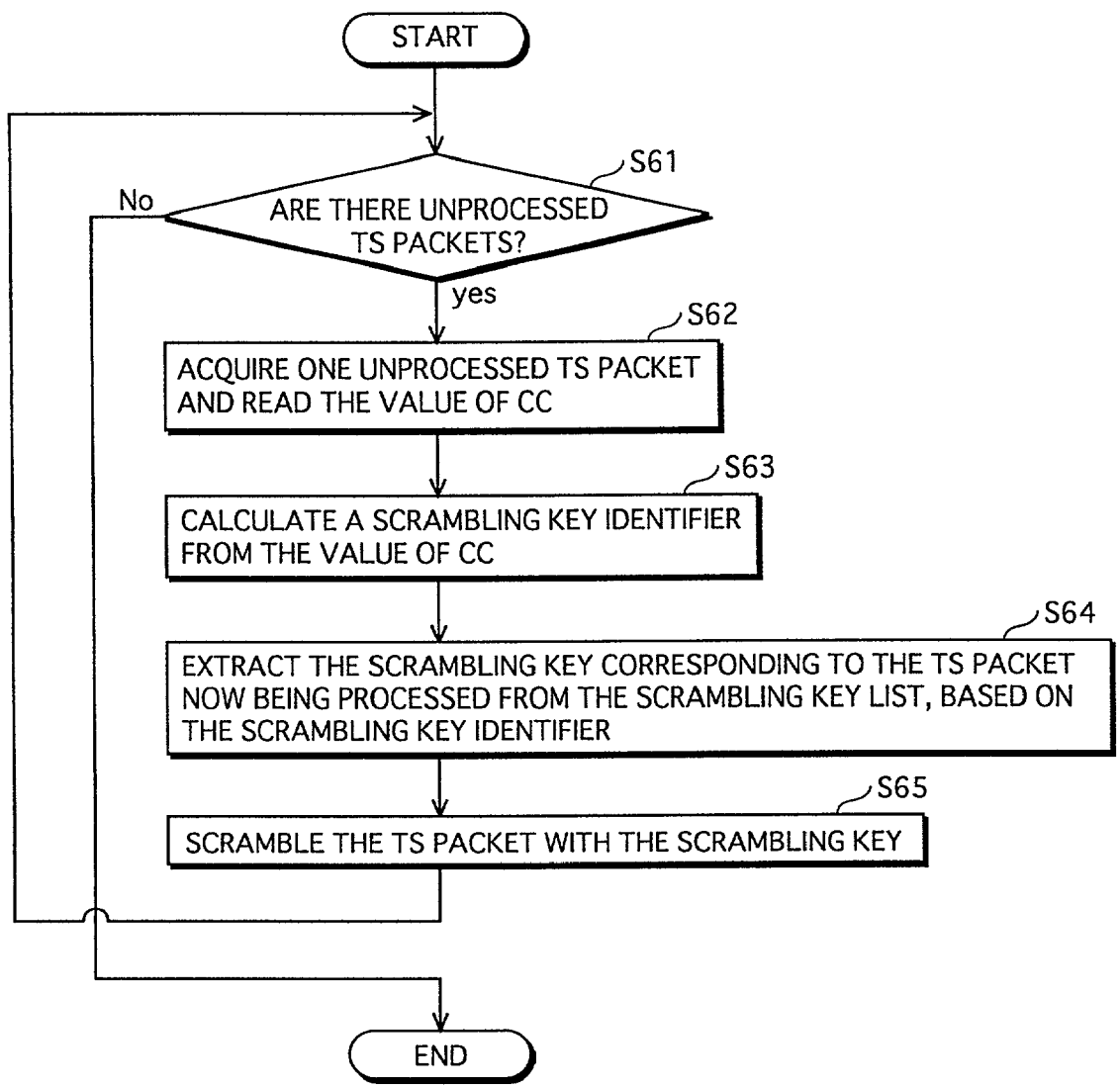
FIG. 24 shows a procedure in the scrambling process by means of the scrambling process unit 601 in detail.

FIG. 24 shows a procedure in the scrambling process by means of the scrambling process unit 601 in detail.

Following describes the outline of the detailed procedure in the scrambling process, with reference to FIG. 24.

(1) The TS packet header interpretation unit 611 judges whether there are any unprocessed TS packets or not (Step S61). If there are not any unprocessed TS packets, the scrambling process ends.

(2) If there are unprocessed TS packets, the TS packet header interpretation unit 611 acquires one unprocessed TS packet to pass it to the scrambling unit 613, and reads the value of the CC to pass it to the scrambling key identifier calculation unit 610 (Step S62).

(3) The scrambling key identifier calculation unit 610 calculates a scrambling key identifier from the value of the CC passed from the TS packet header interpretation unit 611 to pass it to the scrambling key list interpretation unit 614 (Step S63).

(4) The scrambling key list interpretation unit 614 extracts the scrambling key corresponding to the TS packet now being processed, from the scrambling key list stored in the scrambling key list holding unit 612, based on the scrambling key identifier passed from the scrambling key identifier calculation unit 610 and passes the extracted key to the scrambling unit 613 (Step S64).

(5) The scrambling unit 613 scrambles one TS packet passed from the TS packet header interpretation unit 611 using the scrambling key passed from the scrambling key list interpretation unit 614 and passes it to the multiplexing unit 105. Then, the procedure returns upward to process the successive TS packet (Step S65)

(Operations of Reception Apparatus)

Explanation of the procedure in the reception and storage processes by means of the reception apparatus 700 and the security module 300 according to the third embodiment of the invention has been omitted, because they are the same as in the first embodiment.

Figure 25:
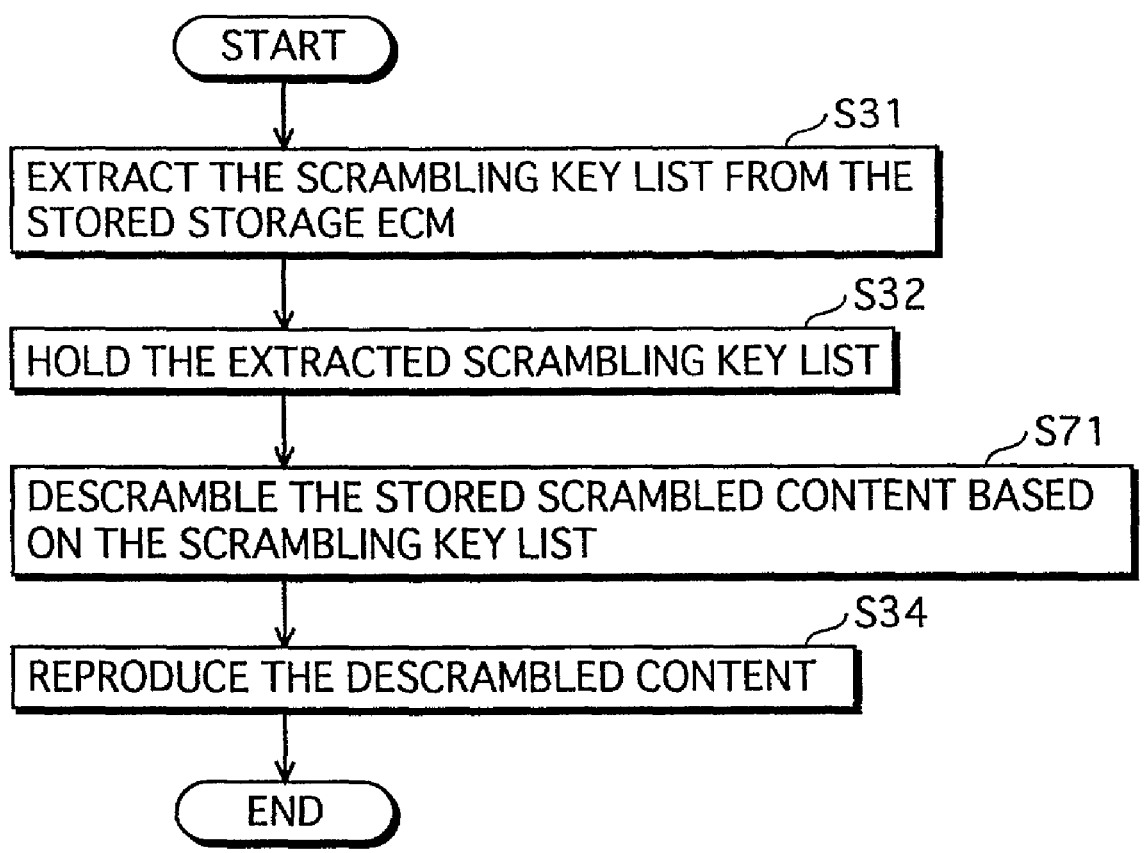
FIG. 25 shows a procedure in the reproduction process after the reception and storage processes by means of the reception apparatus 700 and the security module 300 according to the third embodiment of the invention.

FIG. 25 shows a procedure in the reproduction process after the reception and storage processes by means of the reception apparatus 700 and the security module 300 according to the third embodiment of the invention. Note that the same numerals are assigned to the step where the same processes as in FIG. 12 are conducted, and explanation for them has been omitted.

Following describes the outline of the procedure in the reproduction process, with reference to FIG. 25.

(1) Same as the step (1) in FIG. 12 (Step S31)

(2) Same as the step (2) in FIG. 12 (Step S32)

(3) The descrambling process unit 701 descrambles the scrambled content stored in the HDD 202 based on the scrambling key list held by the scrambling key list holding unit 203 and passes the descrambled content to the reproduction unit 205 (Step S71).

(4) Same as the step (4) in FIG. 12 (Step S34)

Figure 26:
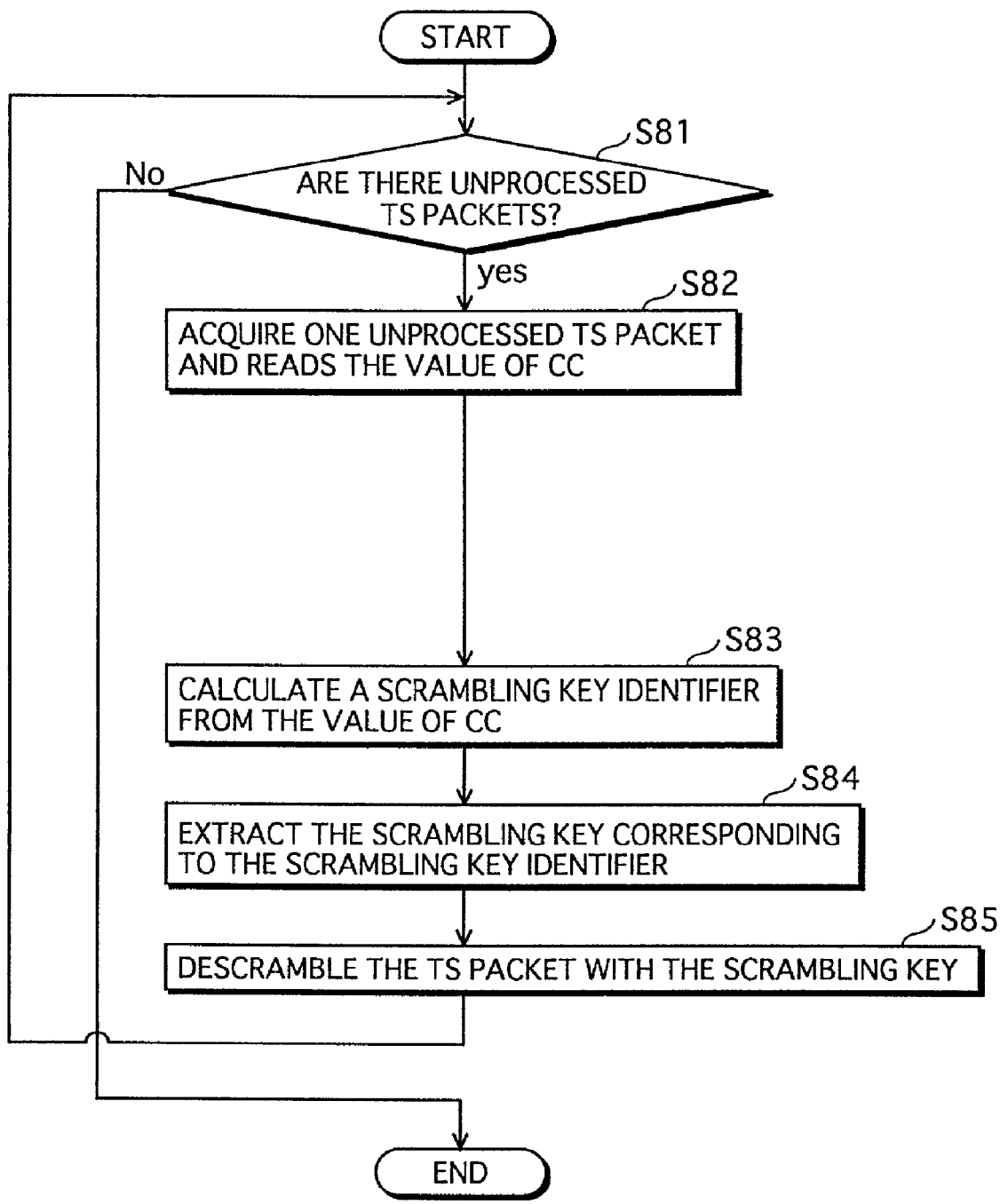
FIG. 26 shows a procedure in the descrambling process by means of the descrambling process unit 701 in detail.

FIG. 26 shows a procedure in the descrambling process by means of the descrambling process unit 701 in detail.

Following describes the outline of the detailed procedure in the descrambling process, with reference to FIG. 26.

(1) The TS packet extraction unit 710 judges whether there are any unprocessed TS packets or not (Step S81). If there are no any unprocessed TS packets, the descrambling process ends.

(2) If there are unprocessed TS packets, the TS packet extraction unit 710 extracts one unprocessed TS packet to pass it to the scrambling unit 712, and reads the value of the CC of the extracted TS packet to pass it to the scrambling key identifier calculation unit 711 (Step S82).

(3) The scrambling key identifier calculation unit 711 calculates a scrambling key identifier from the value of the CC passed from the TS packet extraction unit 710 and passes it to the scrambling key list interpretation unit 713 (Step S83).

(4) The scrambling key list interpretation unit 713 extracts the scrambling key from the scrambling key list stored in the scrambling key list holding unit 203, based on the scrambling key identifier passed from the scrambling key identifier calculation unit 711 and passes the extracted key to the descrambling unit 712 (Step S84).

(5) The descrambling unit 712 descrambles one TS packet passed from the TS packet extraction unit 710 using the scrambling key passed from the scrambling key list interpretation unit 713 and passes the descrambled TS packet to the reproduction unit 205. Then, the procedure returns upward to process the successive TS packet (Step S85).

As stated above, according to the third embodiment of the invention, various particular reproduction processes can be realized by extracting a scrambling key corresponding to any one of TS packets from the scrambling key list using the value of CC.

Note that, instead of the value of CC, any one of the number of TS packets, the cumulative amount of data, a relative reproduction time, and an identifier for a scrambling key may be used.

Embodiment 4

<Summary>

A system for providing a storage service according to the fourth embodiment of the invention consists of a broadcast apparatus, a reception apparatus, and a security module.

Unlike the first embodiment, the broadcast apparatus according to the fourth embodiment does not generate the scrambling key list. Instead, the broadcast apparatus in this embodiment adds auxiliary information including identifying information on the scrambled content such as packet numbers so as to help the reception apparatus to generate a scrambling key list, the scrambling keys, and the like, to the normal reproduction ECM to broadcast it together with the scrambled content.

The security module, which is set and integrated with the reception apparatus in a predetermined position, receives the normal reproduction ECM and the scrambled content, stores the scrambled content while generating a scrambling key list based on the auxiliary information added to the normal reproduction ECM, and sequentially descrambles the scrambled content using the stored scrambling key list.

<Overall Construction>

Figure 27:
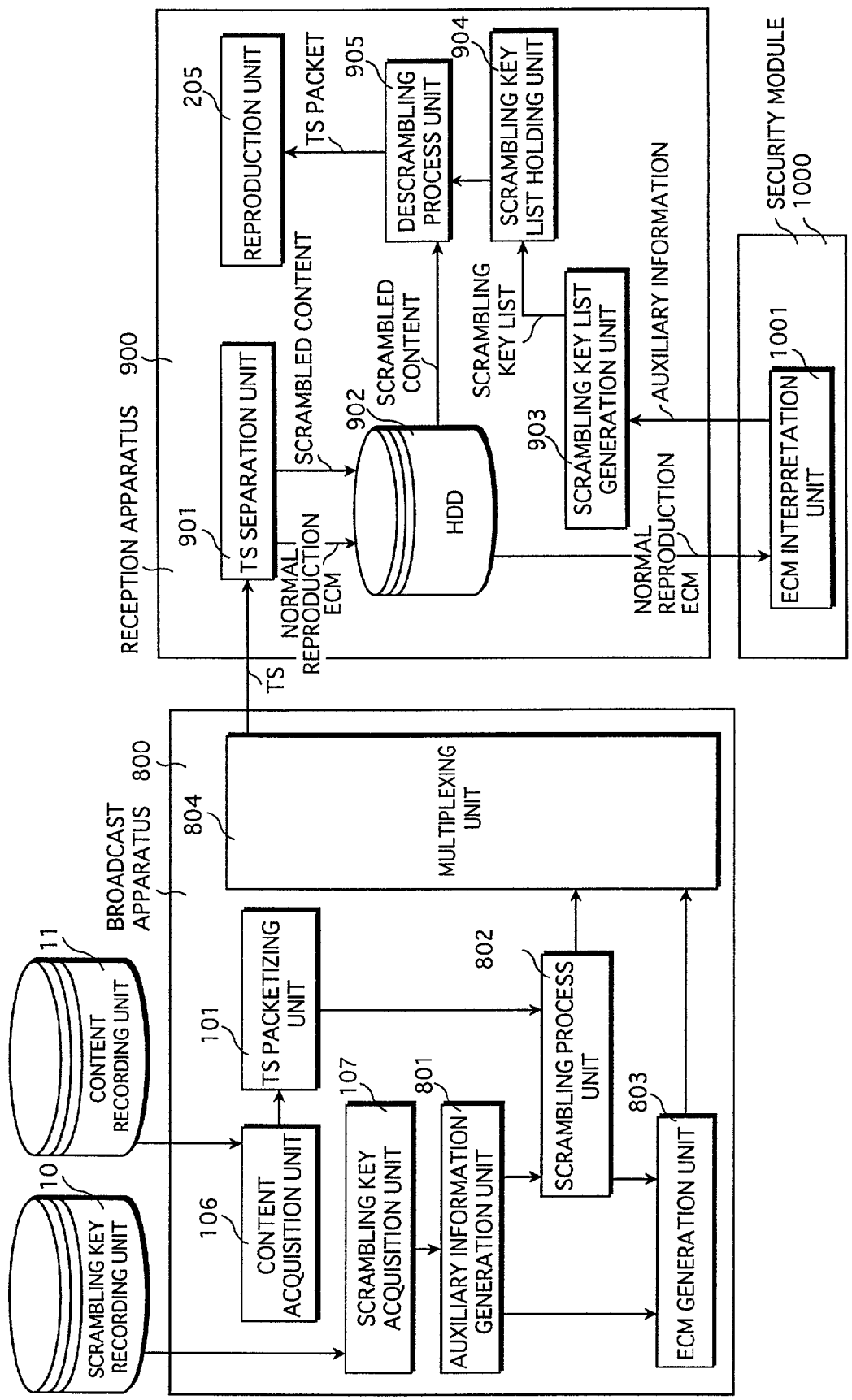
FIG. 27 shows the construction of a system for providing a storage service according to the fourth embodiment of the invention.

FIG. 27 shows the construction of a system for providing a storage service according to the fourth embodiment of the invention.

The system shown in FIG. 27 is made up of a broadcast apparatus 800, a reception apparatus 900, and a security module 1000.

The security module 1000 is a portable and intelligent recording medium such as an IC card. The security module 1000 is set in a predetermined position of the reception apparatus 900 and used together with the reception apparatus 900.

Note that construction elements which have the same functions as those in the first embodiment have been given the same reference numerals and the same names and their explanation has been omitted.

(Construction of Broadcast Apparatus)

The broadcast apparatus 800 shown in FIG. 27 is made up of a TS packetizing unit 101, an auxiliary information generation unit 801, a scrambling process unit 802, an ECM generation unit 803, a multiplexing unit 804, a content acquisition unit 106, and a scrambling key acquisition unit 107.

The auxiliary information generation unit 801 generates auxiliary information based on the scrambling key acquired by the scrambling key acquisition unit 107.

Note that the auxiliary information is represented by scrambling key list generation descriptors, for example.

FIG. 28 shows one example of the data structure of the scrambling key list generation descriptor.

The scrambling key list descriptor shown in FIG. 28 includes a scrambling key identifier (Ks_id) for identifying a scrambling key, the scrambling key (Ks), and the number of TS packets to be scrambled with the scrambling key (TS_packet_number).

The scrambling process unit 802 scrambles the content converted into TS packets by the TS packetizing unit 101, based on the auxiliary information generated by the auxiliary information generation unit 801. The detailed description on the scrambling process unit 802 will be given later.

The ECM generation unit 803 generates a normal reproduction ECM, and adds the auxiliary information generated by the auxiliary information generation unit 801 to the normal reproduction ECM.

Figure 29:
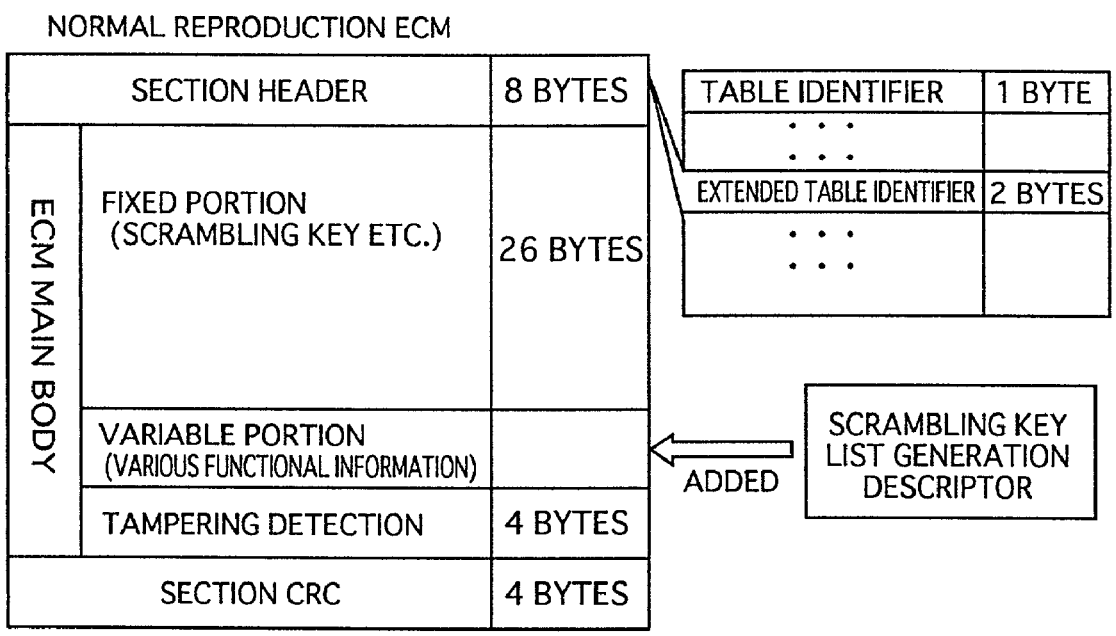
FIG. 29 shows one example of the data structure of an ECM for normal reproduction, to which the scrambling key list generation descriptor is added.

FIG. 29 shows one example of the data structure of a normal reproduction ECM, to which the scrambling key list generation descriptor is added.

The normal reproduction ECM shown in FIG. 29 is generated by adding the scrambling key list generation descriptor as described above to a variable portion (a target to be encoded) in the main body of the ECM as prescribed by the ARIB (The Association of Radio Industries and Businesses) standard.

The multiplexing unit 804 associates/attaches the scrambled content with/to the generated normal reproduction ECM to produce a TS, and broadcasts the TS.

Figure 30:
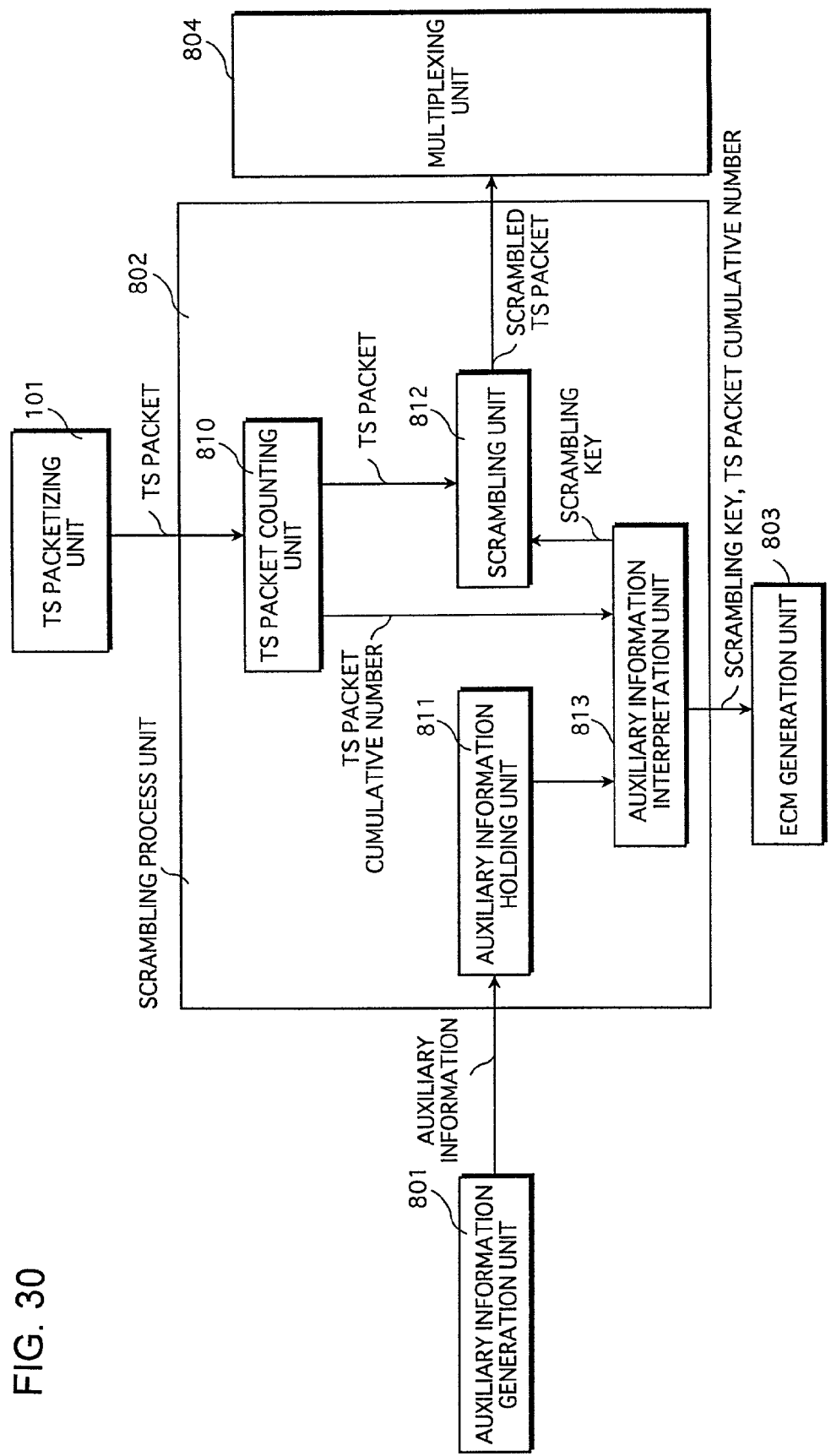
FIG. 30 shows the detailed construction of the scrambling process unit 802.

FIG. 30 shows the detailed construction of the scrambling process unit 802.

The scrambling process unit 802 shown in FIG. 30 is made up of a TS packet counting unit 810, an auxiliary information holding unit 811, a scrambling unit 812, and an auxiliary information interpretation unit 813.

The TS packet counting unit 810 acquires the content converted into TS packets by the TS packetizing unit 101 one TS packet at a time and passes it to the scrambling unit 812. The TS packet counting unit 110 also counts the TS packet cumulative number showing the ordinal position of the acquired TS packet counted from the beginning of the content, and passes the number to the auxiliary information interpretation unit 813. The TS packet counting unit 810 resets the TS packet cumulative number into zero when other content starts to be processed.

The auxiliary information holding unit 811 acquires and holds the auxiliary information generated by the auxiliary information generation unit 801.

The auxiliary information interpretation unit 813 extracts the scrambling key corresponding to the TS packet to be scrambled from the auxiliary information stored in the auxiliary information holding unit 811, based on the TS packet cumulative number passed from the TS packet counting unit 810, and passes the extracted key to the scrambling unit 812.

The scrambling unit 812 scrambles one TS packet passed from the TS packet counting unit 810 using the scrambling key passed from the auxiliary information interpretation unit 813 and passes the scrambled TS packet to the multiplexing unit 804. The scrambling unit 812 repeats this process until all TS packets have been processed.

(Constructions of Reception Apparatus and Security Module)

The reception apparatus 900 shown in FIG. 27 is made up of a TS separation unit 901, an HDD 902, a scrambling key list generation unit 903, a scrambling key list holding unit 904, a descrambling process unit 905, and a reproduction unit 205.

The security module 1000 shown in FIG. 27 is made up of an ECM interpretation unit 1001.

The TS separation unit 901 receives the TS broadcast by the multiplexing unit 804, and separates a normal reproduction ECM and scrambled content.

The HDD 902 is a recording medium such as a hard disk drive. The HDD 902 stores the normal reproduction ECM and the scrambled content separated by the TS separation unit 901.

The ECM interpretation unit 1001 extracts auxiliary information from the stored normal reproduction ECM.

The scrambling key list generation unit 903 generates a scrambling key list based on the auxiliary information extracted by the ECM interpretation unit 1001.

The scrambling key list holding unit 904 holds the scrambling key list generated by the scrambling key list generation unit 903.

The descrambling process unit 905 descrambles the scrambled content stored in the HDD 202 based on the scrambling key list held by the scrambling key list holding unit 904, and passes the descrambled content to the reproduction unit 205.

Figure 31:
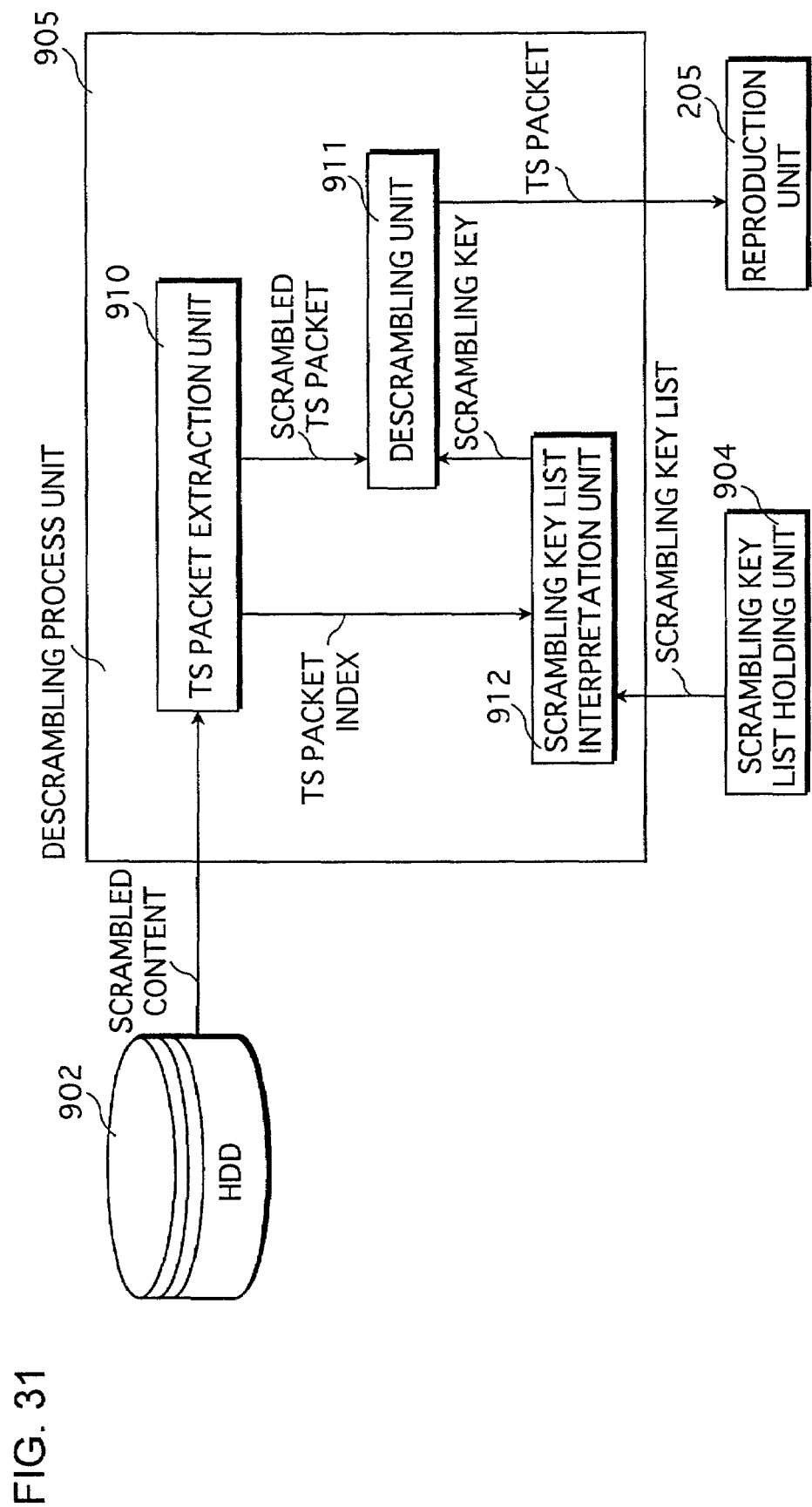
FIG. 31 shows the detailed construction of the descrambling process unit 905.

FIG. 31 shows the detailed construction of the descrambling process unit 905.

The descrambling unit 905 shown in FIG. 31 is made up of a TS packet extraction unit 910, a descrambling unit 911, and a scrambling key list interpretation unit 912.

The TS packet extraction unit 910 extracts the scrambled content stored in the HDD 902 one TS packet at a time and passes it to the descrambling unit 911. The TS packet extraction unit 910 also counts the TS packet index showing the ordinal position of the acquired TS packet counted from the beginning of the content, and passes the number to the scrambling key list interpretation unit 912. The TS packet extraction unit 910 resets the TS packet index into zero when other content starts to be processed.

The scrambling key list interpretation unit 912 extracts the scrambling key corresponding to the TS packet index passed from the TS packet extraction unit 910 from the scrambling key list held by the scrambling key list holding unit 904, and passes the extracted key to the descrambling unit 911.

The descrambling unit 911 descrambles one TS packet passed from the TS packet extraction unit 910 using the scrambling key extracted by the scrambling key list interpretation unit 912 and passes the descrambled TS packet to the reproduction unit 205. The descrambling unit 911 repeats this process until all TS packets have been processed.

<Operations>

(Operations of Broadcast Apparatus)

Figure 32:
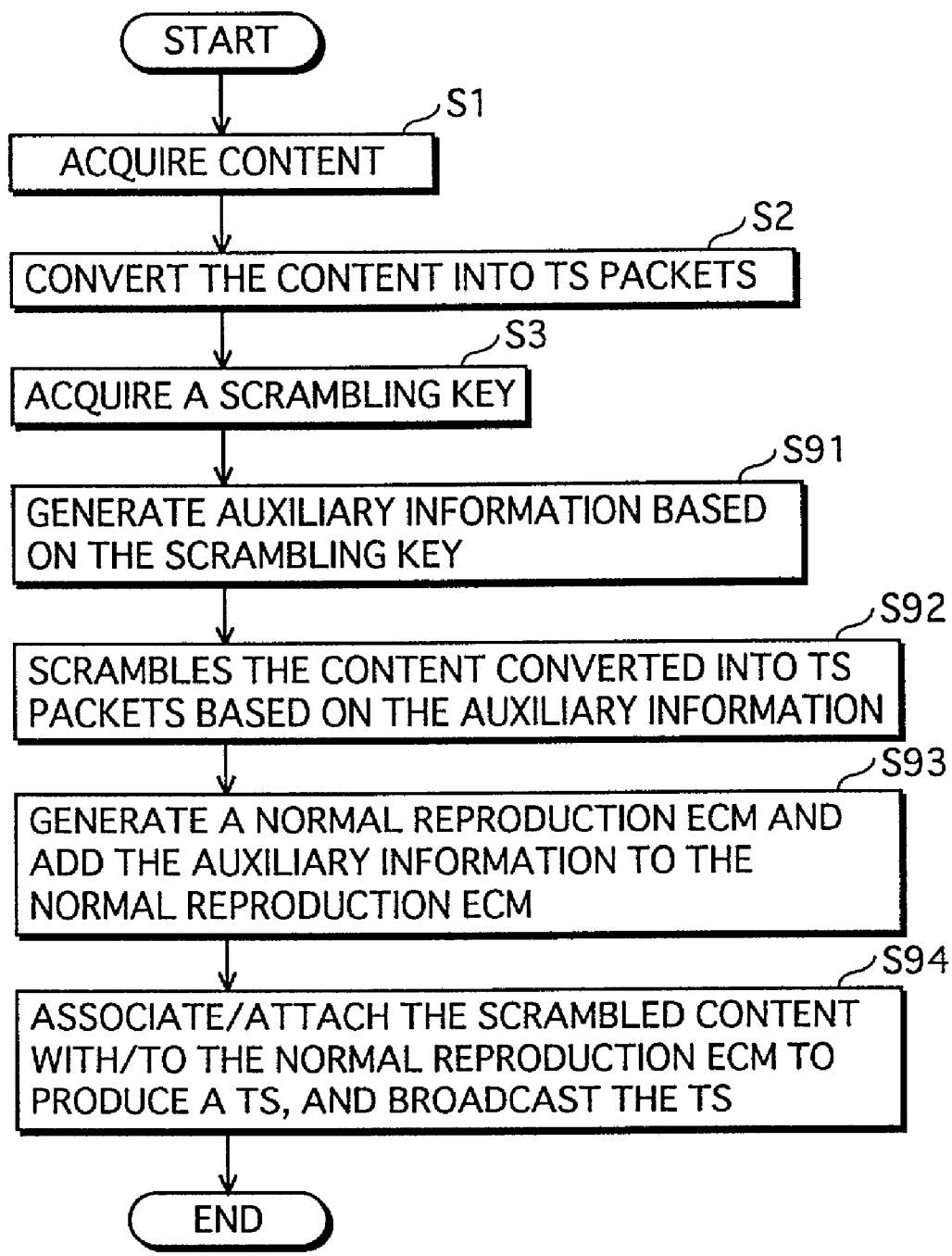
FIG. 32 shows a procedure in the broadcasting process by means of the broadcast apparatus 800 according to the fourth embodiment of the invention.

FIG. 32 shows a procedure in the broadcasting process by means of the broadcast apparatus 800 according to the fourth embodiment of the invention.

Following describes the outline of the procedure in the broadcast process, with reference to FIG. 32.

(1) Same as the step (1) in FIG. 9 (Step S1)

(2) Same as the step (2) in FIG. 9 (Step S2)

(3) Same as the step (3) in FIG. 9 (Step S3)

(4) The auxiliary information generation unit 801 generates auxiliary information based on the scrambling key acquired by the scrambling key acquisition unit 107 (Step S91).

(5) The scrambling process unit 802 scrambles the content converted into TS packets by the TS packetizing unit 101, based on the auxiliary information generated by the auxiliary information generation unit 801 (Step S92).

(6) The ECM generation unit 803 generates a normal reproduction ECM and adds the auxiliary information generated by the auxiliary information generation unit 801 to the normal reproduction ECM (Step S93).

(7) The multiplexing unit 804 associates/attaches the generated normal reproduction ECM with/to the scrambled content to produce TS and broadcasts the TS (Step S94).

Figure 33:
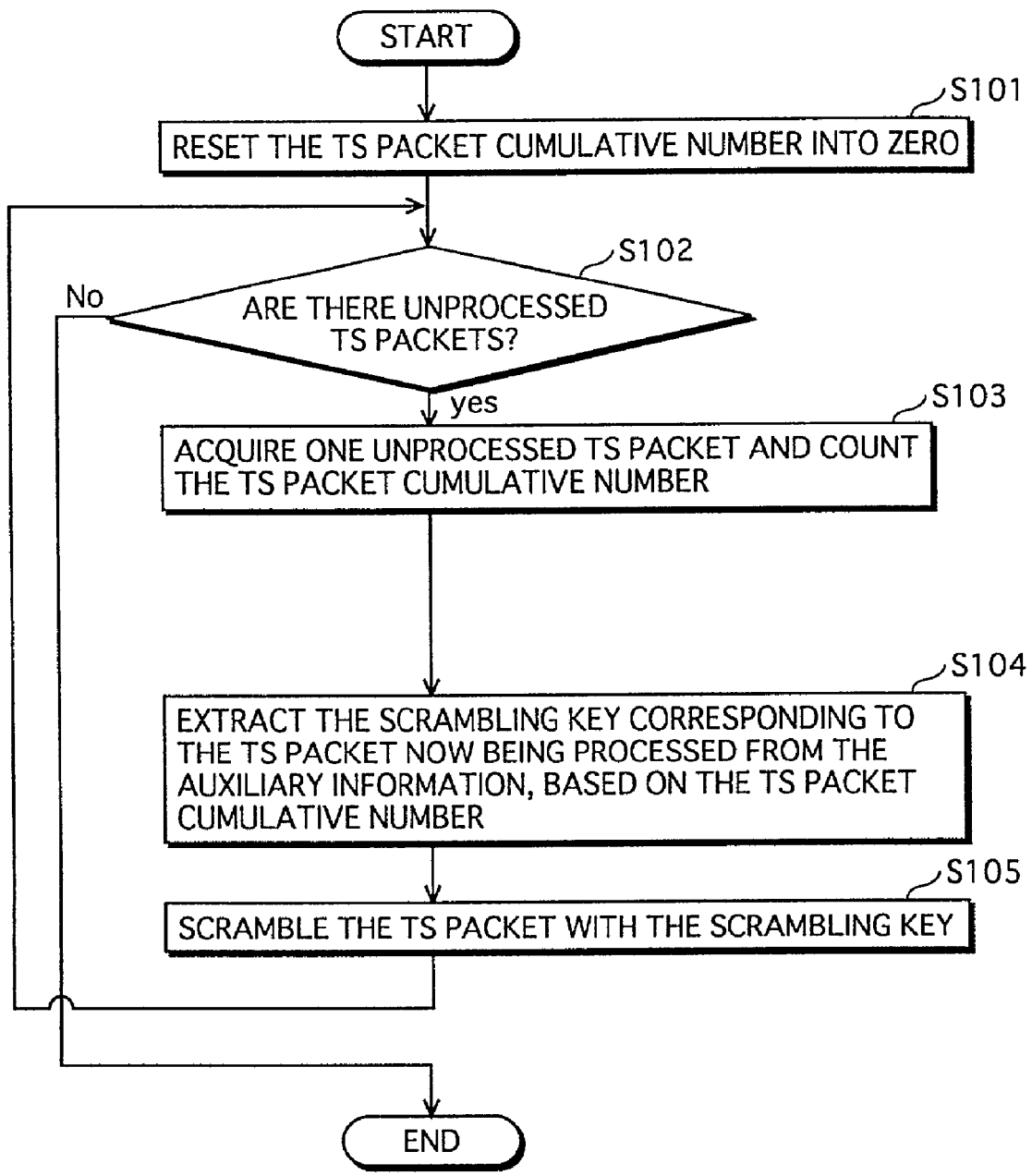
FIG. 33 shows a procedure in the scrambling process by means of the scrambling process unit 802 in detail.

FIG. 33 shows a procedure in the scrambling process by means of the scrambling process unit 802 in detail.

Following describes the outline of the detailed procedure in the scrambling process, with reference to FIG. 33.

(1) The TS packet counting unit 810 resets the TS packet cumulative number into zero (Step S101).

(2) The TS packet counting unit 810 judges whether there are any unprocessed TS packets or not (Step S102). If there are no any unprocessed TS packets, the scrambling process ends.

(3) If there are unprocessed TS packets, the TS packet counting unit 810 acquires one unprocessed TS packet to pass it to the scrambling unit 812, and counts the TS packet cumulative number to pass it to the auxiliary information interpretation unit 813 (Step S103).

(4) The auxiliary information interpretation unit 813 extracts the scrambling key corresponding to the TS packet now being processed from the auxiliary information stored in the auxiliary information holding unit 811, based on the TS packet cumulative number passed from the TS packet counting unit 810 (Step S104).

(5) The scrambling unit 812 scrambles one TS packet passed from the TS packet counting unit 810 using the scrambling key passed from the auxiliary information interpretation unit 813 and passes it to the multiplexing unit 804. Then, the procedure returns upward to process the successive TS packet (Step S105).

(Operations of Reception Apparatus)

Figure 34:
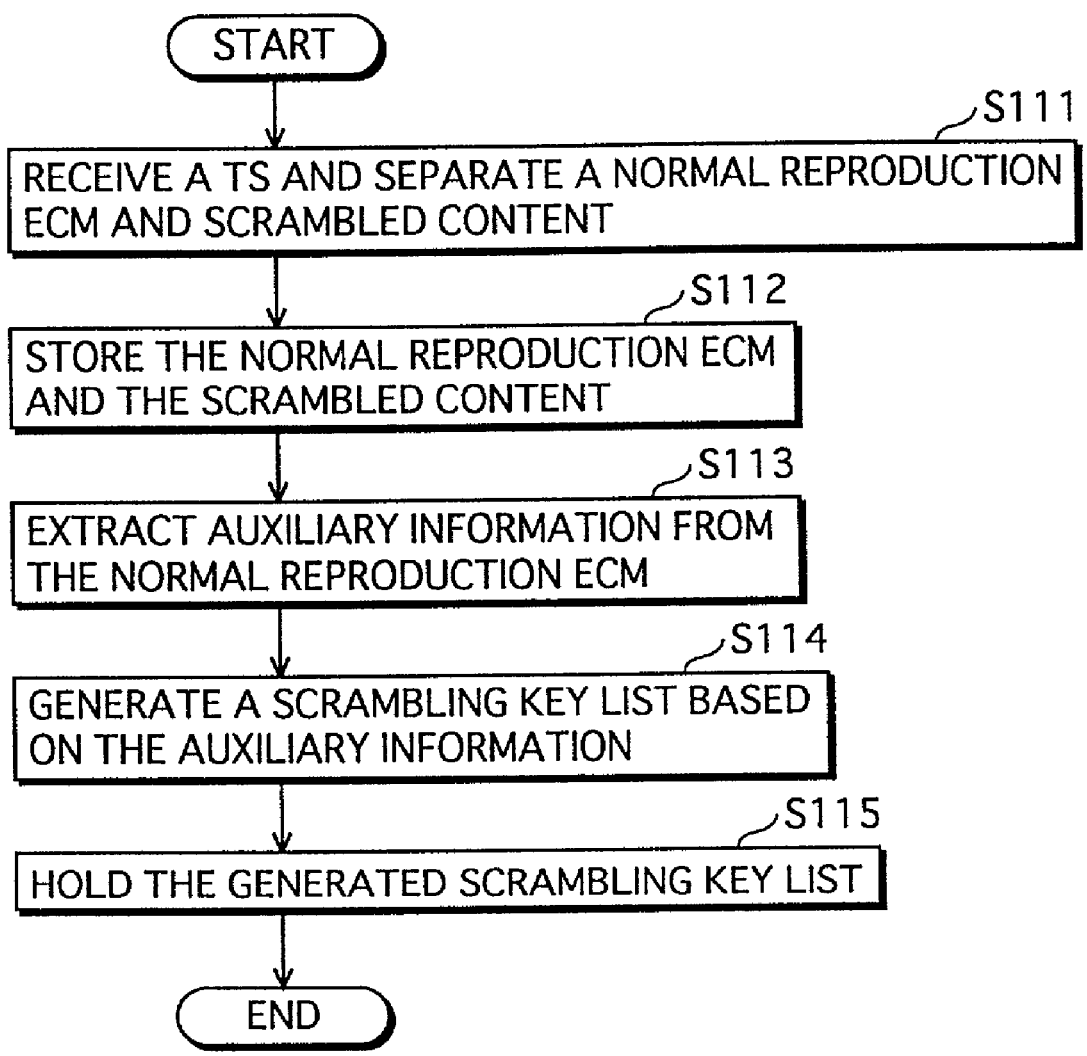
FIG. 34 shows a procedure in the reception and storage processes by means of the reception apparatus 900 and the security module 1000 according to the fourth embodiment of the invention.

FIG. 34 shows a procedure in the reception and storage processes by means of the reception apparatus 900 and the security module 1000 according to the fourth embodiment of the invention.

Following describes the outline of the processes with reference to FIG. 34.

(1) The TS separation unit 901 receives a TS broadcast by the multiplexing unit 804. Then, the TS separation unit 901 separates a normal reproduction ECM and scrambled content (Step S111).

(2) The HDD 202 stores the normal reproduction ECM and the scrambled content separated by the TS separation unit 901 (Step S112).

(3) The ECM interpretation unit 1001 extracts the auxiliary information from the normal reproduction ECM (Step S113).

(4) The scrambling key list generation unit 903 generates a scrambling key list, based on the auxiliary information extracted by the ECM interpretation unit 1001 (Step S114).

(5) The scrambling key list holding unit 904 holds the scrambling key list generated by the scrambling key list generation unit 903 (Step S115).

Note that, the normal reproduction ECM and the scrambled content may be separated not at this stage but later (e.g., before using them).

Figure 35:
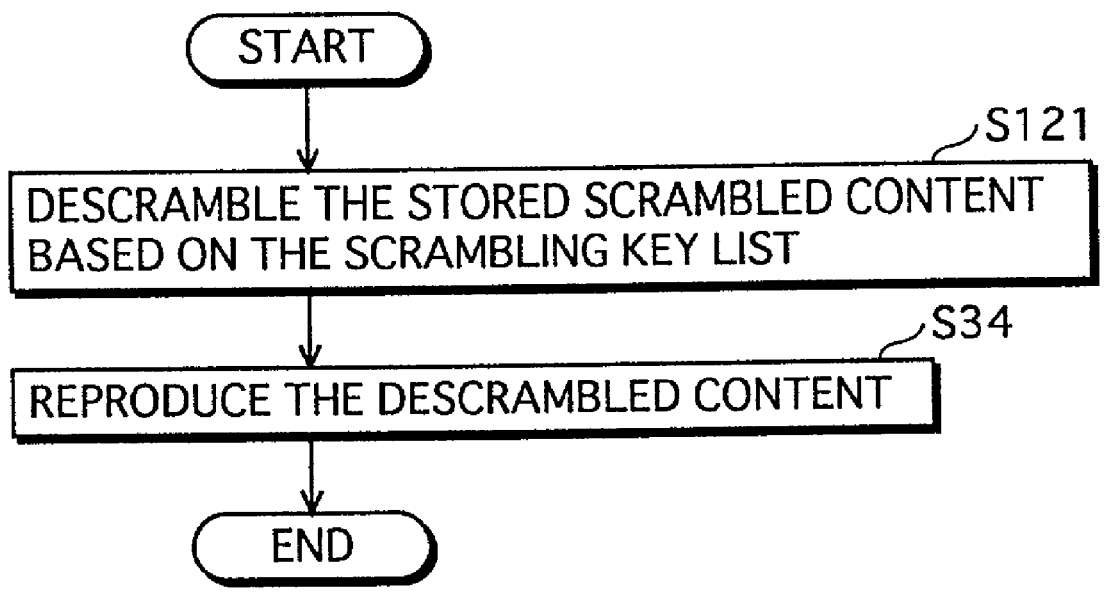
FIG. 35 shows a procedure in the reproduction process after the reception and storage processes by means of the reception apparatus 900 and the security module 1000 according to the fourth embodiment of the invention.

FIG. 35 shows a procedure in the reproduction process after the reception and storage processes by means of the reception apparatus 900 and the security module 1000 according to the fourth embodiment of the invention. Note that the same numerals are assigned to the step where the same processes as in FIG. 12 are conducted, and explanation for them has been omitted.

Following describes the outline of the reproduction process, with reference to FIG. 35.

(1) The descrambling process unit 905 descrambles the scrambled content stored in the HDD 902 based on the scrambling key list held by the scrambling key list holding unit 904 and passes the descrambled content to the reproduction unit 205 (Step S121).

Figure 36:
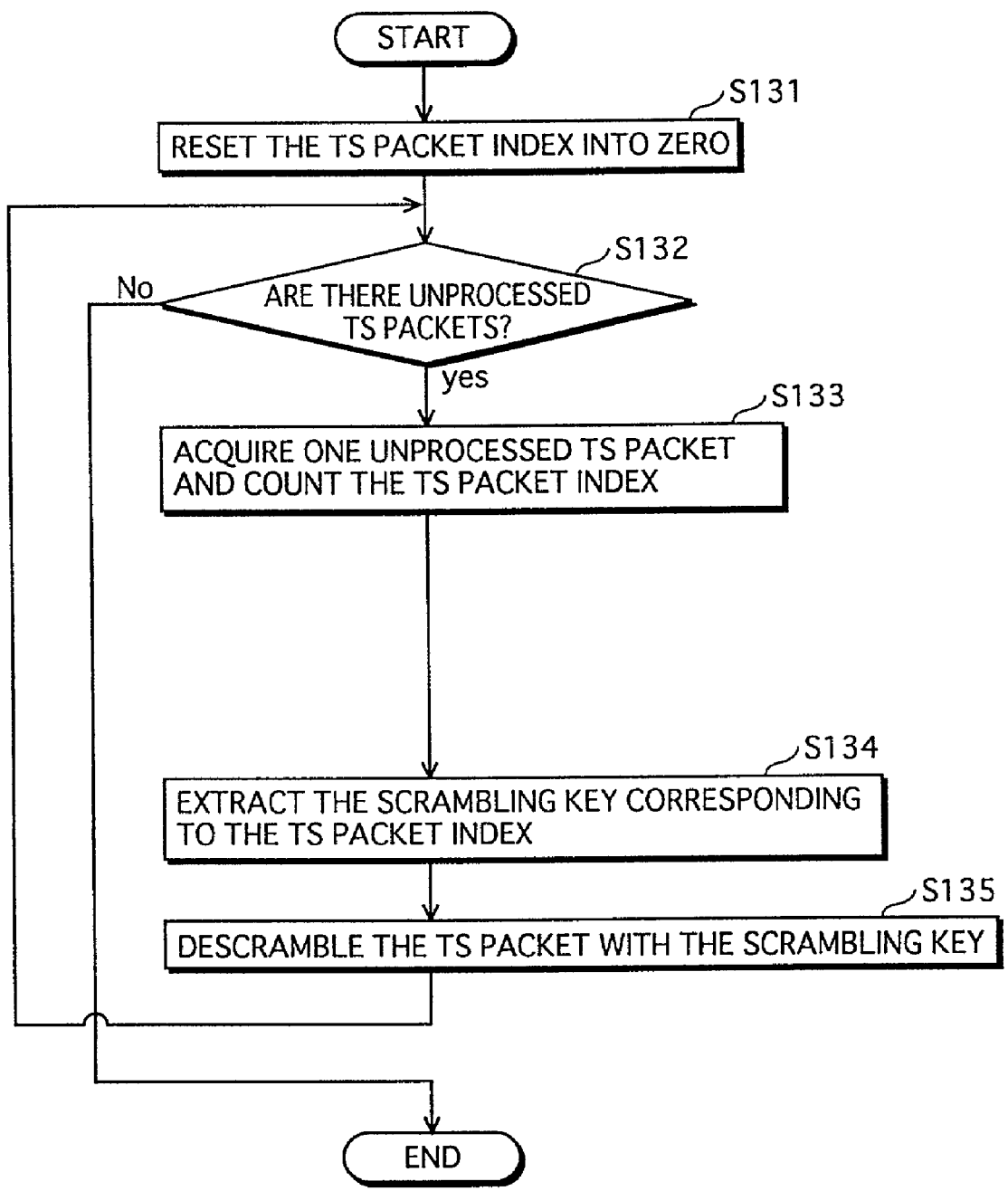
FIG. 36 shows a procedure in the descrambling process by means of the descrambling process unit 905 in detail.

(2) Same as the step (4) in FIG. 12 (Step S34) FIG. 36 shows a procedure in the descrambling process by means of the descrambling process unit 905 in detail.

Following describes the outline of the detailed procedure in the descrambling process, with reference to FIG. 36.

(1) The TS packet extraction unit 910 resets the TS packet index into zero when other content starts to be processed (Step S131).

(2) The TS packet extraction unit 910 judges whether there are unprocessed TS packets or not (Step S132). If there are not any unprocessed TS packet, the descrambling process ends.

(3) If there are unprocessed TS packets, the TS packet extraction unit 910 extracts one unprocessed TS packet to pass it to the descrambling unit 911. Also, the TS packet extraction unit 910 counts the TS packet index to pass it to the scrambling key list interpretation unit 912 (Step S133).

(4) The scrambling key list interpretation unit 912 extracts the scrambling key corresponding to the TS packet index passed from the TS packet extraction unit 910, from the scrambling key list held by the scrambling key list holding unit 904, and passes the extracted key to the descrambling unit 911 (Step S134).

(5) The descrambling unit 911 descrambles one TS packet passed from the TS packet extraction unit 910 using the scrambling key extracted by the scrambling key list interpretation unit 912 and passes the descrambled TS packet to the reproduction unit 205. Then, the procedure returns upward to process the successive TS packet (Step S135).

In the fourth embodiment, in the case that a user has not made a contract to receive the content before receiving the content, the generated scrambling key list may be encoded and recorded, and then after making the contract the list may be decoded so as to be used. Alternatively, instead of generating the scrambling key list, all normal reproduction ECMs including auxiliary information may be stored when receiving the content, and then, after making the contract, the ECM interpretation unit 1001 may extract each piece of auxiliary information from all normal reproduction ECMs to generate the scrambling key list.

As described above, according to the fourth embodiment of the invention, various particular reproduction processes can be realized by extracting a scrambling key corresponding to any one of TS packets from the scrambling key list generated based on the auxiliary information when/after storing the scrambled content or the like.

Note here that the auxiliary information may be added to a storage ECM.

Embodiment 5

<Summary>

A system for providing a storage service according to the fifth embodiment of the invention consists of a broadcast apparatus, a reception apparatus, and a security module.

Unlike the first embodiment, the broadcast apparatus according to the fifth embodiment does not generate the scrambling key list. The broadcast apparatus in this embodiment broadcasts scrambled content together with normal reproduction ECMs.

The security module, which is set and integrated with the reception apparatus in a predetermined position, receives the normal reproduction ECM and the scrambled content, stores the scrambled content while generating a scrambling key list based on the normal reproduction ECM, and sequentially descrambles the scrambled content using the stored scrambling key list.

<Overall Construction>

Figure 37:
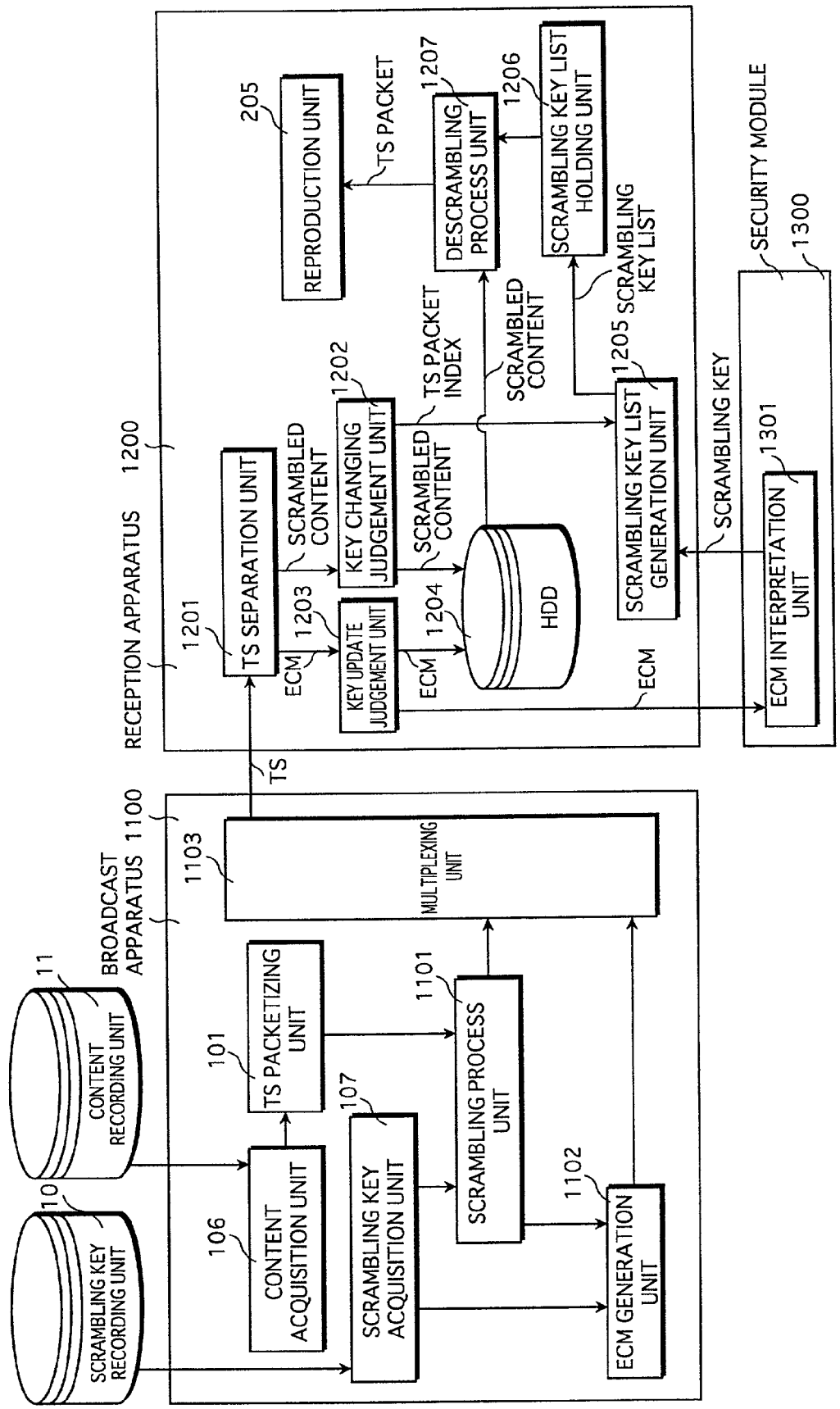
FIG. 37 shows the construction of a system for providing a storage service according to the fifth embodiment of the invention.

FIG. 37 shows the construction of a system for providing a storage service according to the fifth embodiment of the invention.

The system shown in FIG. 37 is made up of a broadcast apparatus 1100, a reception apparatus 1200, and a security module 1300.

The security module 1300 is a portable and intelligent recording medium such as an IC card. The security module 1300 is set in a predetermined position of the reception apparatus 1200 and used together with the reception apparatus 1200.

Note that construction elements which have the same functions as those in the first embodiment have been given the same reference numerals and their explanation has been omitted.

(Construction of Broadcast Apparatus)

The broadcast apparatus 1100 shown in FIG. 37 is made up of a TS packetizing unit 101, a scrambling process unit 1101, an ECM generation unit 1102, a multiplexing unit 1103, a content acquisition unit 106, and a scrambling key acquisition unit 107.

The scrambling process unit 1101 scrambles the content converted into TS packets by the TS packetizing unit 101, based on the scrambling key acquired by the scrambling key acquisition unit 107. Note that explanation of the scrambling process by the scrambling process unit 1101 has been omitted, because the scrambling process is conducted in the same manner as in the current BS digital broadcasting system.

The ECM generation unit 1102 generates normal reproduction ECMs including scrambling keys acquired by the scrambling key acquisition unit 107.

The multiplexing unit 1103 associates/attaches the generated normal reproduction ECMs with/to the scrambled content to produce a TS and broadcasts the TS.

(Constructions of Reception Apparatus and Security Module)

The reception apparatus shown in FIG. 37 is made up of a TS separation unit 1201, a key changing judgement unit 1202, a key update judgement unit 1203, an HDD 1204, a scrambling key list generation unit 1205, a scrambling key list holding unit 1206, a descrambling process unit 1207, and a reproduction unit 205.

The security module shown in FIG. 37 is made up of an ECM interpretation unit 1301.

The TS separation unit 1201 receives a TS broadcast by the multiplexing unit 1103, and separates normal reproduction ECMs and scrambled content.

Here, scrambling keys are classified into even number keys and odd number keys.

Figure 38:
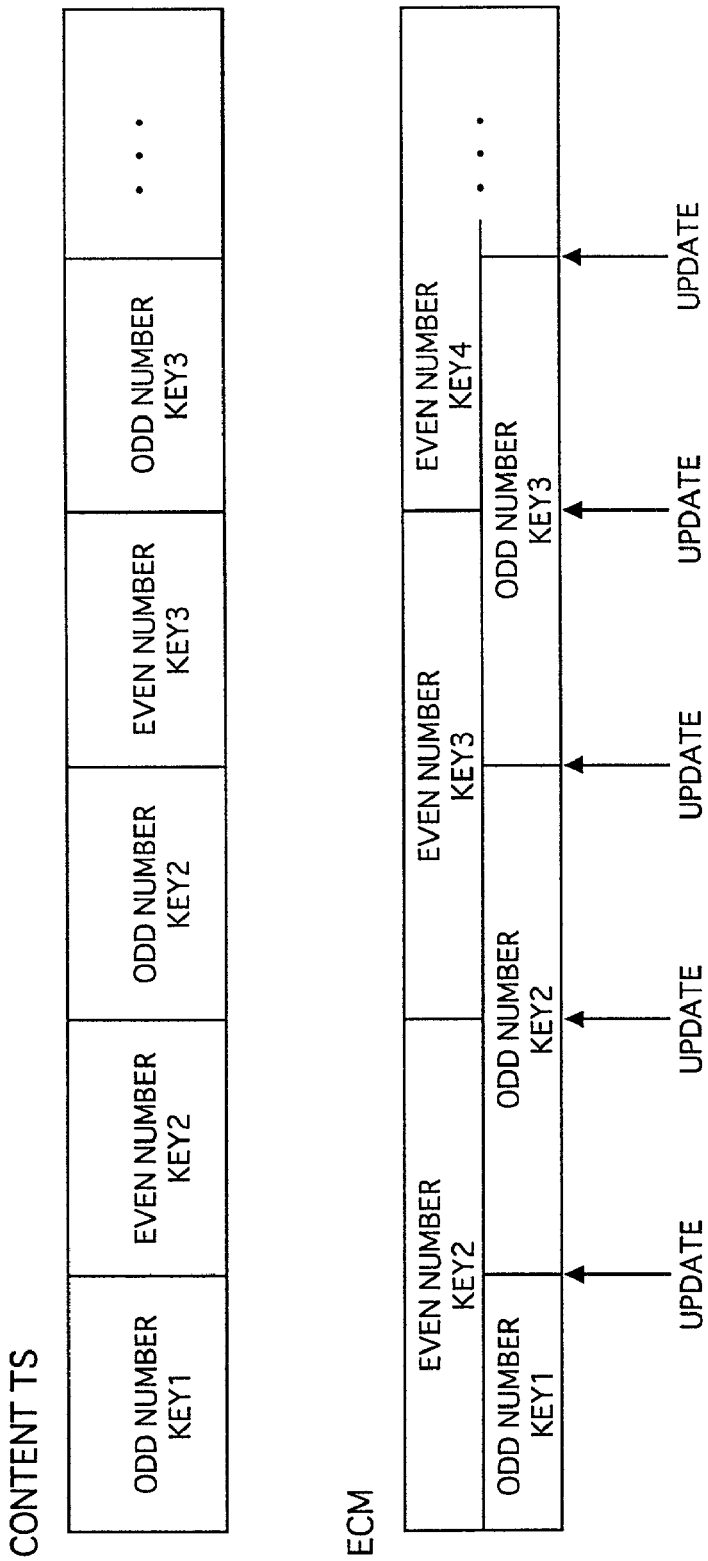
FIG. 38 is a schematic diagram showing changes in the scrambling keys and timing for updating ECMs for normal reproduction.

FIG. 38 is a schematic diagram showing changes in the scrambling keys and timing for updating normal reproduction ECMs.

As shown in FIG. 38, one normal reproduction ECM transmits an even number key and an odd number key. When updating the normal reproduction ECM, either odd number key or even number key, which is not being used, is updated. Therefore, changes in the scrambling keys can be detected by the timing of changes between odd number keys and even number keys.

Figure 39:
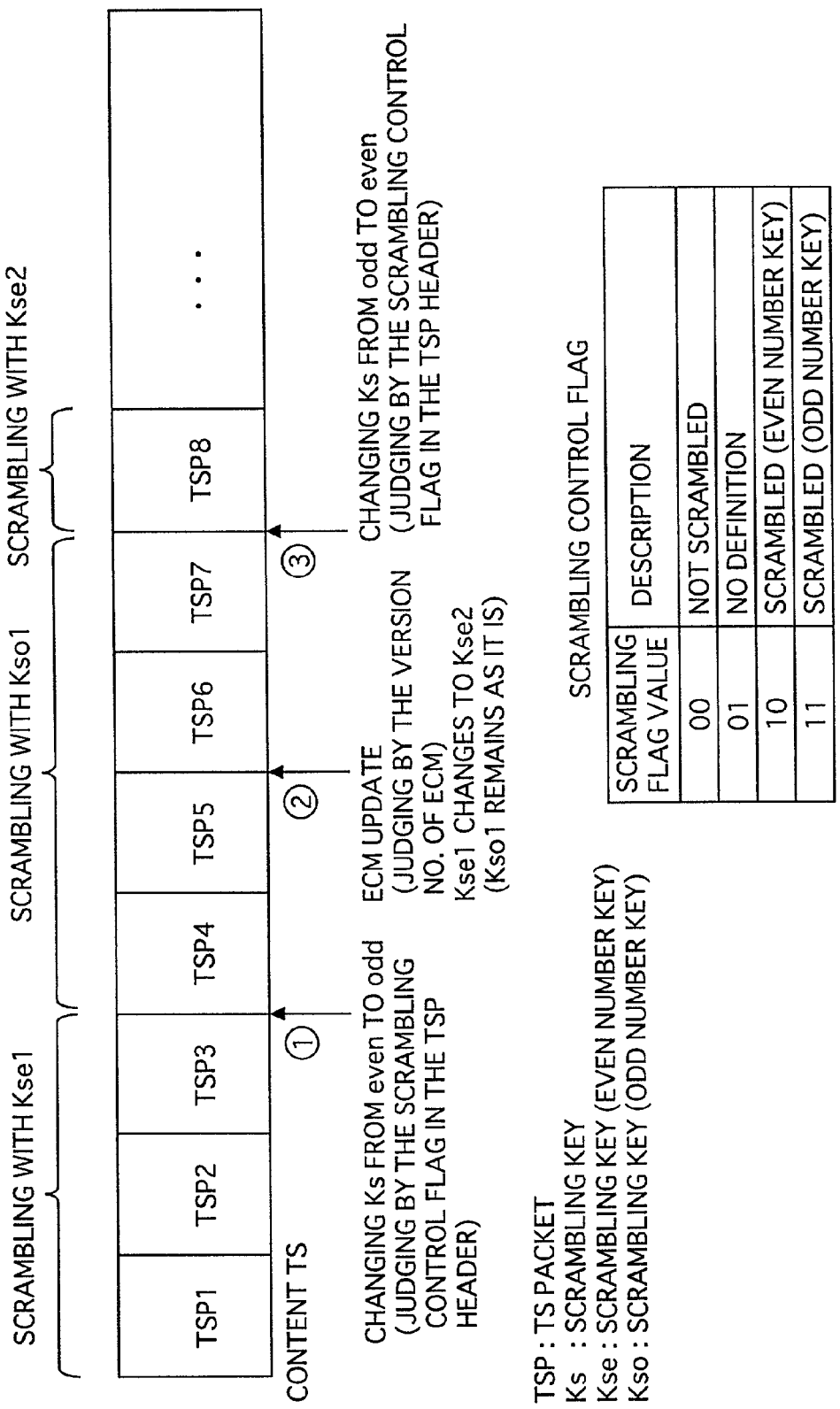
FIG. 39 is a schematic diagram showing changes between an even number key and an odd number key, and timing for updating ECMs for normal reproduction.

FIG. 39 is a schematic diagram showing changes between an even number key and an odd number key, and timing for updating normal reproduction ECMs. The scrambling control flag (note here that this term equals "transport scrambling control" prescribed in the MPEG-2 standard) shown in FIG. 39 is described in the TS packet header, which shows the state of the scrambling of the corresponding TS packet as follows. That is, in the case that the flag value is "00", scrambling is not performed, in the case of the flag value is "10", scrambling is performed using an even number key, and in the case that the flag value is "11", scrambling is performed using an odd number key.

As shown in FIG. 39, timing for changes between even number keys and odd number keys can be detected by change in the flag value of the scrambling control flag (① and ③ in FIG. 39). The timing for updating of normal reproduction ECMs can be detected by the version number of the normal reproduction ECMs (② in FIG. 39).

The key changing judgement unit 1202 counts the TS packet index indicating the ordinal position of the TS packet received by the TS separation unit 1201. The key changing judgement unit 1202 also checks the scrambling control flag in the TS packet header to judge whether the scrambling is performed by an even number key or an odd number key so as to detect the timing for changing in scrambling keys and the timing for ending of the storage.

The key update judgement unit 1203, firstly, has the HDD 1204 store the normal reproduction ECM separated by the TS separation unit 1201 therein. Each time a normal reproduction ECM is newly separated, the key update judgement unit 1203 judges whether the new normal reproduction ECM is the same as the stored normal reproduction ECM. In the case that they are not the same with each other, the key update judgement unit 1203 has the HDD 1204 overwrite the normal reproduction ECM stored in the HDD 1204 with the new normal reproduction ECM.

The HDD 1204 is a recording medium such as a hard disk drive. The HDD 1204 stores the scrambled content separated by the TS separation unit 1201 and the normal reproduction ECM passed by the key update judgement unit 1203.

The ECM interpretation unit 1301, at the timing for changing scrambling keys detected by the key changing judgement unit 1202, extracts the scrambling key that has been used until now and the scrambling key that will be used from now on, from the normal reproduction ECM stored in the HDD 1204, based on the judgement by the key changing judgement unit 1202, and passes the scrambling keys to the scrambling key list generation unit 1205.

The scrambling key list generation unit 1205 generates a scrambling key list, based on the TS packet index passed from the key changing judgement unit 1202 and the scrambling keys passed from the ECM interpretation unit 1301.

Following describes the processes for monitoring changes in scrambling keys and for generating the scrambling key list in detail.

Figure 40:
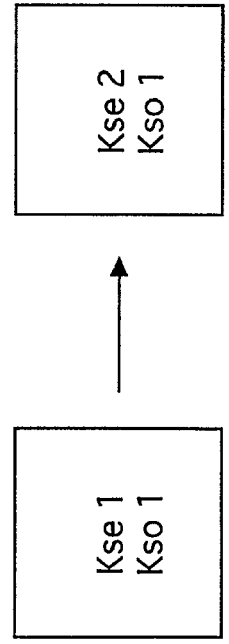
FIG. 40 shows a transition of the scrambling key list generated.

FIG. 40 shows a transition of the scrambling key list generated.

As shown in FIG. 40, the scrambling key list is not updated at the timing of updating a normal reproduction ECM (② in FIG. 39), but underlined information shown in this figure is added thereto at the timing of changes between odd number keys and even number keys (① and ③ in FIG. 39).

The scrambling key list holding unit 1206 holds the scrambling key list generated by the scrambling key list generation unit 1205.

The descrambling process unit 1207 descrambles the scrambled content stored in the HDD 1204, based on the scrambling key list held by the scrambling key list holding unit 1206, and passes the descrambled content to the reproduction unit 205.

Figure 41:
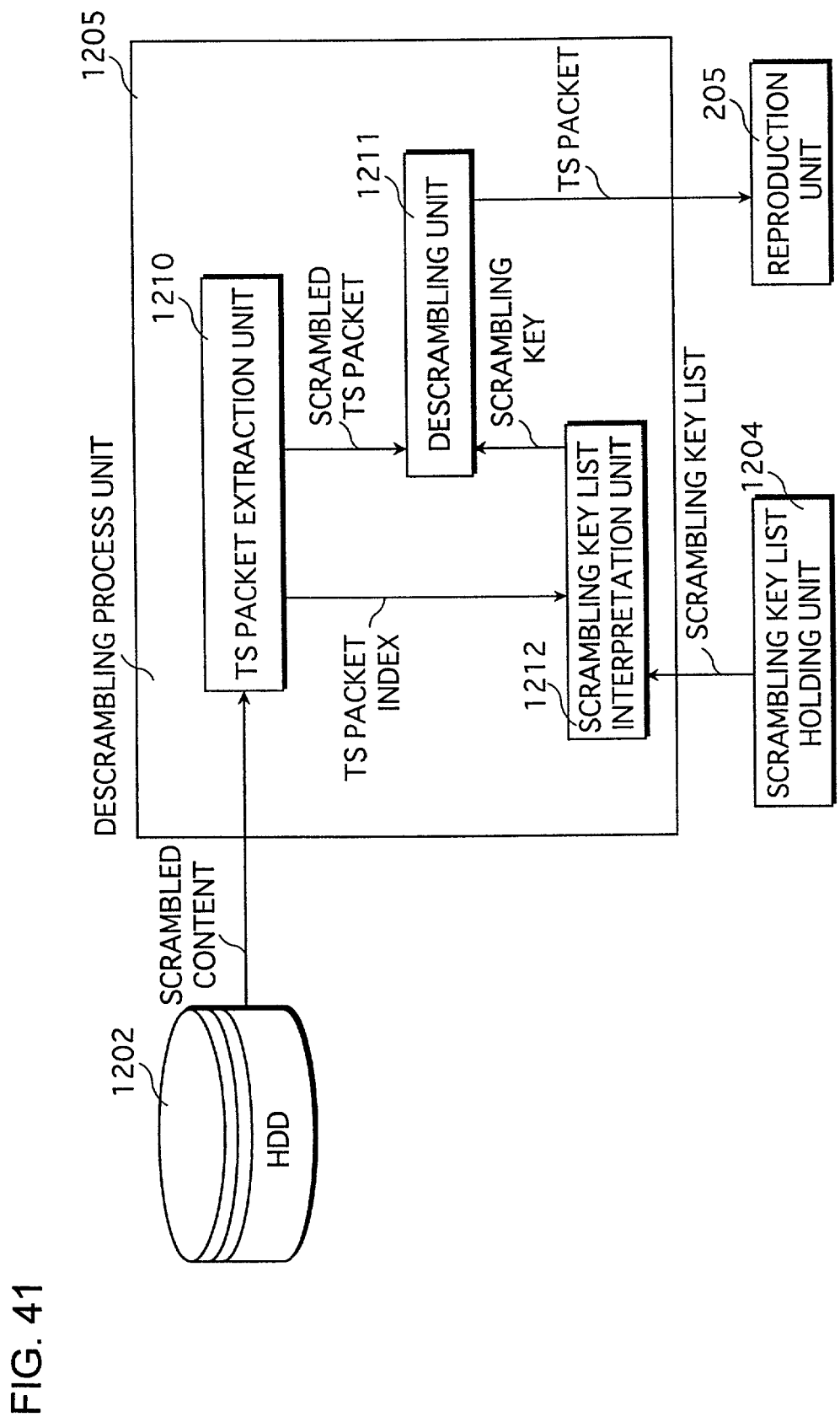
FIG. 41 shows the detailed construction of the descrambling process unit 1207.

FIG. 41 shows the detailed construction of the descrambling unit 1207.

The descrambling process unit 1207 shown in FIG. 41 is made up of a TS packet extraction unit 1210, a descrambling unit 1211, and a scrambling key list interpretation unit 121.

The TS packet extraction unit 1210 extracts the scrambled content stored in the HDD 1204 one TS packet at a time, and passes the extracted content to the descrambling unit 1211. The TS packet extraction unit 1210 also counts the TS packet index indicating the ordinal position of the extracted TS packet counted from the beginning of the content, and passes the TS packet index to the scrambling key list interpretation unit 1212. The TS packet extraction unit 1210 resets the TS packet index into zero when other content starts to be processed.

The scrambling key list interpretation unit 1212 extracts the scrambling key corresponding to the TS packet index passed from the TS packet extraction unit 1210, from the scrambling key list held by the scrambling key list holding unit 1204, and passes the extracted key to the descrambling unit 1211.

The descrambling unit 1211 descrambles one TS packet passed from the TS packet extraction unit 1210 using the scrambling key extracted by the scrambling key list interpretation unit 1212, and passes the descrambled TS packet to the reproduction unit 205. The descrambling unit 1211 repeats this process until all TS packets have been processed.

<Operations>

(Operations of Broadcast Apparatus)

Figure 42:
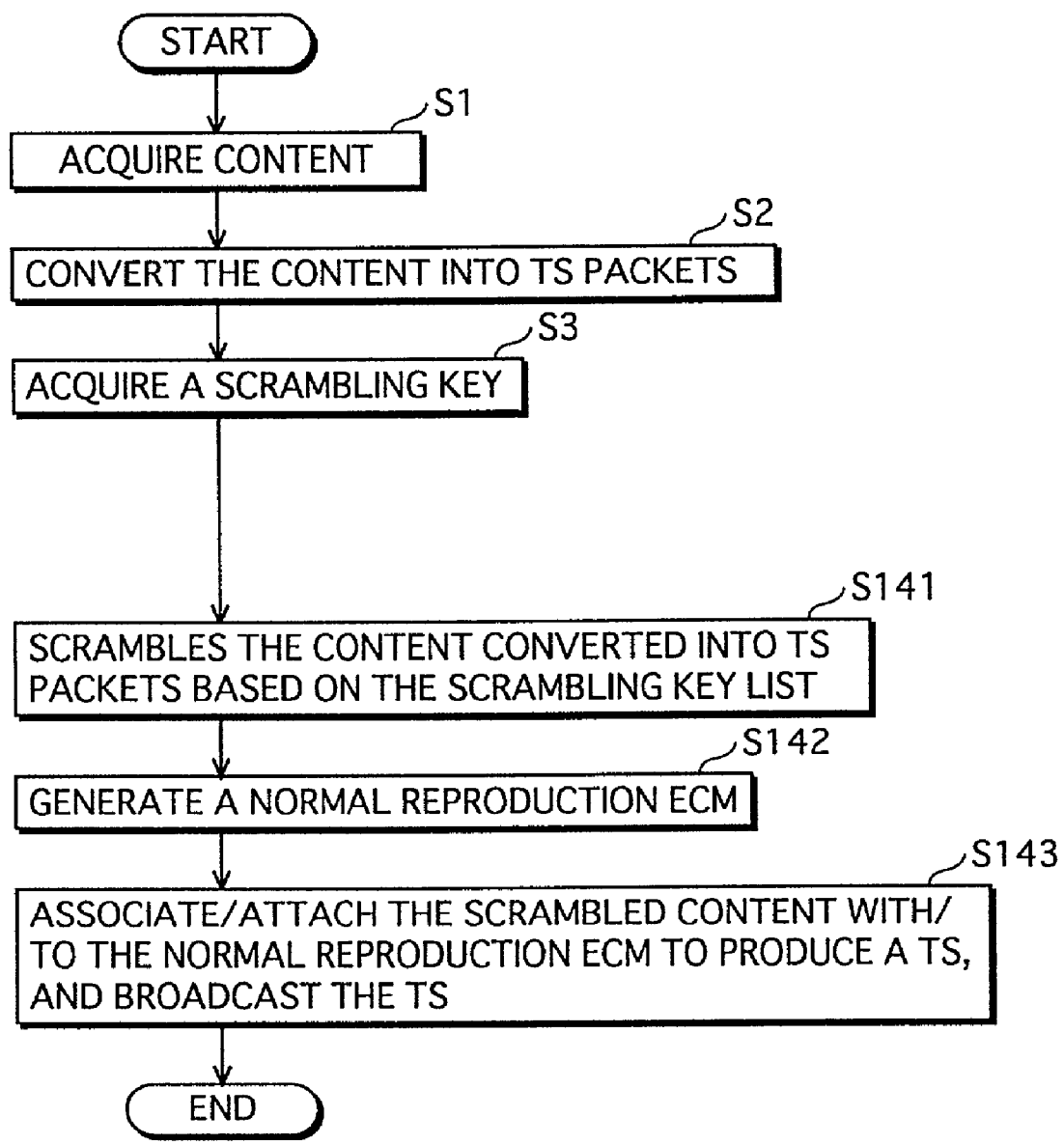
FIG. 42 shows a procedure in the broadcasting process by means of the broadcast apparatus 1100 according to the fifth embodiment of the invention.

FIG. 42 shows a procedure in the broadcasting process by means of the broadcast apparatus 1100 according to the fifth embodiment of the invention. Note that the same numerals are assigned to the step where the same processes as in FIG. 9 are conducted, and explanation for them has been omitted.

Following describes the outline of the procedure in the broadcast process, with reference to FIG. 42.

(1) Same as the step (1) in FIG. 9 (Step S1)

(2) Same as the step (2) in FIG. 9 (Step S2)

(3) Same as the step (3) in FIG. 9 (Step S3)

(4) The scrambling process unit 1101 scrambles the content converted into TS packets by the TS packetizing unit 101, based on the scrambling key acquired by the scrambling key acquisition unit 107 (Step S141).

(5) The ECM generation unit 1102 generates a normal reproduction ECM including the scrambling key acquired by the scrambling key acquisition unit 107 (Step S142).

(6) The multiplexing unit 1103 associates/attaches the generated normal reproduction ECM with/to the scrambled content to produce a TS and broadcasts the TS (Step S143).

(Operations of Reception Apparatus)

Figure 43:
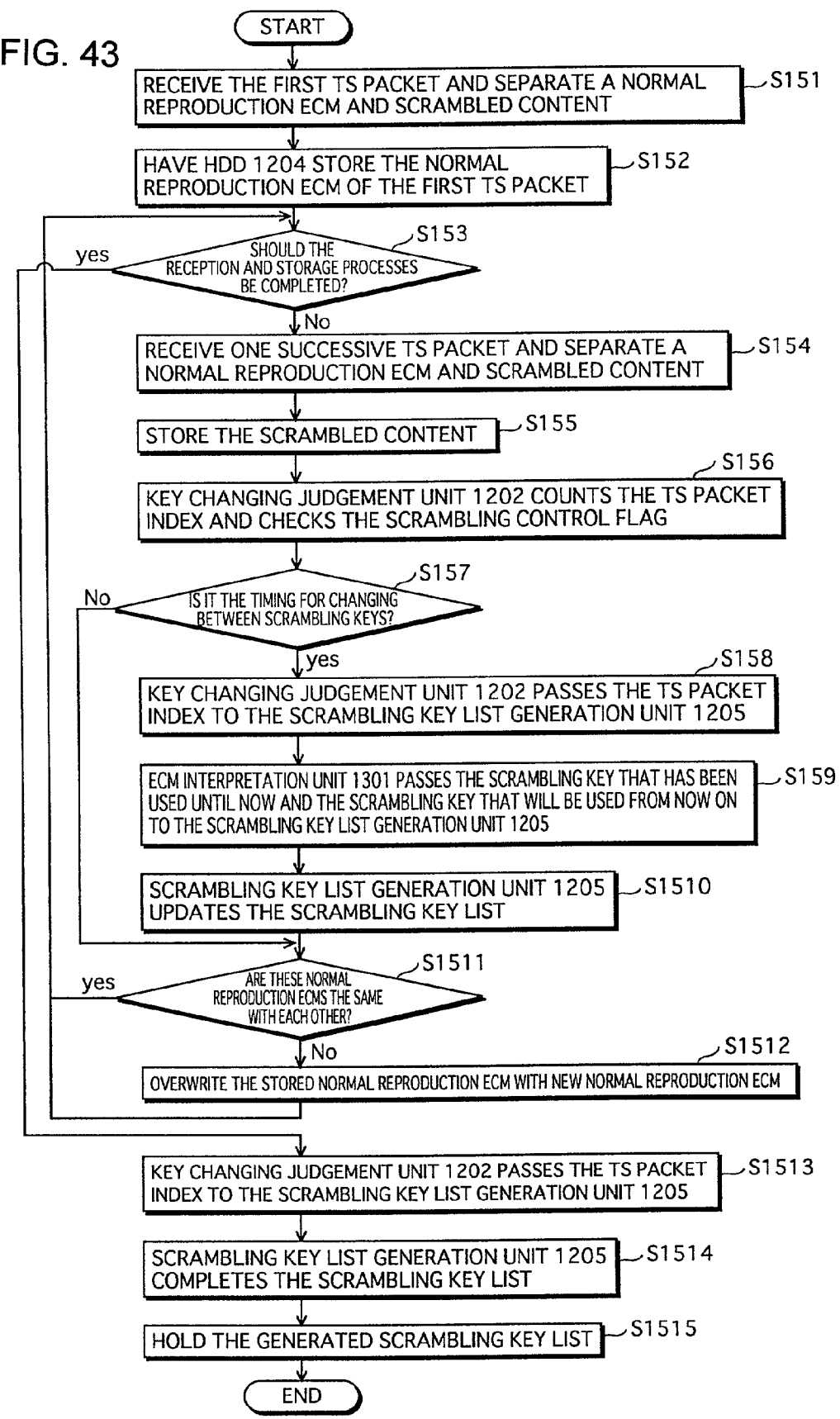
FIG. 43 shows a procedure in the reception and storage processes by means of the reception apparatus 1200 and the security module 1300 according to the fourth embodiment of the invention.

FIG. 43 shows a procedure in the reception and storage processes by means of the reception apparatus 1200 and the security module 1300 according to the fourth embodiment of the invention.

Following describes the outline of the procedure in the reception and storage processes, with reference to FIG. 43.

(1) The TS separation unit 1201 receives the first TS packet broadcast by the multiplexing unit 1103, and separates a normal reproduction ECM and scrambled content (Step S151).

(2) The key update judgement unit 1203 has the HDD 1204 store the normal reproduction ECM of the first TS packet separated by the TS separation unit 1201 therein (Step S152).

(3) The key changing judgement unit 1202 judges whether or not to complete the reception and storage processes (Step S153).

(4) If the reception and storage processes should not be completed, the TS separation unit 121 receives the following one TS packet broadcast by the multiplexing unit 1103, and separates a normal reproduction ECM and scrambled content (Step S154).

(5) The HDD 1204 stores the scrambled content separated by the TS separation unit 1201 (Step S155).

(6) The key changing judgement unit 1202 counts the TS packet index indicating the ordinal position of the TS packet received by the TS separation unit 1201. The key changing judgement unit 1202 also checks the scrambling control flag in the TS packet header to judge whether the scrambling is performed by an even number key or an odd number key (Step S156).

(7) The key changing judgement unit 1202 judges whether it is the timing for changing scrambling keys or not (Step S157).

(8) If it is the timing for changing scrambling keys, the key changing judgement unit 1202 passes the counted TS packet index to the scrambling key list generation unit 1205 (Step S158).

(9) The ECM interpretation unit 1301 extracts the scrambling key extracts the scrambling key that has been used until now and the scrambling key that will be used from now on, from the normal reproduction ECM stored in the HDD 1204, based on the judgement by the key changing judgement unit 1202, and passes the scrambling keys to the scrambling key list generation unit 1205 (Step S159).

(10) The scrambling key list generation unit 1205 updates the scrambling key list, based on the TS packet index passed from the key changing judgement unit 1202 and the scrambling keys passed from the ECM interpretation unit 1301 (Step S1510).

(11) The key update judgement unit 1203 judges whether the normal reproduction ECM separated by the TS separation unit 1202 is the same as the stored normal reproduction ECM (Step S1511). If they are the same with each other, the procedure returns upward (to Step S153) to process the successive TS packet (Step S1512).

(12) If they are not the same with each other, the key update judgement unit 1203 has the HDD 1204 overwrite the normal storage ECM stored therein with the new normal reproduction ECM. Then, the procedure returns upward (to Step S153) to process the successive TS packet (Step S1512)

(13) If the reception and storage processes should be completed, the key changing judgement unit 1202 passes the counted TS packet index to the scrambling key list generation unit 1205 (Step S1513).

(14) The scrambling key list generation unit 1205 updates the scrambling key list, based on the TS packet index passed from the key changing judgement unit 1202 to complete the scrambling key list (Step S1514).

(15) The scrambling key list holding unit 1206 holds the scrambling key list generated by the scrambling key list generation unit 1205 (Step S1515).

In the case that the reception and storage processes are completed without any changes in scrambling keys, the ECM interpretation unit 1301 extracts the scrambling key that has been used until now from the normal reproduction ECM stored in the HDD 1204, based on the judgement by the key changing judgement unit 1202, and passes the extracted key to the scrambling key list generation unit 1205. Then, the scrambling key list generation unit 1205 updates the scrambling key list, based on the TS packet index passed from the key changing judgement unit 1202 and the scrambling key passed from the ECM interpretation unit 1301 to complete the scrambling key list.

In addition, instead of separating normal reproduction ECM and scrambled content from each other when receiving them, but they may be separated before using to generate the scrambling key list.

Figure 44:
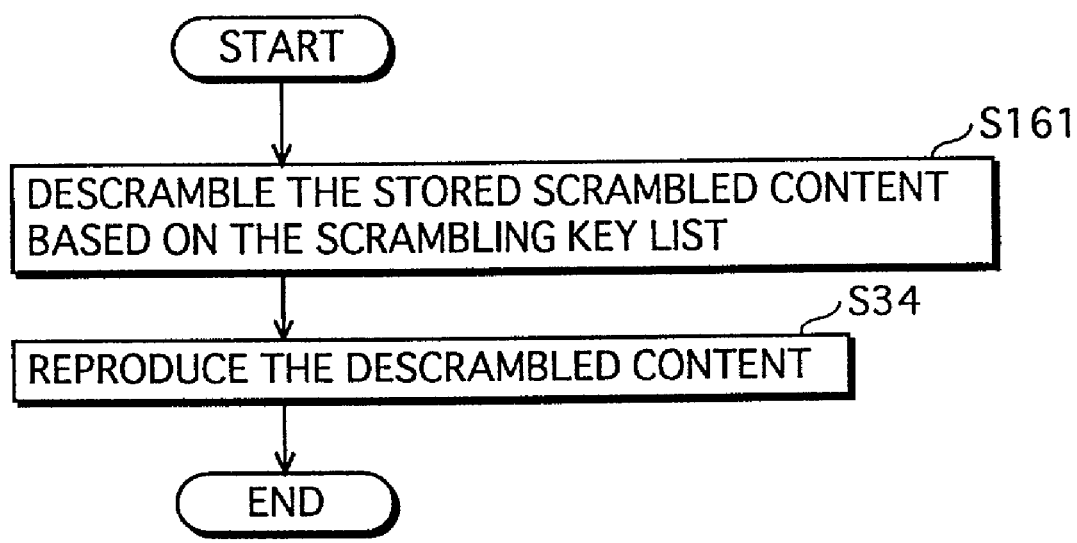
FIG. 44 shows a procedure in the reproduction process after the reception and storage processes by means of the reception apparatus 1200 and the security module 1300 according to the fifth embodiment of the invention.

FIG. 44 shows a procedure in the reproduction process after the reception and storage processes by means of the reception apparatus 1200 and the security module 1300 according to the fifth embodiment of the invention. Note that the same numerals are assigned to the step where the same processes as in FIG. 12 are conducted, and explanation for them has been omitted.

Following describes the outline of the procedure in the reproduction process, with reference to FIG. 44.

(1) The descrambling process unit 1205 descrambles the scrambled content stored in the HDD 1204, based on the scrambling key list held by the scrambling key list holding unit 1206, and passes the descrambled content to the reproduction unit 205 (Step S161).

(2) Same as the step (4) in FIG. 12 (Step S34)

Figure 45:
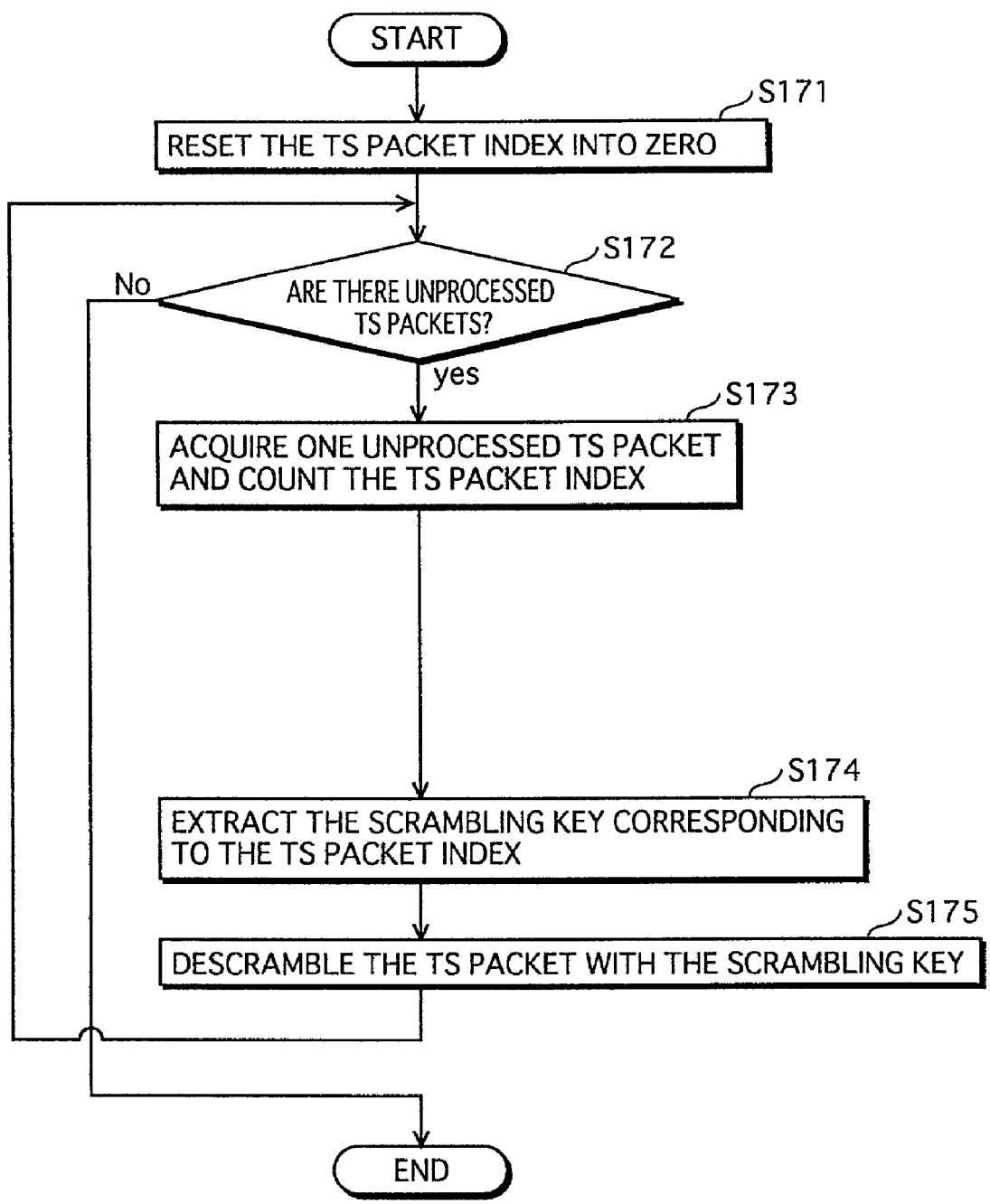
FIG. 45 shows a procedure in the descrambling process by means of the descrambling process unit 1207 in detail.

FIG. 45 shows a procedure in the descrambling process by means of the descrambling process unit 1207 in detail.

Following describes the outline of the detailed procedure in the descrambling process, with reference to FIG. 45.

(1) The TS packet extraction unit 1210 resets the TS packet index into zero when other content starts to be processed (Step S171).

(2) The TS packet extraction unit 1210 judges whether there are unprocessed TS packets or not (Step S172). If there are not any unprocessed TS packet, the descrambling process ends.

(3) If there are unprocessed TS packets, the TS packet extraction unit 1210 extracts one unprocessed TS packet to pass it to the descrambling unit 1211. Also, the TS packet extraction unit 1210 counts the TS packet index to pass it to the scrambling key list interpretation unit 1212 (Step S173).

(4) The scrambling key list interpretation unit 1212 extracts the scrambling key corresponding to the TS packet index passed from the TS packet extraction unit 1210, from the scrambling key list held by the scrambling key list holding unit 1204 and passes the extracted key to the descrambling unit 1211 (Step S174).

(5) The descrambling unit 1211 descrambles one TS packet passed from the TS packet extraction unit 1210 using the scrambling key extracted by the scrambling key list interpretation unit 1212 and passes the descrambled TS packet to the reproduction unit 205. Then, the procedure returns upward to process the successive TS packet (Step S175).

In the fifth embodiment, in the case that a user has not made a contract to receive the content before receiving the content, the generated scrambling key list may be encoded and recorded, and after making the contract the list can be decoded so as to be used. Alternatively, instead of generating the scrambling key list, all normal reproduction ECMs may be stored when receiving the content, and then, after making the contract, the ECM interpretation unit 1001 may generate the scrambling key list from all the normal reproduction ECMs.

As described above, according to the fifth embodiment of the invention, various particular reproduction processes can be realized by extracting a scrambling key corresponding to any one of TS packets from the scrambling key list generated when/after storing scrambled content or the like.

Further, in order to improve the speed of the particular reproduction processes realized by selectively reproducing I pictures only, the I picture as a target may be extracted based on an I picture list, where the I picture list is generated in the same manner for generating the scrambling key list in the above-described embodiments.

The I picture list is represented by an I picture list descriptor, for example.

FIG. 46 shows one example of the data structure of an I picture list descriptor.

The I picture list descriptor shown in FIG. 46 includes an I picture identifier (Ipic_id) for identifying I pictures, the number of TS packets counted from the beginning of the file which indicates the position of the first packet of the I picture (first_packet_position), and the number of TS packets counted form the beginning of the file which indicates the position of the last packet of the I picture (last_packet_position). In the list, the I picture identifiers (Ipic_id), the number of TS packets (first_packet_position), and the number of TS packets (last_packet_position) are described as much as the number of I pictures.

(Modifications)

In some of the above-described embodiments, the scrambling key list is delivered by the same route as that for the scrambled content. However, the scrambling key list may be delivered by another route, for example, by recording the list onto recording media such as a CD-ROM and delivering the recording media, or by means of another communication method such as the Internet and telephone.

In some of the above-described embodiments, the TS packet corresponding to the scrambling key is specified based on the number of TS packets. However, the TS packet may be specified by another method. For example, this may be based on the cumulative amount of data in the TS packet, a relative reproduction time from the beginning of the content. Alternatively, the TS packet may be specified by an identifier for the scrambling key, which is embedded for each TS packet in advance.

In each of the above-described embodiments, the scrambling keys are acquired from the database in the broadcast station. However, the scrambling keys may be generated before scrambling process.

Each of the above-described embodiments does not especially limit the timing for generating the scrambling key list. For instance, at the side of the broadcast apparatus, the list may be generated before scrambling, at the time of scrambling, or after scrambling. At the side of the reception apparatus, the list may be generated at any time before using the list in the descrambling process.

Besides, computer programs to have a computer execute the procedure of the above-described embodiments may be recorded on computer-readable recording media or may be directly transferred on the network to be distributed and sold.

These recording media can be, for example, removable recording media such as a floppy disk, a compact disk, a magnet optical disk, a DVD disk, and a memory card and fixed recording media such as hard disk, semiconductor memory.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A reception apparatus which receives scrambled content, and reproduces the scrambled content in a normal reproduction mode and in a particular reproduction mode, comprising:
   reception means for receiving the scrambled content and storage information, wherein (a) the scrambled content is a content which has been scrambled in units of frames so that the frames can be descrambled using descrambling keys that respectively correspond to each of the frames, and (b) the storage information includes a list of the descrambling keys which includes all of the descrambling keys;
   storage means for storing the received scrambled content and the storage information;
   list extraction means for extracting the list of descrambling keys from the stored storage information;
   descramble processing means for descrambling the scrambled content; and reproduction means for reproducing the descrambled content, wherein
   the normal reproduction mode is a mode which includes a play mode and in which all of the frames are descrambled and reproduced sequentially,
   the particular reproduction mode is a mode which includes a fast-play mode and in which only predetermined frames selectively extracted from less than all of the frames are descrambled and reproduced, and
   (a) in the normal reproduction mode,
   said list extraction means extracts all descrambling keys from the list of descrambling keys,
   said descramble processing means descrambles each frame of all of the frames using each of the extracted descrambling keys, and
   said reproduction means reproduces all of the frames descrambled by said descrambling means, and
   (b) in the particular reproduction mode,
   said list extraction means selectively extracts descrambling keys corresponding to the predetermined frames from the list of descrambling keys,
   said descramble processing means descrambles each of the predetermined frames using the extracted descrambling keys, and
   said reproduction means reproduces only the predetermined frames descrambled by said descrambling means so that the content is reproduced in a different speed than a speed of reproduction of the normal reproduction mode.

2. The reception apparatus of claim 1, wherein
   the reception means receives one piece of storage information in which the list of descrambling keys is embedded,
   the storage means stores the received scrambled content and the one piece of storage information, and
   the list extraction means extracts the list of descrambling keys from the stored one piece of storage information.

3. The reception apparatus of claim 1, wherein
   the reception means receives a plurality of pieces of storage information in each piece of which a divided portion of the list of descrambling keys is embedded,
   the storage means stores the received scrambled content and the plurality of pieces of storage information, and
   the list extraction means extracts the list of descrambling keys from the stored plurality of pieces of storage information.

4. The reception apparatus of claim 1, wherein
   the reception means sequentially receives a transport stream (TS) packet including the predetermined unit of scrambled content,
   the storage means sequentially stores the received TS packet, wherein
   the descramble processing means includes:
   scrambled content extraction means for extracting the predetermined unit of scrambled content from one of the TS packets stored in the storage means, and counting the ordinal position of the TS packet from the leading TS packet;
   descrambling key extraction means for extracting a descrambling key from the list of descrambling keys, based on the counted ordinal position; and
   descrambling means for descrambling the extracted predetermined unit of scrambled content using the extracted descrambling key.

5. The reception apparatus of claim 1, wherein
   the reception means receives at least one storage Entitlement Control Message (ECM) as the at least one piece of storage information, the list of descrambling keys being embedded in a portion to be encoded in the main body of the ECM,
   the storage means stores the received storage ECMs, and
   the list extraction means interprets the stored storage ECMs to extract the list of descrambling keys.

6. The reception apparatus of claim 5, wherein
   the reception means receives the storage ECMs including identifying information for distinguishing the storage ECMs from another type of ECM.

7. The reception apparatus of claim 5, wherein
   the reception means receives the storage ECMs at a time.

8. The reception apparatus of claim 1, wherein
   the reception means sequentially receives a TS packet including (a) the predetermined unit of scrambled content and (b) packet specifying information for specifying an unscrambled TS packet, and
   the storage means sequentially stores the received TS packet, wherein
   the descramble processing means includes:
   scrambled content extraction means for extracting the predetermined unit of scrambled content and the packet specifying information from one of the TS packets stored in the storage means;
   descrambling key extraction means for extracting a descrambling key from the list of descrambling keys, based on the extracted packet specifying information; and
   descrambling means for descrambling the extracted predetermined unit of scrambled content using the extracted descrambling key.

9. The reception apparatus of claim 8, wherein
   the packet specifying information is one of Continuity Counter (CC), the number of TS packets, a cumulative amount of data, a relative reproduction time, and a scrambling key identifier,
   the scrambled content extraction means extracts, as the packet specifying information, one of the Continuity Counter (CC), the number of TS packets, the cumulative amount of data, the relative reproduction time, and the scrambling key identifier, and
   the descrambling key extraction means performs a predetermined operation to the extracted information as the packet identifying information to generate a descrambling key identifier, and extracts a descrambling key from the list of descrambling keys based on the descrambling key identifier.

10. The reception apparatus of claim 1, wherein
    the reception means sequentially receives a TS packet including (a) the predetermined unit of scrambled content and (b) unscrambled I picture information, wherein the I picture information indicates whether the TS packet corresponding to the information consists of a portion of an I picture/an I picture or not, and the storage means sequentially stores the received TS packet, wherein the descramble processing means includes:

scrambled content extraction means for, when performing particular reproduction processes, extracting the predetermined unit of scrambled content and I picture information from one of the TS packets stored in the storage means;

I picture judgment means for judging whether the extracted predetermined unit of scrambled content consists of a portion of an I picture/an I picture or not, based on the extracted I picture information;

descrambling key extraction means for extracting a descrambling key from the list of descrambling keys, only when the extracted predetermined unit of scrambled content consists of a portion of an I picture/an I picture; and descrambling means for descrambling the extracted predetermined unit of scrambled content using the extracted descrambling key.

11. The reception apparatus of claim 1 further managing contract information and consisting of a security module whose portion does not effectively function if a contract has not been made, and other modules, the reception apparatus further comprising:

list holding means for holding the list of descrambling keys extracted by the list extraction means, wherein the list extraction means and the list holding means are provided within the security module.

12. A reception apparatus which receives and reproduces scrambled content in a normal reproduction mode and in a particular reproduction mode, comprising:

reception means for receiving the scrambled content, wherein the scrambled content is a content which has been scrambled in units of frames so that the frames can be descrambled using descrambling keys that respectively correspond to each of the frames, and the descrambling keys are attached to the frames of scrambled content;

storage means for storing the received scrambled content;

list generation means for, when/after storing the received scrambled content by said storage means, generating a list of descrambling keys which includes all of the descrambling keys attached to each frame of the scrambled content, list extraction means for extracting the list of descrambling keys from the stored storage information;

descramble processing means for descrambling the scrambled content; reproduction means for reproducing the descrambled content, wherein the normal reproduction mode is a mode which includes a play mode and in which all of the frames are descrambled and reproduced sequentially, the particular reproduction mode is a mode which includes a fast-play mode and in which only predetermined frames selectively extracted from less than all of the frames are descrambled and reproduced, and (a) in the normal reproduction mode, said list extraction means extracts all descrambling keys from the list of descrambling keys, said descramble processing means descrambles each frame of all of the frames using each of the extracted descrambling keys, and said reproduction means reproduces all of the frames descrambled by said descrambling means, and (b) in the particular reproduction mode, said list extraction means selectively extracts descrambling keys corresponding to the predetermined frames from the list of descrambling keys, said descramble processing means descrambles each of the predetermined frames using the extracted descrambling keys, and said reproduction means reproduces the predetermined frames descrambled by said descrambling means.

13. The reception apparatus of claim 1, wherein in the particular reproduction mode, said reproduction means reproduces the predetermined frames in a quality equal to a quality if the predetermined frame was reproduced by said reproduction means in the normal reproduction mode.

14. The reception apparatus of claim 12, wherein the reception means sequentially receives a TS packet including (a) the predetermined unit of scrambled content, and (b) auxiliary information including a descrambling key and information for associating the descrambling key with scrambled content, the storage means sequentially stores the received TS packet, and the list generation means generates the list of descrambling keys, based on the auxiliary information.

15. The reception apparatus of claim 14, wherein the TS packet includes an ECM, the auxiliary information being embedded in a portion to be encoded in a main body of the ECM, and the list generation means extracts the auxiliary information embedded in the ECM, and generates the list of descrambling keys based on the auxiliary information.

16. A recording medium on which a program used for a reception apparatus which receives and reproduces scrambled content is recorded, the program causing the reception apparatus to perform:

a reception step for receiving the scrambled content and storage information, wherein (a) the scrambled content is a content which has been scrambled in units of frames so that the frames can be descrambled using descrambling keys that respectively correspond to each of the frames, and (b) the storage information includes a list of the descrambling keys which includes all of the descrambling keys;

a storage step for storing the received scrambled content and the storage information;

a list extraction step for extracting the list of descrambling keys from the stored storage information;

a descramble processing step for descrambling the scrambled content; and a reproduction step for reproducing the descrambled content, wherein the normal reproduction mode is a mode which includes a play mode and in which all of the frames are descrambled and reproduced sequentially, the particular reproduction mode is a mode which includes a fast-play mode and in which only predetermined frames selectively extracted from less than all of the frames are descrambled and reproduced, and (a) in the normal reproduction mode, said list extraction step extracts all descrambling keys from the list of descrambling keys, said descramble processing step descrambles each frame of all of the frames using each of the extracted descrambling keys, and said reproduction step reproduces all of the frames descrambled by said descrambling means, and (b) in the particular reproduction mode,
said list extraction step selectively extracts descrambling keys corresponding to the predetermined frames from the list of descrambling keys,
said descramble processing step descrambles each of the predetermined frames using the extracted descrambling keys, and
said reproduction means reproduces only the predetermined frames descrambled by said descrambling means so that the content is reproduced in a different speed than a speed of reproduction of the normal reproduction mode.

17. A recording medium on which a program used for a reception apparatus which receives and reproduces scrambled content is recorded, the program causing the reception apparatus to perform:
a reception step for receiving the scrambled content, wherein the scrambled content is a content which has been scrambled in units of frames so that the frames can be descrambled using descrambling keys that respectively correspond to each of the frames, and the descrambling keys are attached to the frames of scrambled content;
a storage step for storing the received scrambled content;
a list generation step for, when/after storing the received scrambled content in the storage step, generating a list of descrambling keys which includes all of the descrambling keys attached to each frame of the scrambled content,
a list extraction step for extracting the list of descrambling keys from the stored storage information;
a descramble processing step for descrambling the scrambled content; a reproduction step for reproducing the descrambled content, wherein
the normal reproduction mode is a mode which includes a play mode and in which all of the frames are descrambled and reproduced sequentially,
the particular reproduction mode is a mode which includes a fast-play mode and in which only predetermined frames selectively extracted from less than all of the frames are descrambled and reproduced, and
(a) in the normal reproduction mode,
said list extraction step extracts all descrambling keys from the list of descrambling keys,
said descramble processing step descrambles each frame of all of the frames using each of the extracted descrambling keys, and
said reproduction step reproduces the all frames descrambled by said descrambling step, and
(b) in the particular reproduction mode,
said list extraction step selectively extracts descrambling keys corresponding to the predetermined frames from the list of descrambling keys,
said descramble processing step descrambles each of the predetermined frames using the extracted descrambling keys, and
said reproduction step reproduces the predetermined frames descrambled by said descrambling step at a speed of reproduction that is different than a speed of reproduction of the normal reproduction mode.

18. A method for receiving and reproducing scrambled content, the method comprising:
a reception step for receiving the scrambled content and storage information, wherein (a) the scrambled content is a content which has been scrambled in units of frames so that the frames can be descrambled using descrambling keys that respectively correspond to each of the frames, and (b) the storage information includes a list of the descrambling keys which includes all of the descrambling keys;
a storage step for storing the received scrambled content and the storage information;
a list extraction step for extracting the list of descrambling keys from the stored storage information;
a descramble processing step for descrambling the scrambled content; and a reproduction step for reproducing the descrambled content, wherein
the normal reproduction mode is a mode which includes a play mode and in which all of the frames are descrambled and reproduced sequentially,
the particular reproduction mode is a mode which includes a fast-play mode and in which only predetermined frames selectively extracted from less than all of the frames are descrambled and reproduced, and
(a) in the normal reproduction mode,
said list extraction step extracts all descrambling keys from the list of descrambling keys,
said descramble processing step descrambles each frame of all of the frames using each of the extracted descrambling keys, and
said reproduction step reproduces the all frames descrambled by said descrambling means, and
(b) in the particular reproduction mode,
said list extraction step selectively extracts descrambling keys corresponding to the predetermined frames from the list of descrambling keys,
said descramble processing step descrambles each of the predetermined frames using the extracted descrambling keys, and
said reproduction means reproduces only the predetermined frames descrambled by said descrambling means so that the content is reproduced in a different speed than a speed of reproduction of the normal reproduction mode.

19. A method for receiving and reproducing scrambled content, the method comprising:
a reception step for receiving the scrambled content, wherein the scrambled content is a content which has been scrambled in units of frames so that the frames can be descrambled using descrambling keys that respectively correspond to each of the frames, and the descrambling keys are attached to the frames of scrambled content;
a storage step for storing the received scrambled content;
a list generation step for, when/after storing the received scrambled content in the storage step, generating a list of descrambling keys which includes all of the descrambling keys attached to each frame of the scrambled content;
a list extraction step for extracting the list of descrambling keys from the stored storage information;
a descramble processing step for descrambling the scrambled content;
a reproduction step for reproducing the descrambled content, wherein
the normal reproduction mode is a mode which includes a play mode and in which all of the frames are descrambled and reproduced sequentially, the particular reproduction mode is a mode which includes a fast-play mode and in which only predetermined frames selectively extracted from less than all of the frames are descrambled and reproduced, and (a) in the normal reproduction mode, said list extraction step extracts all descrambling keys from the list of descrambling keys, said descramble processing step descrambles each frame of all of the frames using each of the extracted descrambling keys, and said reproduction step reproduces all of the frames descrambled by said descrambling step, and (b) in the particular reproduction mode, said list extraction step selectively extracts descrambling keys corresponding to the predetermined frames from the list of descrambling keys, said descramble processing step descrambles each of the predetermined frames using the extracted descrambling keys, and said reproduction step reproduces the predetermined frames descrambled by said descrambling step at a speed of reproduction that is different than a speed of reproduction of the normal reproduction mode.

* * * * *